US012795594B2

(12) United States Patent
Kim

(10) Patent No.: US 12,795,594 B2
(45) Date of Patent: Nov. 10, 2026

(54) METHOD AND APPARATUS FOR AI/ML BASED POSITIONING IN WIRELESS COMMUNICATION SYSTEM

(71) Applicant: SETLAB Co., LTD., Gyeonggi-do (KR)

(72) Inventor: Soenghun Kim, Gyeonggi-do (KR)

(73) Assignee: SETLAB Co., LTD., Gyeonggi-do (KR)

( * ) Notice: Subject to any disclaimer, the term of this patent is extended or adjusted under 35 U.S.C. 154(b) by 0 days.

(21) Appl. No.: 19/578,927

(22) Filed: Mar. 26, 2026

(65) Prior Publication Data

US 2026/0304368 A1 Oct. 1, 2026

(30) Foreign Application Priority Data

Mar. 27, 2025 (KR) ........................ 10-2025-0039915
Mar. 19, 2026 (KR) ........................ 10-2026-0050069

(51) Int. Cl.
*H04W 64/00* (2009.01)
*H04L 41/16* (2022.01)

(52) U.S. Cl.
CPC ............. *H04W 64/00* (2013.01); *H04L 41/16* (2013.01)

(58) Field of Classification Search
CPC ............................... H04W 64/00; H04L 41/16
See application file for complete search history.

(56) References Cited

U.S. PATENT DOCUMENTS

2023/0309042 A1* 9/2023 Da ...................... H04W 56/005
2024/0306022 A1* 9/2024 Hirzallah .............. G01S 5/0278
2026/0006578 A1* 1/2026 Zhou ..................... G01S 5/0278

OTHER PUBLICATIONS

3GPP, 3rd Generation Partnership Project; Technical Specification Group Radio Access Network; LTE Positioning Protocol (LPP) (Release 18) Dec. 2024, 410 p. 3GPP TS 37.355 V18.4.0.
3GPP, 3rd Generation Partnership Project; Technical Specification Group Radio Access Network; NR; NR and NG-RAN Overall Description; Stage 2 (Release 18) Dec. 2024, 270 pages, 3GPP TS 38.300 V18.4.0.

(Continued)

*Primary Examiner* — Christopher M Brandt
(74) *Attorney, Agent, or Firm* — Nicholas Park

(57) ABSTRACT

A method for AI/ML based positioning in a wireless communication system is disclosed. A terminal exchanges capability information with a Location Management Function (LMF), then requests and receives AI/ML assistance data including Transmission Reception Point (TRP) coordinates with associated IDs and downlink Positioning Reference Signal (PRS) configuration information. The terminal performs AI/ML positioning by receiving downlink PRS from multiple transmission points and executing inference using an AI/ML model with the assistance data to determine its location. The terminal reports the determined location to the LMF via a ProvideLocationInformation message containing a location source parameter indicating AI/ML positioning, inferred location coordinates, and validity time information, enabling accurate positioning through machine learning techniques.

9 Claims, 25 Drawing Sheets

(56) References Cited

OTHER PUBLICATIONS

3GPP, 3rd Generation Partnership Project; Technical Specification Group Radio Access Network; NG Radio Access Network (NG-RAN); Stage 2 functional specification of User Equipment (UE) positioning in NG-RAN (Release 18) Dec. 2024, 185pages, 3GPP TS 38.305 V18.4.0.
3GPP,3rd Generation Partnership Project; Technical Specification Group Radio Access Network; NR; Radio Resource Control (RRC) protocol specification (Release 18) Dec. 2024, 1702 pages, 3GPP TS 38.331 V18.4.0.
Apple, R2-2408564, LCM procedure of AIML based positioning, 3GPP TSG RAN WG2 #127bis, Oct. 4, 2024.
3GPP, TS37.355 v18.3.0, LTE Positioning Protocol (LPP), Feb. 11, 2025.
Qualcomm Incorporated, R2-2405070, LCM for positioning use case, 3GPP TSG RAN WG2 #126, May 10, 2024.
MOIP(KIPO), Office Action Issued for Korean Patent Application No. 10-2026-0050069, Jun. 19, 2026.

* cited by examiner

FIG.3C
ProvideAssistanceData
NR-DL-TDOA-ProvideAssistanceData-r16
NR-DL-PRS-AssistanceData-r16
Case2: provided in posSIB
A1-20
posSibType6-1
AssistanceDataSIBelement-r15
NR-DL-PRS-AssistanceData-r16
valueTag-r15
expirationTime-r15
cipheringKeyData-r15
segmentationInfo-r15

METHOD AND APPARATUS FOR AI/ML BASED POSITIONING IN WIRELESS COMMUNICATION SYSTEM

CROSS-REFERENCE TO RELATED APPLICATION

This application claims priority to and the benefit of Korean Patent Application Nos. 10-2025-0039915, filed on Mar. 27, 2025, and 10-2026-0050069, filed on Mar. 19, 2026. Each of the above documents is incorporated herein by reference in its entirety.

BACKGROUND

Technical Field

The present disclosure relates to a wireless communication system, and more particularly, to a method and apparatus for performing positioning based on artificial intelligence (AI) and machine learning (ML) techniques. More specifically, the disclosure relates to a method for exchanging capability information and assistance data between a terminal and a Location Management Function (LMF) to determine terminal location using an AI/ML model.

Related Art

In wireless communication systems, accurate positioning of user equipment (UE) or terminals is essential for various location-based services, emergency services, network optimization, and regulatory requirements. Traditional positioning methods have relied on techniques such as Global Navigation Satellite System (GNSS), Observed Time Difference of Arrival (OTDOA), and cell-based positioning. However, these conventional methods often face challenges in complex environments such as indoor spaces, urban canyons, and areas with poor satellite visibility, where positioning accuracy significantly degrades due to signal blockage, multipath propagation, and non-line-of-sight conditions.

With the advancement of 5G New Radio (NR) systems and the introduction of enhanced positioning reference signals (PRS) and multiple transmission reception points (TRPs), new opportunities have emerged to improve positioning accuracy. The 3rd Generation Partnership Project (3GPP) has been developing enhanced positioning techniques that leverage downlink and uplink reference signals, angle-based measurements, and multi-point coordination. However, these enhanced techniques still require complex signal processing and geometric calculations that may not fully capture the intricate propagation characteristics and environmental factors affecting positioning performance, particularly in challenging radio environments.

Recent developments in artificial intelligence (AI) and machine learning (ML) technologies have demonstrated significant potential for improving positioning accuracy in wireless communication systems. AI/ML based positioning can learn complex relationships between radio signal characteristics and terminal locations from training data, enabling more accurate position estimation even in challenging environments where traditional geometric methods struggle. However, implementing AI/ML based positioning in standardized wireless communication systems requires establishing proper signaling procedures, assistance data formats, and capability negotiation mechanisms between network entities and terminals. There is a need for a systematic framework that enables terminals to request and receive appropriate AI/ML assistance data, perform AI/ML based position inference, and report location information with clear indication of the positioning method used.

SUMMARY

A method is provided for AI/ML based positioning in a wireless communication system involving signaling procedures between a terminal and a Location Management Function (LMF). The method comprises an operational framework for determining terminal location using artificial intelligence and machine learning techniques.

In the first step, the terminal receives a RequestCapabilities message from the LMF and transmits a ProvideCapabilities message indicating its AI/ML positioning capabilities. The LMF may then send a RequestLocationInformation message specifying whether AI/ML location information is requested and whether the terminal is allowed to request additional assistance data for AI/ML based positioning. In response, the terminal may transmit a RequestAssistanceData message to the LMF.

In the second step, the LMF responds with a ProvideAssistanceData message containing AI/ML assistance data, including position calculation assistance data with associated IDs linked to Transmission Reception Point (TRP) coordinates, downlink Positioning Reference Signal (PRS) assistance data, and one or more associated IDs where each ID may be associated with multiple TRPs.

In the third step, the terminal performs AI/ML positioning by receiving downlink PRS from multiple transmission points and executing inference using an AI/ML model with the received assistance data to determine its location.

In the final step, the terminal transmits a ProvideLocationInformation message to the LMF containing a location source parameter represented as a bit string with a specific bit corresponding to AI/ML, the inferred location coordinates, and a validity time field specifying the duration for which the location information remains valid.

DETAILED DESCRIPTION

Figure 1A:
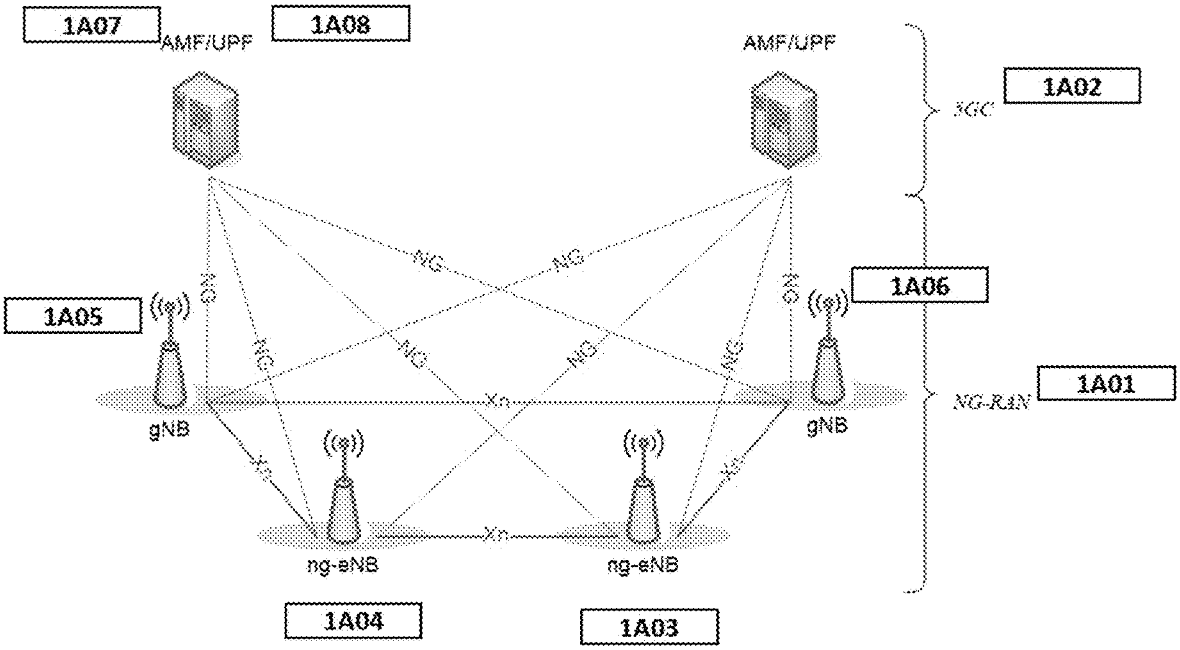
FIG. 1A is a diagram illustrating the architecture of an 5G system and a NG-RAN.

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the present disclosure, followings are used interchangeably:

Terminal and UE and wireless device;

Information Element (IE) and set of parameters;

Parameter and field and IE;

Base station and GNB;

UAI and UEAssistanceInformation and UE assistance information message.

The integration of Artificial Intelligence (AI) and Machine Learning (ML) in New Radio (NR) systems necessitates efficient and effective data collection methods. These methods are crucial for training AI/ML models to optimize network performance, manage resources, and enhance user experiences. The following outlines various data collection techniques for NR systems:

>: Network Monitoring: Continuous monitoring of network parameters, such as signal strength, interference levels, and user mobility patterns, provides a rich dataset for AI/ML algorithms. This data is collected through network elements, including base stations and user equipment.

>: User Equipment Feedback: Data is gathered directly from user devices, including information on signal quality, data throughput, and application usage. This feedback helps in understanding user behavior and network performance from the end-user perspective.

>: Simulation and Emulation: Synthetic data is generated through network simulations and emulations, replicating various network conditions and user behaviors. This method allows for controlled data collection, enabling the training of AI/ML models under specific scenarios.

>: Environmental Sensing: Sensors deployed within the network environment collect data on physical conditions, such as temperature, humidity, and geographical features. This environmental data is used to understand its impact on network performance and optimize AI/ML models accordingly.

>: Historical Data Analysis: Historical network data is analyzed to identify patterns and trends. This retrospective analysis provides valuable insights for training AI/ML models, enabling predictive analytics and proactive network management.

The effective collection and utilization of data are fundamental to the successful implementation of AI/ML in NR systems. These methods ensure that AI/ML models are trained on comprehensive and representative datasets, leading to improved network performance and user satisfaction.

To enable efficient data collection, it is essential that UE starts and stops data transfer with sufficient controllability and self-estimation.

FIG. 1A is a diagram illustrating the architecture of an 5G system and a NG-RAN to which the disclosure may be applied.

5G system consists of NG-RAN 1A01 and 5GC 1A02. An NG-RAN node is either:

>1: a gNB, providing NR user plane and control plane protocol terminations towards the UE; or >1: an ng-eNB, providing E-UTRA user plane and control plane protocol terminations towards the UE.

The gNBs 1A05 or 1A06 and ng-eNBs 1A03 or 1A04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A07 and UPF 1A08 may be realized as a physical node or as separate physical nodes.

A gNB 1A05 or 1A06 or an ng-eNBs 1A03 or 1A04 hosts the various functions listed below.

>1: Functions for Radio Resource Management such as Radio Bearer Control, Radio Admission Control, Connection Mobility Control, Dynamic allocation of resources to UEs in uplink, downlink and sidelink (scheduling); and >1: IP and Ethernet header compression, uplink data decompression and encryption of user data stream; and >1: Selection of an AMF at UE attachment when no routing to an MME can be determined from the information provided by the UE; and >1: Routing of User Plane data towards UPF; and >1: Scheduling and transmission of paging messages; and >1: Scheduling and transmission of broadcast information (originated from the AMF or O&M); and >1: Measurement and measurement reporting configuration for mobility and scheduling; and >1: Session Management; and >1: QoS Flow management and mapping to data radio bearers; and >1: Support of UEs in RRC_INACTIVE state; and The AMF 1A07 hosts the functions such as NAS signaling, NAS signaling security, AS security control, SMF selection, Authentication, Mobility management and positioning management.

The UPF 1A08 hosts the functions such as packet routing and forwarding, transport level packet marking in the uplink, QoS handling and the downlink, mobility anchoring for mobility etc.

Figure 1B:
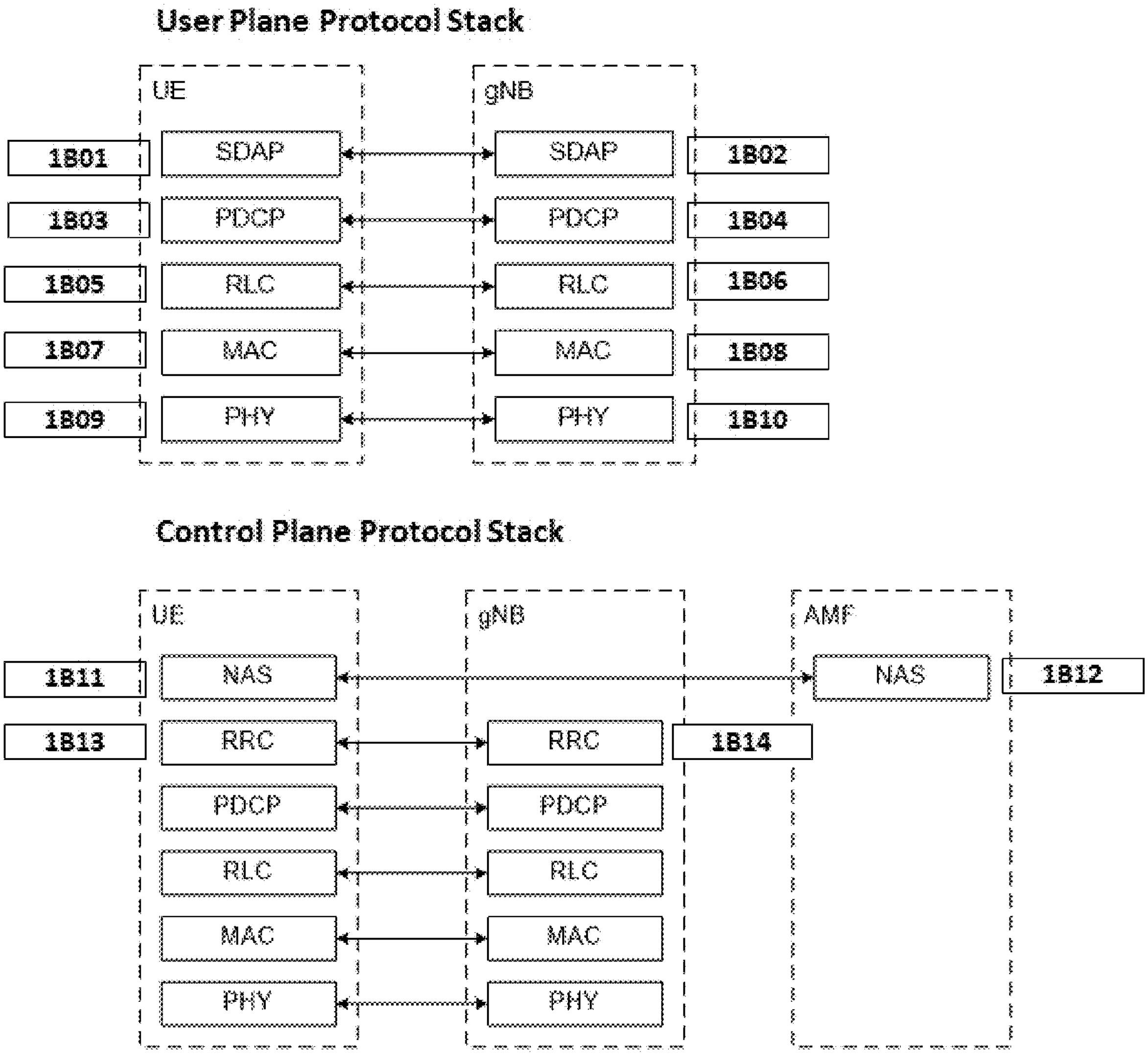
FIG. 1B is a diagram illustrating a wireless protocol architecture in an 5G system.

FIG. 1B is a diagram illustrating a wireless protocol architecture in an 5G system to which the disclosure may be applied.

User plane protocol stack consists of SDAP 1B01 or 1B02, PDCP 1B03 or 1B04, RLC 1B05 or 1B06, MAC 1B07 or 1B08 and PHY 1B09 or 1B10. Control plane protocol stack consists of NAS 1B11 or 1B12, RRC 1B13 or 1B14, PDCP, RLC, MAC and PHY.

Each protocol sublayer performs functions related to the operations listed below.

NAS: authentication, mobility management, security control etc

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Figure 1C:
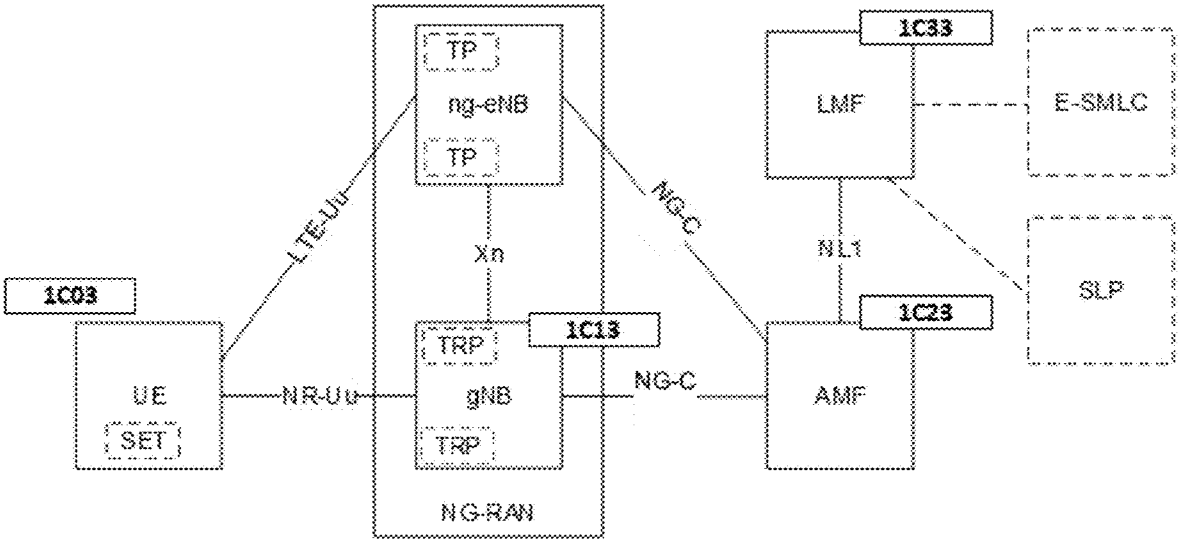
FIG. 1C is a diagram illustrating the architecture of positioning system.

FIG. 1C is a diagram illustrating a structure of a positioning system according to an embodiment of the present disclosure.

The terminal 1C03 is connected to the LMF 1C33 through the gNB 1C13 and the AMF 1C23. Hereinafter, gNB is also referred to as a base station, AMF as an access mobility function, and LMF as a location management function.

The base station provides the TRP function. AMF stores the capability of the terminal related to location confirmation and relays the signaling between the location management function and the terminal. AMF may be connected to several base stations. One AMF can be connected to several LMFs. The AMF may initially select the LMF for any terminal. The AMF may select another LMF when the terminal moves to a new cell.

The LMF manages the support of different location services for target UEs, including positioning of UEs and delivery of assistance data to UEs.

The LMF may interact with a target UE in order to deliver assistance data if requested for a particular location service, or to obtain a location estimate if that was requested.

For positioning of a target UE, the LMF decides on the position methods to be used The positioning methods may yield a location estimate for UE-based position methods and/or positioning measurements for UE-assisted and network-based position methods. The LMF may combine all the received results and determine a single location estimate for the target UE (hybrid positioning). Additional information like accuracy of the location estimate and velocity may also be determined.

Figure 1D:
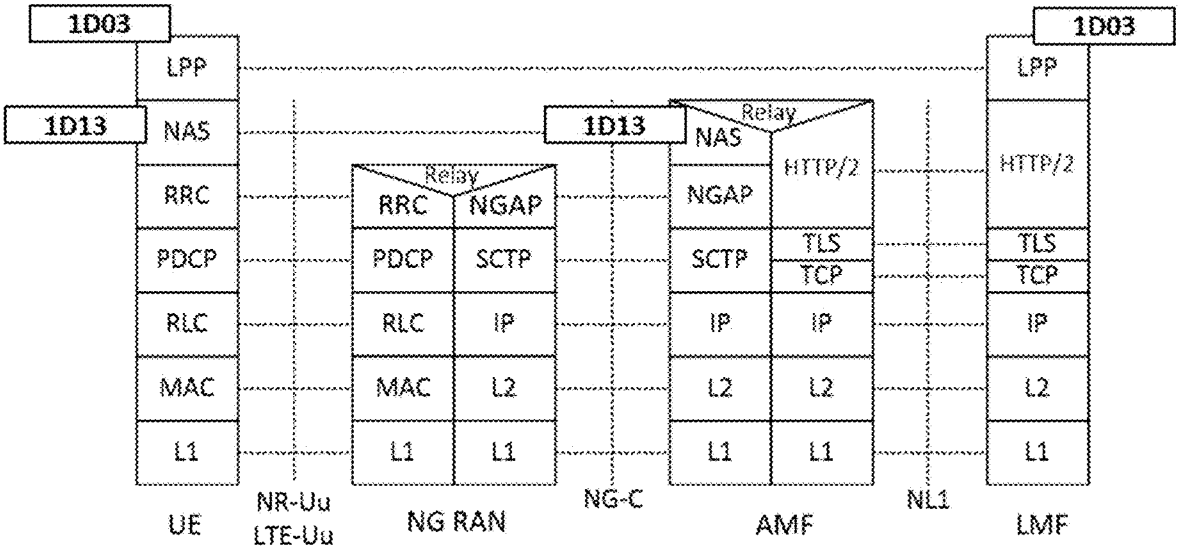
FIG. 1D is a diagram illustrating the protocol architecture of positioning system.

FIG. 1D is a diagram illustrating a protocol hierarchical structure for signaling between a location management function and a terminal according to an embodiment of the present disclosure.

The terminal and LMF exchange signaling through LPP (1D03). LPP defines various control messages related to positioning. The LPP control message is included in the NAS (1D13) message and delivered to the AMF, and the AMF delivers the LPP control message included in the NAS message to the LMF.

LPP is a protocol applied to both LTE and NR. Hereinafter, LPP is also called positioning protocol.

Figure 1E:
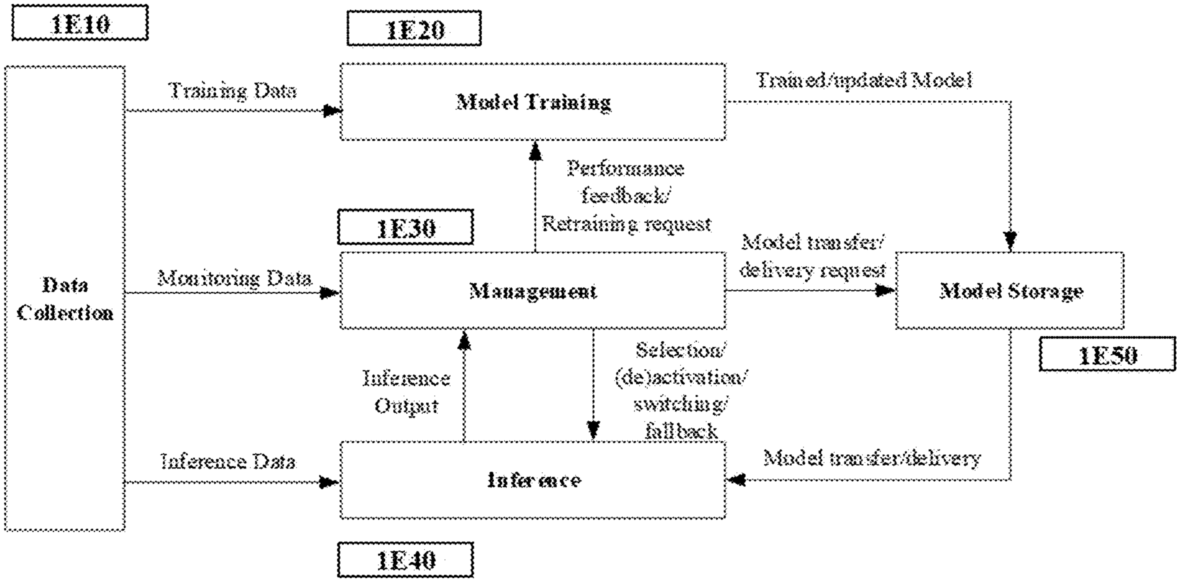
FIG. 1E is a diagram illustrating a Functional framework for AI/ML for NR air interface.

FIG. 1E illustrates functional framework of AI/ML for NR.

Data Collection 1E10 is a function that provides input data to the Model Training, Management, and Inference functions.

>: Training Data: Data needed as input for the AI/ML Model Training function.

>: Monitoring Data: Data needed as input for the Management of AI/ML Models or AI/ML functionalities.

>: Inference Data: Data needed as input for the AI/ML Inference function.

Model Training 1E20 is a function that performs AI/ML model training, validation, and testing which may generate model performance metrics which can be used as part of the model testing procedure. The Model Training function is also responsible for data preparation (e.g., data pre-processing and cleaning, formatting, and transformation) based on Training Data delivered by a Data Collection function, if required.

>: Trained/Updated Model: In case of having a Model Storage function, this is used to deliver trained, validated, and tested AI/ML models to the Model Storage function, or to deliver an updated version of a model to the Model Storage function.

Management 1E30 is a function that oversees the operation (e.g., selection/(de)activation/switching/fallback) and monitoring of AI/ML models or AI/ML functionalities. This function is also responsible for making decisions to ensure the proper inference operation based on data received from the Data Collection function and the Inference function.

>: Selection/(de)activation/switching/fallback: Information needed as input to manage the Inference function. Concerning information may include selection/(de)activation/switching of AI/ML models or AI/ML-based functionalities, fallback to non-AI/ML operation (i.e., not relying on inference process), etc., >: Model Transfer/Delivery Request: Used to request model(s) to the Model Storage function.

>: Performance feedback/Retraining request: Information needed as input for the Model Training function, e.g., for model (re) training or updating purposes.

1E40 Inference is a function that provides outputs from the process of applying AI/ML models or AI/ML functionalities to new data (i.e., Inference Data). The Inference function is also responsible for data preparation (e.g., data pre-processing and cleaning, formatting, and transformation) based on Inference Data delivered by a Data Collection function, if required.

>: Inference Output: Data used by the Management function to monitor the performance of AI/ML models or AI/ML functionalities.

Model Storage 1E50 is a function responsible for storing trained/updated models that can be used to perform the inference process.

>: Model Transfer/Delivery: Used to deliver an AI/ML model to the Inference function.

Figure 2A:
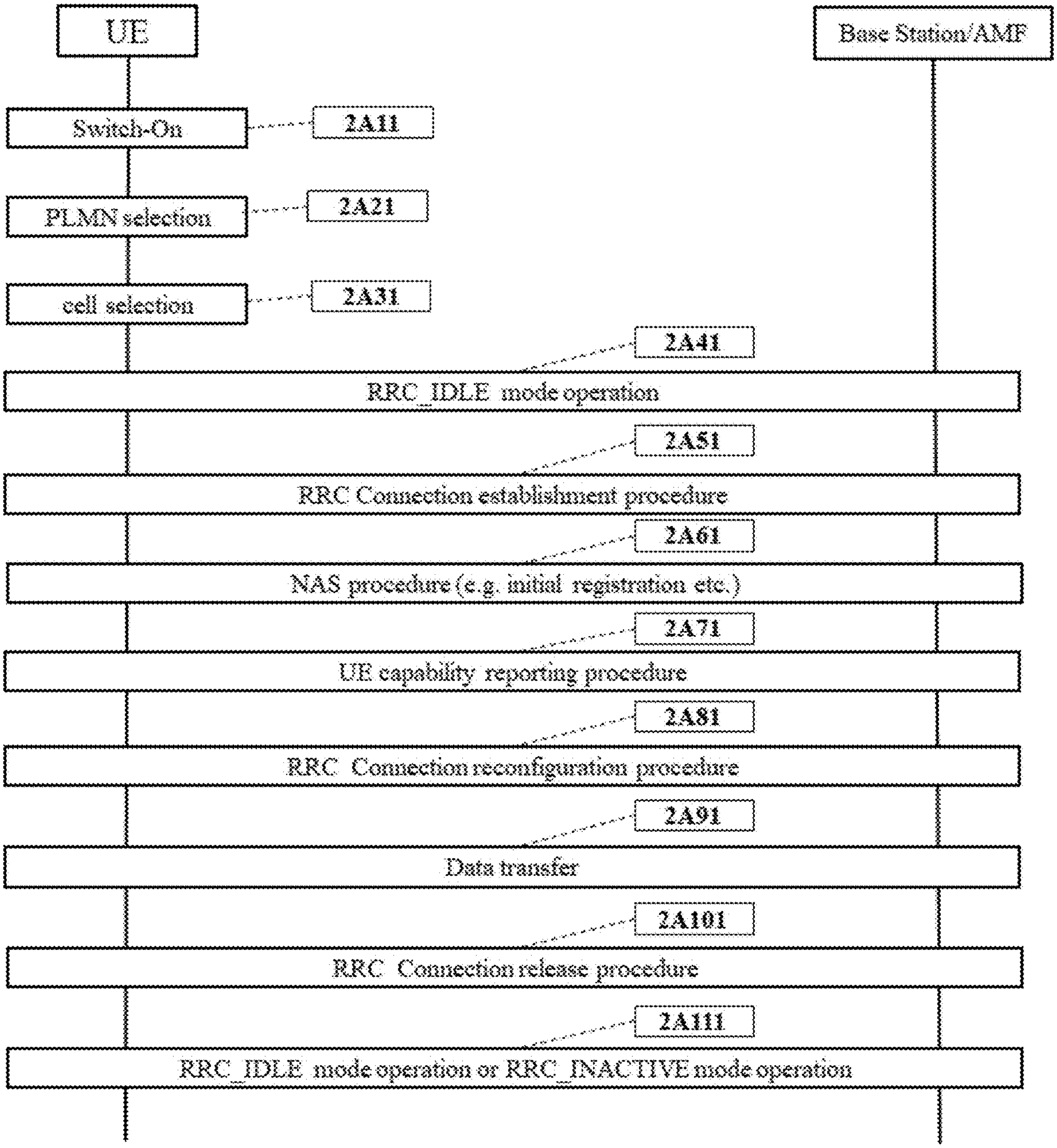
FIG. 2A is a diagram illustrating overall operation of the UE and network.

FIG. 2A illustrates overall operation of the UE and network.

Upon switch-on of the wireless device (e.g. UE) 2A11, UE performs PLMN selection 2A21 to select the carrier that is provided by the PLMN that UE is allowed to register.

Then UE performs cell selection 2A31 to camp on a suitable cell.

Once camping on a suitable cell, UE performs RRC_IDLE mode operation 2A41 such as paging channel monitoring and cell reselection and system information acquisition.

UE performs RRC Connection establishment procedure 2A51 to perform e.g. NAS procedure such as initial registration with the selected PLMN.

After successful RRC connection establishment, UE performs NAS procedure 2A61 by transmitting a corresponding NAS message via the established RRC connection (e.g. SRB1).

The base station can trigger UE capability reporting procedure 2A71 before configuring data bearers and various MAC functions.

The base station and the UE perform RRC connection reconfiguration procedure 2A81. Via the procedure, data radio bearers and logical channels and various MAC functions (such as DRX and BSR and PHR and beam failure reporting etc.) and various RRC functions (such as RRM and RLM and measurement etc.) are configured.

The base station and the UE perform data transfer 2A91 via the established radio bearers and based on configured MAC functions and configured RRC functions.

If geographical location of UE changes such that e.g. the current serving cell is no longer providing suitable radio condition, the base station and the UE perform cell level mobility such as handover or conditional reconfiguration or lower layer triggered mobility.

When RRC connection is no longer needed for the UE because of e.g. no more traffic available for the UE, the base station and the UE perform RRC connection release procedure 2A101. The base station can transit UE state either to RRC_IDLE (if the data activity of the UE is expected low) or to RRC_INACTIVE (if the data activity of the UE is expected high).

The UE performs either RRC_IDLE operation or RRC_INACTIVE mode operation 2A111 until the next event to RRC connection establishment/resumption occurs.

Figure 2B:
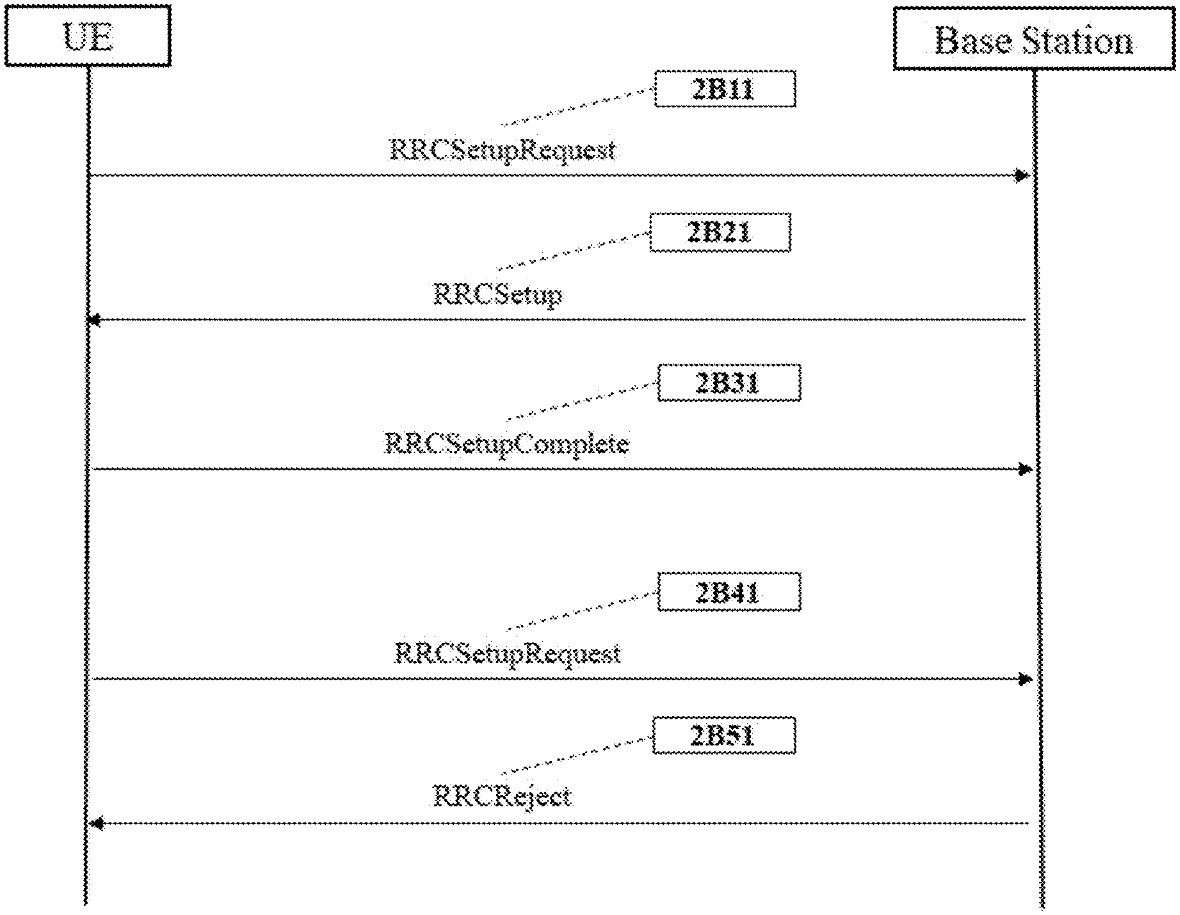
FIG. 2B illustrates RRC connection establishment procedure.

FIG. 2B illustrates RRC connection establishment procedure.

Successful RRC connection establishment procedure comprises:

>1: transmission of RRCSetupRequest by the UE 2B11;

>1: reception of RRCSetup by the UE 2B21;

>1: transmission of RRCSetupComplete by the UE 2B31.

Unsuccessful RRC connection establishment procedure comprises:

>1: transmission of RRCSetupRequest by the UE 2B41;

>1: reception of RRCReject by the UE 2B51;

RRCSetupRequest comprises following fields and IEs:

>1: ue-Identity field contains InitialUE-Identity IE which contains:

>>2: ng-5G-S-TMSI-Part1 field containing a BIT STRING of 39 bit;

>1: establishmentCause field contains Establishment-Cause IE which contains:

>>2 enumerated value indicating either emergency, high-PriorityAccess, mt-Access, mo-Signalling, mo-Data, mo-VoiceCall, mo-VideoCall, mo-SMS, mps-Priority-Access, mcs-Priority Access etc RRCSetup comprises following fields and IEs:

>1: radioBearerConfig field containing a RadioBearer-Config IE;

>1: masterCellGroup field containing a CellGroupConfig IE.

RRCSetupComplete comprises following fields and IEs:

>1: selectedPLMN-Identity field containing an integer indicating selected PLMN;

>1: dedicatedNAS-Message field containing a DedicatedNAS-Message which may contain various NAS message;

>1: ng-5G-S-TMSI-Part2 field containing a BIT STRING of 9 bit.

RRCSetupRequest is transmitted via CCCH/SRB0, which means that the base station does not identify UE transmitting the message based on DCI that scheduling the uplink transmission. The UE includes a field (ue-Identity) in the message so that the base station identify the UE. If 5G-S-TMSI is available (e.g. UE has already registered to a PLMN), the UE sets the field with part of the 5G-S-TMSI. If 5G-S-TMSI is not available (e.g. UE has not registered to any PLMN), the UE sets the field with 39-bit random value.

Upon reception of RRCSetup, UE configures cell group and SRB1 based on the configuration information in the RRCSetup. The UE perform following actions:

>1: perform the cell group configuration procedure in accordance with the received masterCellGroup;

>1: perform the radio bearer configuration procedure in accordance with the received radioBearerConfig;

>1: if stored, discard the cell reselection priority information provided by the cellReselectionPriorities or inherited from another RAT;

>1: enter RRC_CONNECTED;

>1: stop the cell re-selection procedure;

>1: consider the current cell to be the PCell;

The UE transmits to the base station RRCSetupComplete after performing above actions.

Figure 2C:
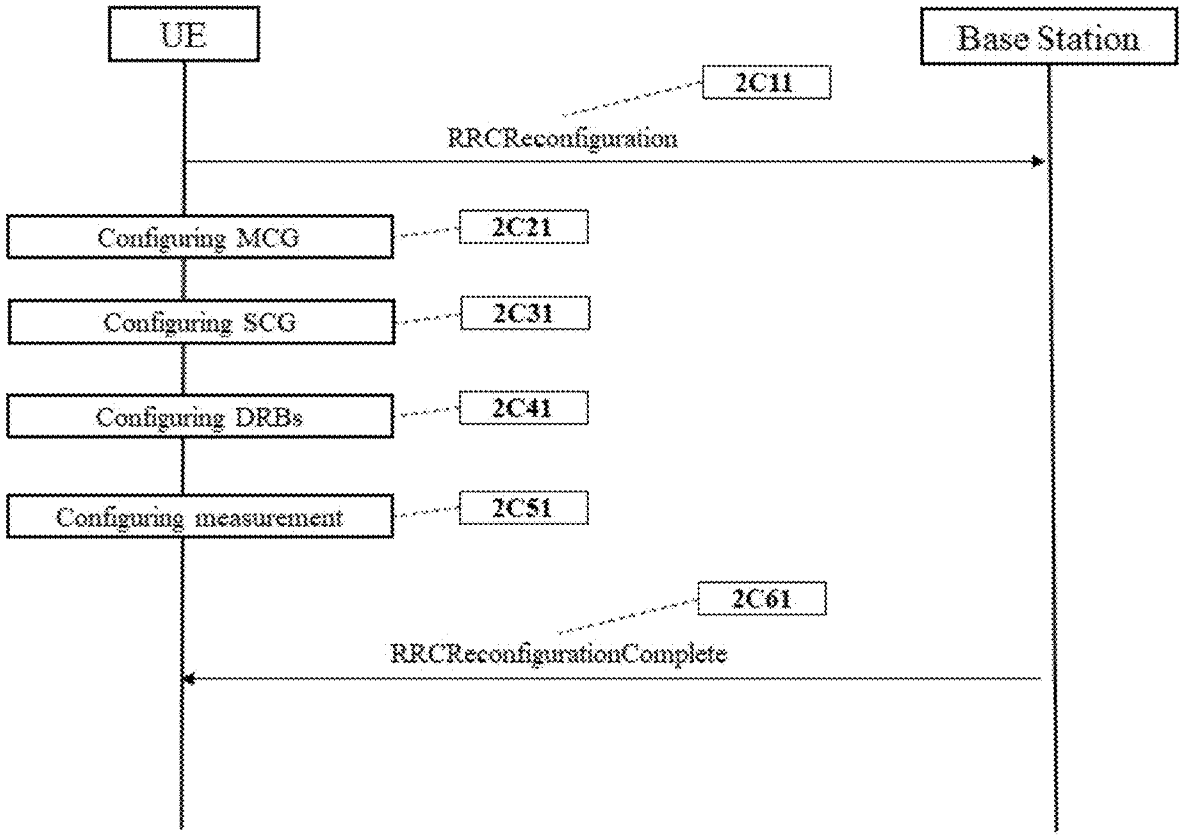
FIG. 2C illustrates RRC connection reconfiguration procedure.

The UE sets the contents of RRCSetupComplete message as follows:

>1: set the ng-5G-S-TMSI-Value to ng-5G-S-TMSI-Part2;

>1: set the selectedPLMN-Identity to the PLMN selected by upper layers from the plmn-IdentityInfoList;

>1: include the s-NSSAI-List and set the content to the values provided by the upper layers;

FIG. 2C illustrates RRC connection reconfiguration procedure.

Based on the reported capability and other factors such as required QoS and call admission control etc, the base station performs RRC reconfiguration procedure with the UE.

RRC reconfiguration procedure is a general purposed procedure that are applied to various use cases such as data radio bearer establishment, handover, cell group reconfiguration, DRX configuration, security key refresh and many others.

RRC reconfiguration procedure consists of exchanging RRCReconfiguration 2C11 and RRCReconfigurationComplete 2C61 between the base station and the UE.

RRCReconfiguration may comprises following fields and IEs:

>1: rrc-TransactionIdentifier field contains a RRC-TransactionIdentifier IE;

>1: radioBearerConfig field contains a RadioBearerConfig IE;

>>2: radioBearerConfig field comprises configuration information for SRBs and DRBs via which RRC messages and user traffic are transmitted and received;

>1: secondaryCellGroup field contains a CellGroupConfig IE;

>>2: secondaryCellGroup field comprises configuration information for secondary cell group;

>>2: A cell group consists of a SpCell and zero or more SCells;

>2: Cell group configuration information comprises cell configuration information for SpCell/SCell and configuration information for MAC and configuration information for logical channel etc;

>1: measConfig field contains a MeasConfig IE;

>>2: measConfig field comprises configuration information for measurements that the UE is required to perform for mobility and other reasons.

>1: masterCellGroup field contains a CellGroupConfig IE;

Upon reception of RRCReconfiguration, UE processes the IEs in the order as below. UE may:

>1: perform the cell group configuration for MCG based on the received masterCellGroup 2C21;

>1: perform the cell group configuration for SCG based on the received secondaryCellGroup 2C31;

>1: perform the radio bearer configuration based on the received radioBearerConfig 2C41;

>1: perform the measurement configuration based on the received measConfig 2C51;

After performing configuration based on the received IEs/fields, the UE transmits the RRCReconfigurationComplete to the base station. To indicate that the RRCReconfigurationComplete is the response to RRCReconfiguration, UE sets the TransactionIdentifier field of the RRCReconfigurationComplete with the value indicated in TransactionIdentifier field of the RRCReconfiguration.

Figure 2D:
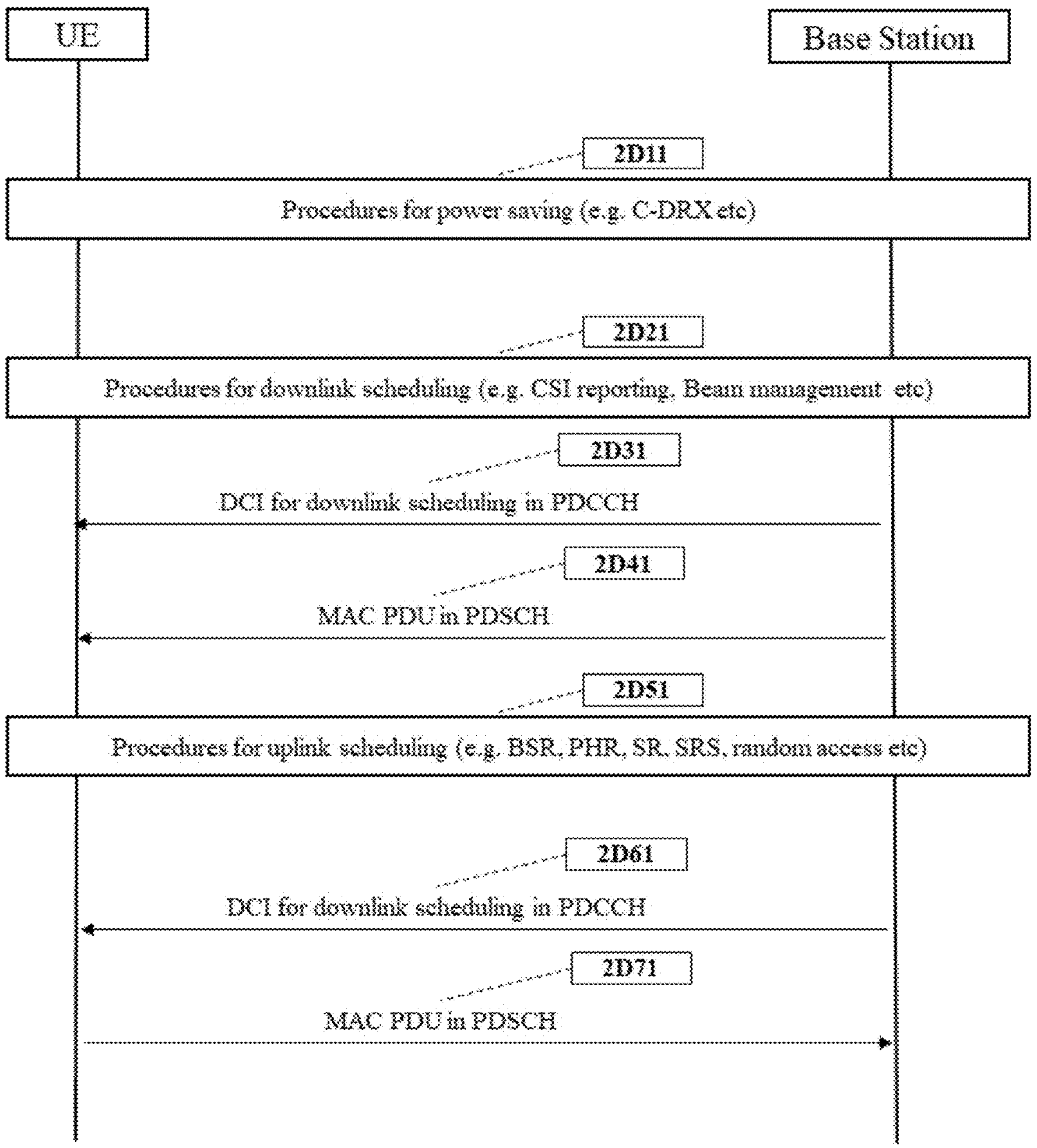
FIG. 2D illustrates data transfer procedure in RRC_CONNECTED state.
Figure 2E:
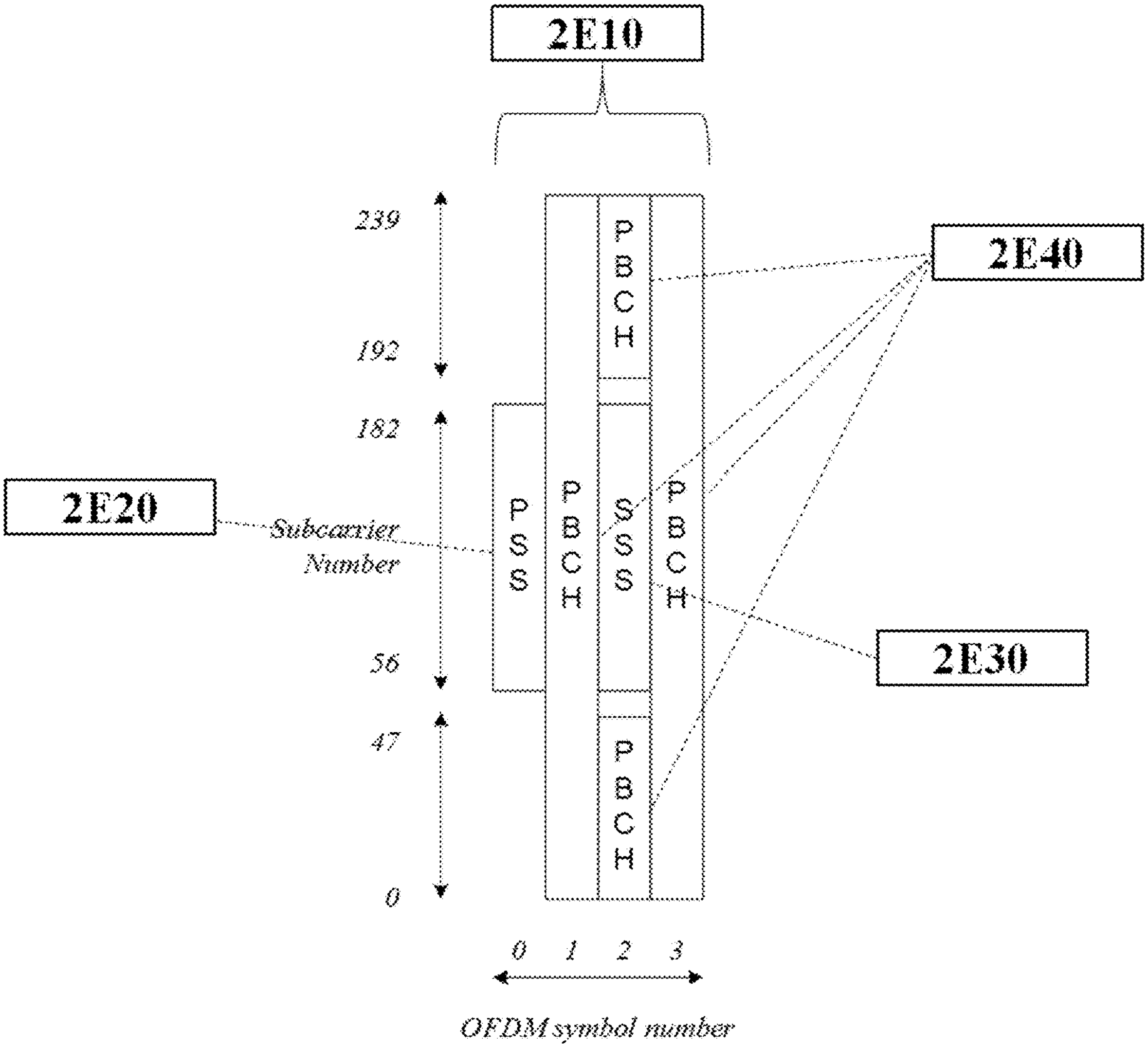
FIG. 2E is a diagram illustrating synchronization signal and PBCH block (SSB) structure.

FIG. 2D illustrates data transfer procedure in RRC_CONNECTED state.

The UE and the base station may perform procedures for power saving such as C-DRX 2D11. The configuration information for C-DRX is provided to the UE within cell group configuration in the RRCReconfiguration.

The UE and the base station may perform various procedures for downlink scheduling 2D21 such as CSI reporting and beam management. The configuration information for CSI reporting is provided to the UE within cell group configuration in the RRCReconfiguration. Beam management is performed across RRC layer and MAC layer and PHY layer. Beam related information is configured via cell group configuration information within RRCReconfiguration. Activation and deactivation of beam is performed by specific MAC CEs.

Based on the reported CSI and downlink traffic for the UE, the base station determines the frequency/time resource and transmission format for downlink transmission. The base station transmits to the UE DCI containing downlink scheduling information via PDCCH 2D31. The base station transmits to the UE PDSCH corresponding to the DCI and containing a MAC PDU 2D41.

The UE and the base station may perform various procedure for uplink scheduling 2D51 such as buffer status reporting and power headroom reporting and scheduling request and random access. The configuration information for those procedures are provided to the UE in cell group configuration information in RRCReconfiguration.

Based on the uplink scheduling information reported by the UE, the base station determines the frequency/time resource and transmission format for uplink transmission. The base station transmits to the UE DCI containing uplink scheduling information via PDCCH 2D61. The base station transmits to the UE PDSCH corresponding to the DCI and containing a MAC PDU 2D71.

The Synchronization Signal and PBCH block (SSB) 2E10 consists of primary synchronization signals (PSS) 2E20 and secondary synchronization signals (SSS) 2E30, PSS and SSS occupies 1 symbol and 127 subcarriers. PBCH 2E40 spans across 3 OFDM symbols and 240 subcarriers. The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

In this disclosure, following terminologies are used.

Associated ID (A-ID): An integer managed by a network entity such as GNB to keep the consistency of AIML operation. The A-ID represents scenario, RAN configuration and network conditions. UE and Network determine whether a AIML model/functionality is applicable based on the A-ID associated with the AIML model/functionality. UE may assume the similar properties of a DL Tx beam or beam set/list associated with the same associated ID. UE may assume the same number/order of DL Tx beams with the same associated ID. A-ID may be unique within a PLMN. An A-ID consists of PLMN-ID part and AMF-ID part and GNB-ID part and local identifier, the local identifier part may consists with cell-id part and cell-specific local identifier part. Alternatively, A-ID consists of OTT server ID part and local identifier part. The OTT server refers to network entity where AIML model training and AIML management function reside. AssociatedID and AssociationID are used interchangeably.

Instead of full A-ID, a short A-ID can be indicated in the DCI/MAC CE. The mapping between the full A-ID and the short A-ID can be explicitly indicated in the RRCReconfiguration message (for example, Alternatively, the mapping can be done based on a predefined rule (e.g. the last n bit of full A-ID is corresponding short A-ID; the part that are assigned by the base station (e.g. GNB-ID part+local identifier) is short A-ID; cell-specific local identifier field; the part that are assigned by the operator etc).

Training profile information: Set of information for an AIML model that is used by UE to determine whether the AIML model is applicable or not. It comprises A-ID and time/frequency information related with trained resource (e.g. periodicity of Set A resource; periodicity of Set B resource; frequency region for Set A resource, frequency region for Set B resource etc.)

AI/ML-enabled Feature: refers to a Feature where AI/ML may be used.

AI/ML Model: A data driven algorithm that applies AI/ML techniques to generate a set of outputs based on a set of inputs.

AI/ML model delivery: A generic term referring to delivery of an AI/ML model from one entity to another entity in any manner.

AI/ML model Inference: A process of using a trained AI/ML model to produce a set of outputs based on a set of inputs.

AI/ML model testing: A subprocess of training, to evaluate the performance of a final AI/ML model using a dataset different from one used for model training and validation. Differently from AI/ML model validation, testing does not assume subsequent tuning of the model.

AI/ML model training: A process to train an AI/ML Model [by learning the input/output relationship] in a data driven manner and obtain the trained AI/ML Model (and associated AID) for inference.

AI/ML model transfer: Delivery of an AI/ML model over the air interface in a manner that is not transparent to 3GPP signalling, either parameters of a model structure known at the receiving end or a new model with parameters. Delivery may contain a full model or a partial model.

AI/ML model validation: A subprocess of training, to evaluate the quality of an AI/ML model using a dataset different from one used for model training, that helps selecting model parameters that generalize beyond the data-set used for model training.

Data collection: A process of collecting data by the network nodes, management entity, or UE for the purpose of AI/ML model training, data analytics and inference.

Federated learning/federated training: A machine learning technique that trains an AI/ML model across multiple decentralized edge nodes (e.g., UEs, gNBs) each performing local model training using local data samples. The technique requires multiple interactions of the model, but no exchange of local data samples.

Functionality identification: A process/method of identifying an AI/ML functionality for the common understanding between the NW and the UE. Note: Information regarding the AI/ML functionality may be shared during functionality identification. Where AI/ML functionality resides depends on the specific use cases and sub use cases.

Management instruction: Information needed to ensure proper inference operation. This information may include selection/(de)activation/switching of AI/ML models or AI/ML functionalities, fallback to non-AI/ML operation, etc.

Model activation: enable an AI/ML model for a specific AI/ML-enabled feature.

Model deactivation: disable an AI/ML model for a specific AI/ML-enabled feature.

Figure 3A:
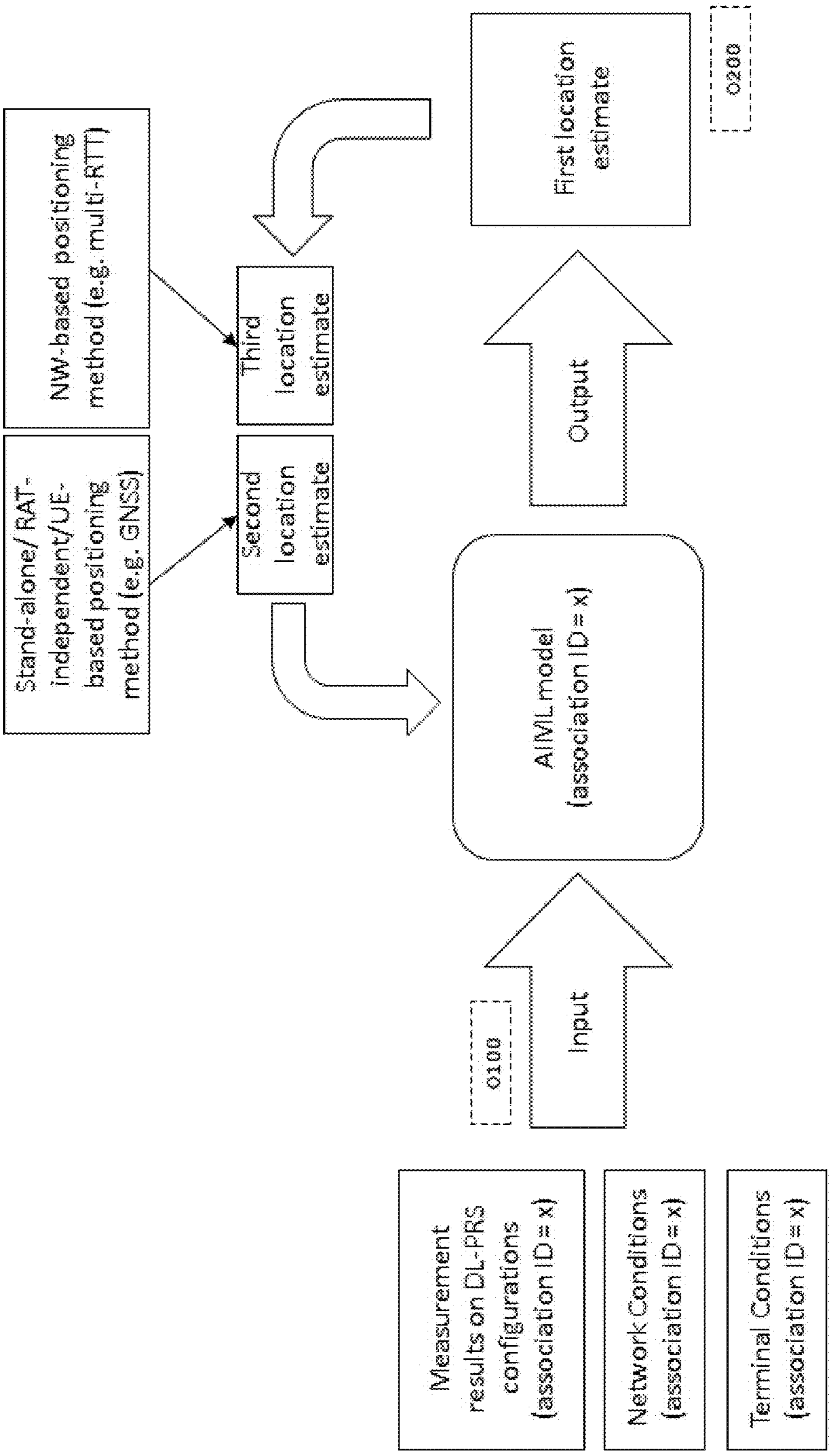
FIG. 3A illustrates training process for AI/ML based positioning.
Figure 3B:
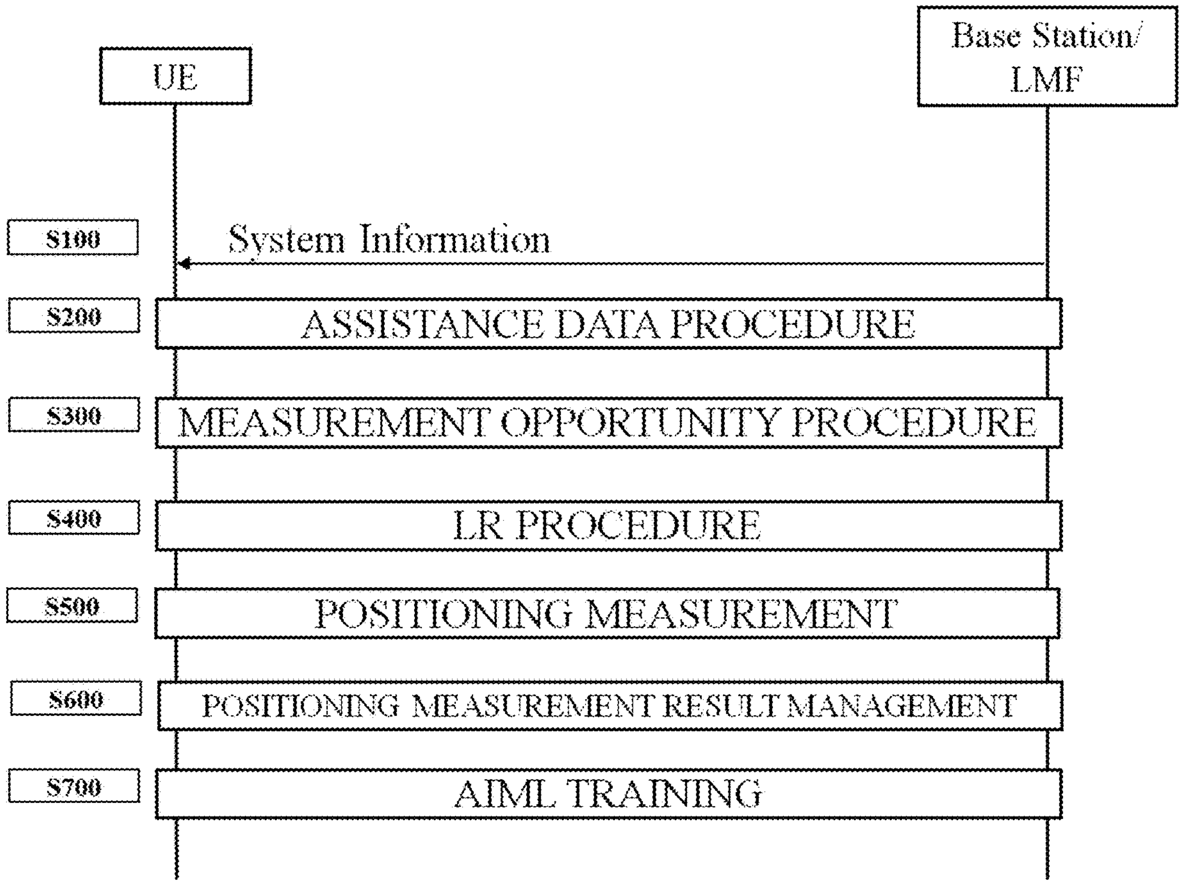
FIG. 3B illustrates overall operation of the UE and network for AIML based positioning.
Figure 3C:
FIG. 3C is a diagram illustrating positioning assistance data.
Figure 3D:
FIG. 3D is a diagram illustrating details of positioning assistance data.
Figure 3E:
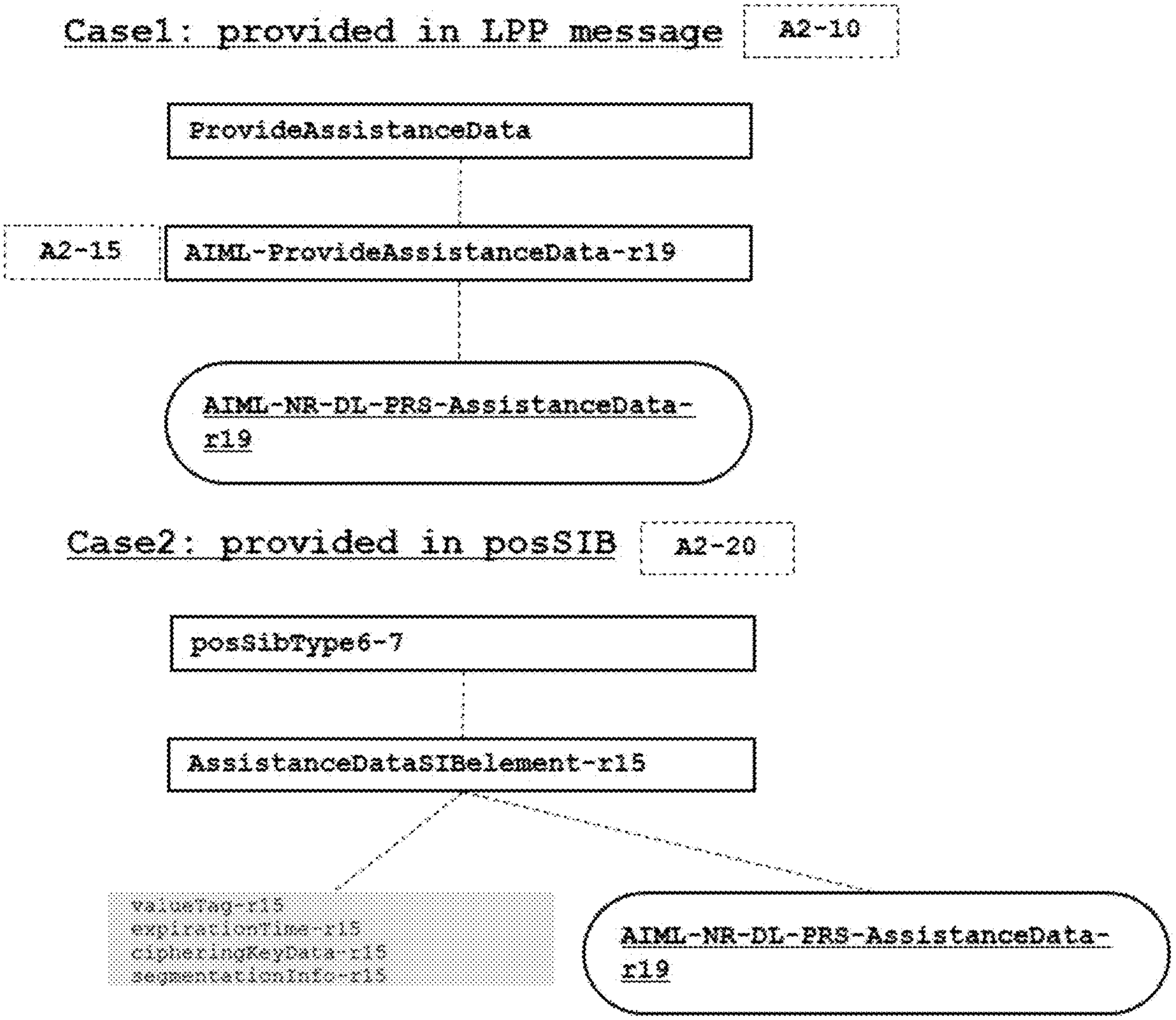
FIG. 3E is a diagram illustrating positioning assistance data for AIML based positioning.
Figure 3F:
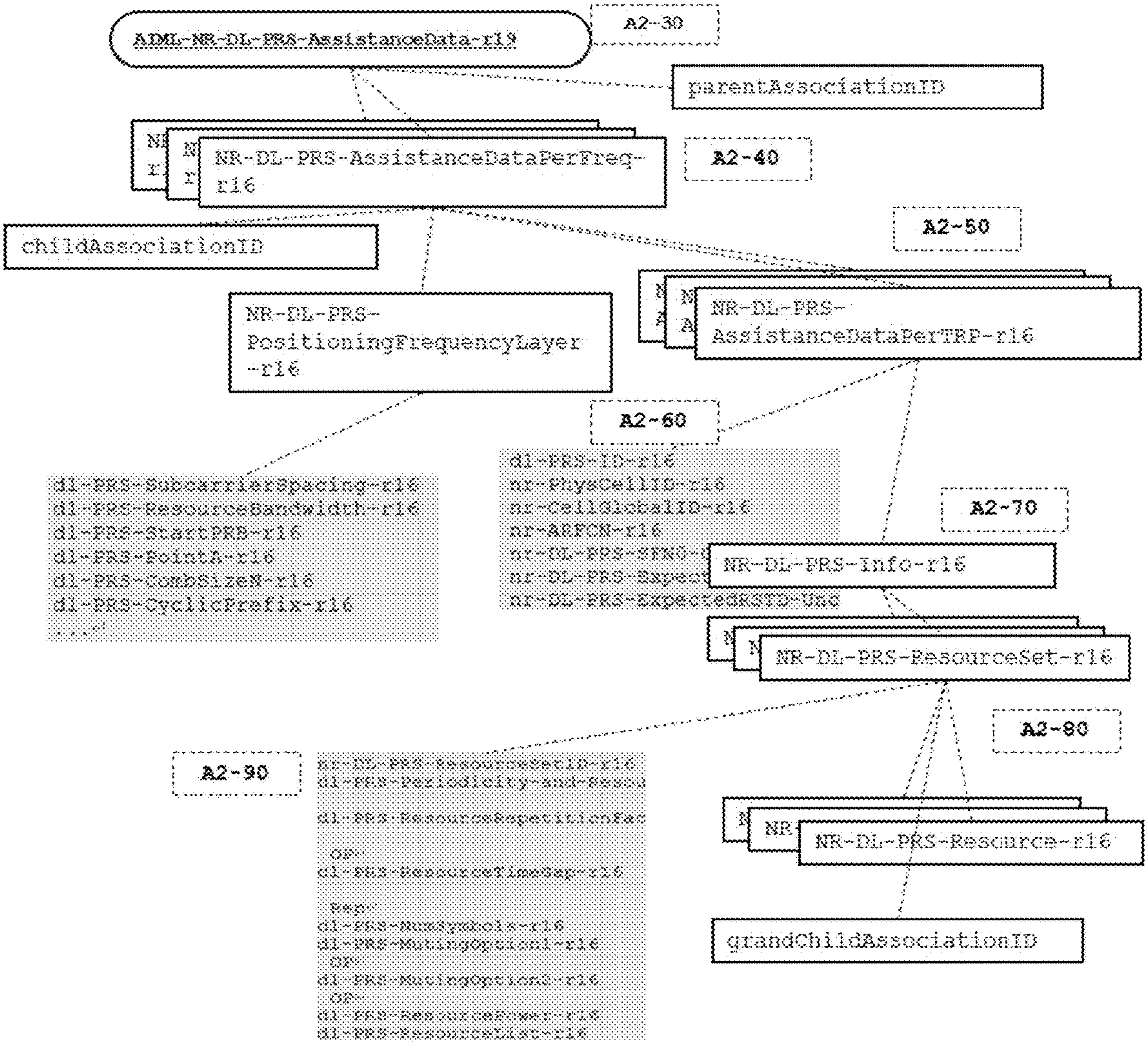
FIG. 3F is a diagram illustrating details of positioning assistance data for AIML based positioning.
Figure 3G:
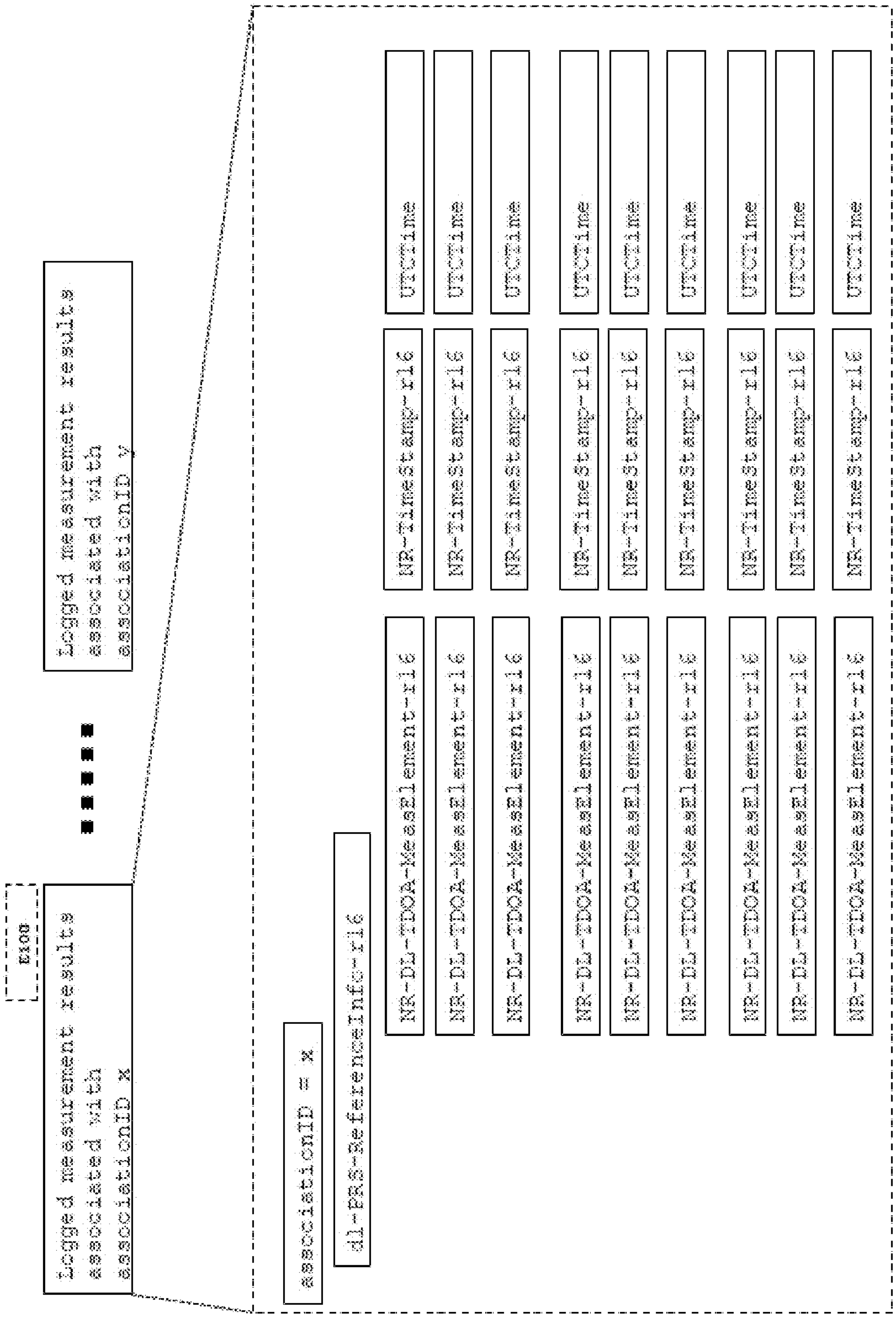
FIG. 3G is a diagram illustrating an example of logged data.
Figure 3H:
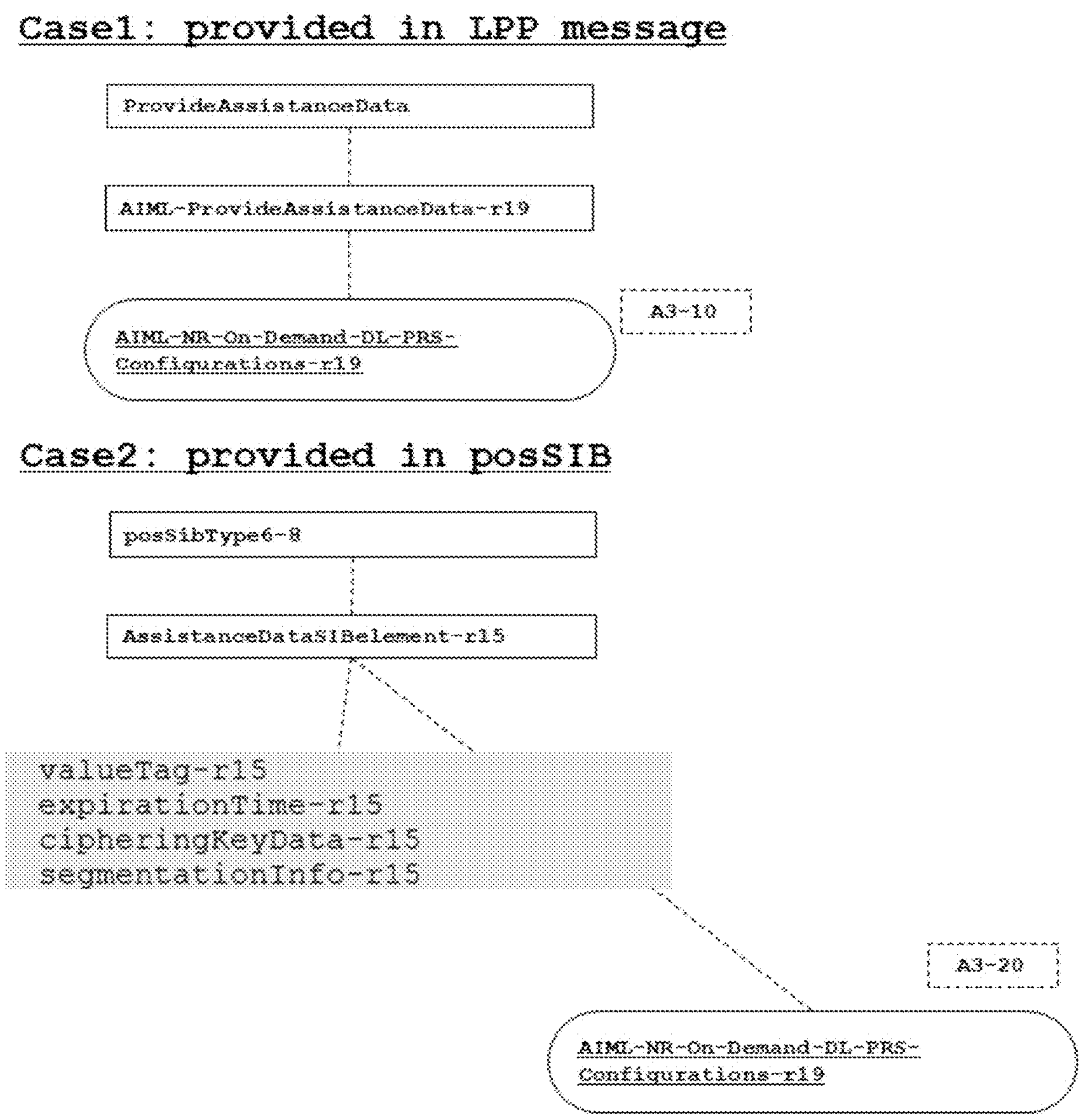
FIG. 3H is a diagram illustrating on demand positioning assistance data.
Figure 3I:
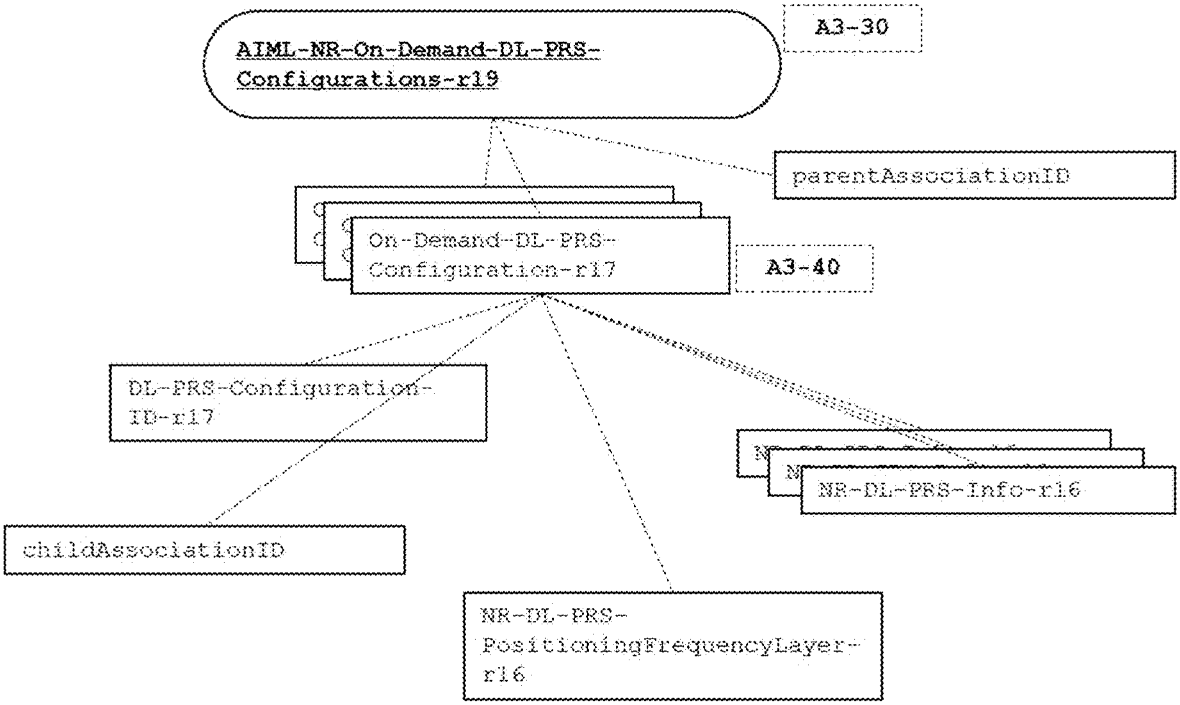
FIG. 3I is a diagram illustrating details of on demand positioning assistance data.

FIG. 3A illustrates AIML model training process.

For UE to perform AIML model training, UE requires followings:

>: Set of first location estimates of the UE as target device:

>>: the first location estimates are determined/calculated by the UE itself based on positioning measurement on DL-PRS and AIML model.

>: Set of second location estimates of the UE:

>>: the second location estimates is determined/calculated by the UE itself based on non-RAT dependent positioning techniques (such as GNSS, WLAN, Bluetooth etc)

>: Set of third location estimates of the UE as LCS client:

>>: the third location estimates are determined/calculated by the LMF based on various positioning measurements taken by various entities.

A location estimate may be equivalent to LocationCoordinates depending on a given circumstances.

First location estimate is determined by the AIML model in UE based on downlink positioning measurement results on DL-PRS.

Second location estimate is determined by stand-alone location equipment such as GNSS in UE.

Third location estimate is determined by the LMF based on various positioning measurement results.

The UE trains the AIML model as follows:

>: Positioning measurement results are input to the AIML model (O100). In addition, network conditions and terminal conditions are input to the AIML model.

>>: Positioning measurement results are obtained from positioning measurement on DL-PRS resource sets that are associated with a specific association ID.

>>: AIML model is associated with the specific association ID.

>>: The network conditions and the terminal conditions are associated with the specific association ID.

>: The model outputs a first location estimate (O200).

>: The UE adjusts the model parameters by comparing the first location estimate with a third location estimate (if available) based on reinforced/supervised learning.

>: If the third location estimate is unavailable, the UE waits for a second location estimate, then compares it with the closest first location estimate.

>: The UE repeats these steps until the AIML model is stable.

To get the first location estimate, UE acquires DL-PRS configuration from the GNB or from the LMF. If system information provides a proper DL-PRS configuration for training, UE can use the DL-PRS configuration in the system information. If system information provides on-demand DL-PRS configuration for training, UE requests LMF to provide the DL-PRS configuration for training.

When DL-PRS configuration is acquired, UE may request GNB to provide measurement gap or PPW so that the terminal can perform positioning measurement.

UE performs positioning measurements when both positioning measurement opportunities (e.g. positioning measurement gap or PPW) are provided and configurations for DL-PRS for training are provided.

To get the second location estimate, UE performs LR (Location Request) procedure.

To get the third location estimates, UE performs stand-alone positioning method such as GNSS.

Followings can be used interchangeably.

>: UTCTime and TimeStamp;

>: label and second location estimate and third location estimate;

>: label and ground-truth;

>: AIML output and output and first location estimate;

>: location estimate and locationCoordinates;

>: location and coordinate

UE may determine to train AIML model for positioning accuracy enhancements. UE performs followings for AI/ML based positioning.

At S100, UE receives system information from the base station. The system information comprises SIB1 and one or more SIs. SIB1 includes scheduling information of the one or more SIs. The one or more SIs may include one or more positioning SIBs. UE may stop the AIML training procedure if the system information does not indicate that AIML training for positioning accuracy is allowed.

At S200, UE performs ASSISTANCE DATA PROCEDURE. S200 can be skipped if UE has acquired assistance data in the system information. UE performs ASSISTANCE DATA PROCEDURE with a specific LMF. The specific LMF is selected by the AMF.

At S300, UE performs MEASUREMENT OPPORTUNITY PROCEDURE. UE performs the procedure with the serving GNB.

At S400, UE performs LR PROCEDURE. UE performs the procedure with the specific LMF.

At S500, UE performs POSITIONING MEASUREMENT.

At S600, UE performs POSITIONING MEASUREMENT RESULT MANAGEMENT.

At S700, UE performs AIML TRAINING based on the UE estimated location and ground level location.

<System Information>

<SIB1 and Scheduling Information>

SIB1 contains information relevant when evaluating if a UE is allowed to access a cell and defines the scheduling of other system information. It also contains radio resource configuration information that is common for all UEs and barring information applied to the unified access control.

The SIB1 comprises SI-SchedulingInfo and PosSI-SchedulingInfo.

The IE SI-SchedulingInfo contains information needed for acquisition of SI messages.

```
-- ASN1START
-- TAG-SI-SCHEDULINGINFO-START
SI-SchedulingInfo ::=                SEQUENCE {
    schedulingInfoList                   SEQUENCE (SIZE (1..maxSI-Message)
OF SchedulingInfo,
    si-WindowLength                          ENUMERATED {s5, s10, s20, s40,
s80, s160, s320, s640, s1280, s2560-v1710, s5120-v1710 },
    si-RequestConfig                                                 SI-RequestConfig
OPTIONAL, -- Cond MSG-1
    si-RequestConfigSUL                                              SI-RequestConfig
OPTIONAL, -- Cond SUL-MSG-1
    system Information AreaID                                BIT STRING (SIZE (24))
OPTIONAL, -- Need R
    ...
}
SchedulingInfo ::=                   SEQUENCE {
    si-BroadcastStatus                         ENUMERATED {broadcasting,
notBroadcasting},
    si-Periodicity                     ENUMERATED {rf8, rf16, rf32, rf64,
rf128, rf256, rf512},
    sib-MappingInfo                    SIB-Mapping
}
SI-SchedulingInfo-v1700 ::=        SEQUENCE {
    schedulingInfoList2-r17            SEQUENCE (SIZE (1..maxSI-Message))
OF SchedulingInfo2-r17,
    dummy                                                        SI-RequestConfig
OPTIONAL
}
SchedulingInfo2-r17 ::=           SEQUENCE {
    si-BroadcastStatus-r17                   ENUMERATED {broadcasting,
notBroadcasting},
    si-WindowPosition-r17              INTEGER (1..256),
    si-Periodicity-r17                 ENUMERATED {rf8, rf16, rf32, rf64,
rf128, rf256, rf512},
    sib-MappingInfo-r17                SIB-Mapping-v1700
}
SIB-Mapping ::=                    SEQUENCE (SIZE (1..maxSIB)) OF SIB-
TypeInfo
SIB-Mapping-v1700 ::=                SEQUENCE (SIZE (1..maxSIB)) OF SIB-
TypeInfo-v1700
SIB-TypeInfo ::=                  SEQUENCE {
    type                               ENUMERATED {sibType2, sibType3,
sibType4, sibType5, sibType6, sibType7, sibType8, sibType9,
                                                                  sibType10-v1610,
sibType11-v1610, sibType12-v1610, sibType13-v1610,
                                                                  sibType14-v1610, spare3,
spare2, spare1,... },
    valueTag                                                          INTEGER (0..31)
OPTIONAL, -- Cond SIB-TYPE
    areaScope                                                     ENUMERATED {true}
OPTIONAL -- Need S
}
SIB-TypeInfo-v1700 ::=               SEQUENCE {
    sib Type-r17                         CHOICE {
   type1-r17                                     ENUMERATED {sibType15,
sibType16, sibType17, sibType18, sibType19, sibType20, sibType21,
                                                        sibType22-v1800,
sibType23-v1800 ,sibType24-v1800, sibType25-v1800,
                                                        sibType17bis-v1820,
```

```
spare4, spare3, spare2, spare1,... },
                    type2-r17                              SEQUENCE {
                         posSibType-r17                                        ENUMERATED
{posSibType1-9, posSibType1-10, posSibType2-24, posSibType2-25,
                                                                   posSibType6-4,
posSibType6-5, posSibType6-6, posSibType2-17a-v1770,
                                                                   posSibType2-18a-
v1770, posSibType2-20a-v1770, posSibType1-11-v1800,
                                                                   posSibType1-12-
v1800, posSibType2-26-v1800, posSibType2-27-v1800,
                                                                   posSibType6-7-
v1800, posSibType7-1-v1800,...,
                                                                   posSibType7-2-
v1800, posSibType7-3-v1800, posSibType7-4-v1800},
                         encrypted-r17                                   ENUMERATED { true }
OPTIONAL, -- Need R
                         gnss-id-r17                                          GNSS-ID-r16
OPTIONAL, -- Need R
                              sbas-id-r17                                     SBAS-ID-r16
OPTIONAL -- Cond GNSS-ID-SBAS
                         }
                    },
                    valueTag-r17                                       INTEGER (0..31)
OPTIONAL, -- Cond NonPosSIB
                    areaScope-r17                                    ENUMERATED {true}
OPTIONAL -- Need S
               }
               -- TAG-SI-SCHEDULINGINFO-STOP
               -- ASN1STOP
               -- ASN1START
               -- TAG-POSSI-SCHEDULINGINFO-START
               PosSI-SchedulingInfo-r16 ::=                SEQUENCE {
                    posSchedulingInfoList-r16                    SEQUENCE (SIZE (1..maxSI-
Message)) OF PosSchedulingInfo-r16,
                    posSI-RequestConfig-r16                                SI-RequestConfig
OPTIONAL, -- Cond MSG-1
                    posSI-RequestConfigSUL-r16                             SI-RequestConfig
OPTIONAL, -- Cond SUL-MSG-1
                    ...,
                    [[
                    posSI-RequestConfigRedCap-r17                          SI-RequestConfig
OPTIONAL -- Cond REDCAP-MSG-1
                    ]],
                    [[
                    posSI-RequestConfigMSG1-Repetition-r18                               SI-
RequestConfigRepetition-r18                  OPTIONAL, -- Cond MSG-1
                    posSI-RequestConfigSUL-MSG1-Repetition-r18                           SI-
RequestConfigRepetition-r18                  OPTIONAL, -- Cond SUL-MSG-1
                    posSI-RequestConfigRedCap-MSG1-Repetition-r18                        SI-
RequestConfigRepetition-r18                  OPTIONAL -- Cond REDCAP-MSG-1
                    ]]
               }
               PosSchedulingInfo-r16 ::= SEQUENCE {
                    offsetToSI-Used-r16                                 ENUMERATED {true}
OPTIONAL, -- Need R
               posSI-Periodicity-r16               ENUMERATED {rf8, rf16, rf32, rf64, rf128,
rf256, rf512},
                    posSI-BroadcastStatus-r16                       ENUMERATED {broadcasting,
notBroadcasting},
                    posSIB-MappingInfo-r16          PosSIB-MappingInfo-r16,
                    ...
               }
               PosSIB-MappingInfo-r16 ::=           SEQUENCE (SIZE (1..maxSIB)) OF PosSIB-
Type-r16
               PosSIB-Type-r16 ::=            SEQUENCE {
                    encrypted-r16                                  ENUMERATED { true }
OPTIONAL, -- Need R
                    gnss-id-r16                                            GNSS-ID-r16
OPTIONAL, -- Need R
                    sbas-id-r16                                            SBAS-ID-r16
OPTIONAL, -- Cond GNSS-ID-SBAS
                    posSibType-r16                         ENUMERATED { posSibType1-1,
posSibType1-2, posSibType1-3, posSibType1-4, posSibType1-5, posSibType1-6,
                                                           posSibType1-7,          posSibType1-8,
posSibType2-1, posSibType2-2, posSibType2-3, posSibType2-4,
                                                           posSibType2-5,          posSibType2-6,
posSibType2-7, posSibType2-8, posSibType2-9, posSibType2-10,
                                                           posSibType2-11,         posSibType2-12,
posSibType2-13, posSibType2-14, posSibType2-15,
```

-continued

```
                                                            posSibType2-16,           posSibType2-17,
posSibType2-18, posSibType2-19, posSibType2-20,
                                                            posSibType2-21,           posSibType2-22,
posSibType2-23, posSibType3-1, posSibType4-1,
                                                            posSibType5-1,            posSibType6-1,
posSibType6-2, posSib Type6-3,... },
            areaScope-r16                                                 ENUMERATED {true}
OPTIONAL -- Need S
      }
      GNSS-ID-r16 ::= SEQUENCE {
            gnss-id-r16                ENUMERATED{gps, sbas, qzss, galileo, glonass,
bds, ..., navic-v1760},
            ...
      }
      SBAS-ID-r16 ::= SEQUENCE {
            sbas-id-r16                ENUMERATED { waas, egnos, msas, gagan, ...},
            ...
      }
      -- TAG-POSSI-SCHEDULINGINFO-STOP
      -- ASN1STOP
```

<SI Acquisition Procedure>

When a User Equipment (UE) needs to acquire a System Information (SI) message in a New Radio (NR) network, it must first determine the precise starting point of the SI-window associated with that particular SI message. The determination process varies depending on how the SI message is configured within the system information blocks. If the SI message is listed in the schedulingInfoList of SIB1, the UE identifies the position number n corresponding to the order of entry in that list, then calculates an integer value x using the formula (n−1)×w, where w represents the si-WindowLength parameter. The SI-window then starts at a specific slot number a, calculated as x mod N, within a radio frame whose System Frame Number (SFN) satisfies the condition SFN mod T=FLOOR(x/N), where T is the periodicity of the SI message and N is the total number of slots in a radio frame. For SI messages configured in schedulingInfoList2, the calculation uses si-WindowPosition instead of the list order, applying the formula x=(si-WindowPosition−1)×w with similar slot and frame determination logic. When the SI message is configured in posSchedulingInfoList without offsetToSI-Used, the UE creates a concatenated list by appending posSchedulingInfoList to schedulingInfoList and determines the window timing based on the message's position in this combined list. If offsetToSI-Used is configured for messages in posSchedulingInfoList, the calculation incorporates an additional offset by first counting SI messages with 8 radio frame periodicity (m) and using the formula x=m×w+(n−1)×w, with the radio frame calculation including an additional offset of 8 frames. Once the SI-window timing is established, the UE begins monitoring the Physical Downlink Control Channel (PDCCH) for scheduling information identified by SI-RNTI starting from the beginning of the SI-window and continues monitoring until either the SI message is successfully received or the SI-window duration, defined by si-WindowLength, expires. If the UE fails to receive the SI message before the SI-window ends, it repeats the reception attempt at the next scheduled SI-window occasion for that particular SI message within the current modification period.

<Positioning SIB and assistanceDataElement>

Following type 1 assistanceDataElement are acquired based on SI-SchedulingInfo-v1700.

posSibType6-4 NR-TRP-BeamAntennaInfo
posSibType6-5 NR-DL-PRS-TRP-TEG-Info
posSibType6-7 NR-PRU-DL-Info
posSibType6-6 NR-On-Demand-DL-PRS-Configurations Following type 2 assistanceDataElement are acquired based on PosSchedulingInfo-r16.

posSibType1-1 GNSS-ReferenceTime
posSibType1-2 GNSS-ReferenceLocation
posSibType1-3 GNSS-IonosphericModel
posSibType1-4 GNSS-EarthOrientationParameters
posSibType1-5 GNSS-RTK-ReferenceStationInfo
posSibType1-6 GNSS-RTK-CommonObservationInfo
posSibType2-1 GNSS-TimeModelList
posSibType2-2 GNSS-DifferentialCorrections
posSibType2-3 GNSS-NavigationModel
posSibType6-1 NR-DL-PRS-AssistanceData
posSibType6-2 NR-UEB-TRP-LocationData
posSibType6-3 NR-UEB-TRP-RTD-Info Type1 positioning SIBs (scheduled by SI-SchedulingInfo-v1700) can be transmitted in a same SI.

Type2 positioning SIBs (scheduled by PosSchedulingInfo-r16) can be transmitted in a same SI.

Type1 positioning SIB and Type2 positioning SIB are not transmitted in a single SI. Type1 positioning SIB and Type2 positioning SIB are transmitted in different SIs.

For AIML, new assistanceDataElements can be defined; AIML-NR-DL-PRS-AssistanceData and AIML-NR-On-Demand-DL-PRS-Configurations.

Both AIML-NR-DL-PRS-AssistanceData and AIML-NR-On-Demand-DL-PRS-Configurations are transmitted in new type 1 positioning SIBs. Type 1 positioning SIB has better scheduling flexibility than type 2 positioning SIB.

Alternatively AIML-NR-DL-PRS-AssistanceData is transmitted in posSibType6-1 (type 2 positioning SIB) and AIML-NR-On-Demand-DL-PRS-Configurations is transmitted in posSibType6-6 (type 1 positioning SIB). With this approach, the existing positioning SIB and existing assistaanceDataElements are reused.

<Assistance Data for Legacy Positioning>

NR-DL-PRS-AssistanceData-r16 is used by the location server to provide DL-PRS assistance data. This IE is provided to the UE via LPP message (ProvideAssistanceData) or via system information. As illustrated in A1-10, the IE can be included in ProvideAssistanceData message. As illustrated in A1-20, the IE can be included in AssistanceDataSIBelement-r15 in posSibType6-1.

he NR-DL-PRS-AssistanceData Information Element is utilized by a location server to provide downlink positioning reference signal (DL-PRS) assistance data to user equipment for positioning purposes in New Radio (NR) systems. This assistance data is hierarchically structured, comprising one or more NR-DL-PRS-AssistanceDataPerFreq-r16 elements, each corresponding to a specific positioning frequency layer with associated transmission-reception points (TRPs). Each frequency layer element includes an NR-DL-PRS-PositioningFrequencyLayer-r16 that defines common configuration parameters such as subcarrier spacing, resource bandwidth, starting physical resource block (PRB) index, point A frequency reference, comb size, and cyclic prefix length, which are uniformly applied to all TRPs operating within that frequency layer. Within each frequency layer, multiple NR-DL-PRS-AssistanceDataPerTRP-r16 elements provide TRP-specific information including DL-PRS identifier, physical cell identity, cell global identity, frequency information, system frame number (SFN) offset, expected reference signal time difference (RSTD) with associated uncertainty, and detailed DL-PRS resource configuration. The SFN offset information specifies the time alignment between each TRP and a reference TRP, including both radio frame offset and subframe offset components, enabling the UE to establish proper timing relationships. The expected RSTD value indicates the anticipated time difference measurement between signals received from a specific TRP and the reference TRP, accounting for both propagation delay differences and transmission timing offsets, while the RSTD uncertainty defines a search window within which the UE should expect to receive the DL-PRS signal. Each TRP's DL-PRS information is further organized into resource sets (NR-DL-PRS-ResourceSet-r16), where each resource set contains configuration parameters and multiple DL-PRS resources (NR-DL-PRS-Resource-r16) that share common settings within the set. The assistance data may optionally include expected angle of departure (AoD) or angle of arrival (AoA) information in the global coordinate system, specifying both azimuth and zenith angles with corresponding uncertainty values to assist in angular measurement and positioning calculations. For advanced positioning scenarios, the system supports DL-PRS bandwidth aggregation through NR-DL-PRS-AggregationInfo-r18, which links two or three DL-PRS resource sets across different frequency layers by referencing their respective frequency layer indices, TRP indices, and resource set indices. Additionally, the assistance data structure supports PRS-only transmission points through the prs-OnlyTP indicator, signaling to the UE that no other signals or physical channels beyond DL-PRS are transmitted from that particular point, thereby optimizing measurement procedures and resource utilization.

```
-- ASN1START
    NR-DL-PRS-AssistanceData-r16 ::= SEQUENCE {
        nr-DL-PRS-ReferenceInfo-r16                    DL-PRS-ID-Info-r16,
        nr-DL-PRS-AssistanceDataList-r16                              SEQUENCE (SIZE
(1..nrMaxFreqLayers-r16)) OF
                                                                 NR-DL-PRS-
AssistanceDataPerFreq-r16,
        nr-DL-PRS-AggregationInfo-r18                    NR-DL-PRS-AggregationInfo-r18
OPTIONAL,
        ...
    }
    NR-DL-PRS-AssistanceDataPerFreq-r16 ::= SEQUENCE {
        nr-DL-PRS-PositioningFrequencyLayer-r16                                   NR-DL-PRS-
PositioningFrequencyLayer-r16,
        nr-DL-PRS-AssistanceDataPerFreq-r16                           SEQUENCE (SIZE
(1..nrMaxTRPsPerFreq-r16)) OF
                                                                NR-DL-PRS-
AssistanceDataPerTRP-r16,
        ...
    }
    NR-DL-PRS-AssistanceDataPerTRP-r16 ::= SEQUENCE {
        dl-PRS-ID-r16                                   INTEGER (0..255),
        nr-PhysCellID-r16                                      NR-PhysCellID-r16
OPTIONAL,
        nr-DL-PRS-SFN0-Offset-r16                              NR-DL-PRS-SFN0-
Offset-r16,
        nr-DL-PRS-ExpectedRSTD-r16                                     INTEGER (–
3841..3841),
        nr-DL-PRS-ExpectedRSTD-Uncertainty-r16         INTEGER (0..246),
        nr-DL-PRS-Info-r16                                NR-DL-PRS-Info-r16,
        nr-DL-PRS-ExpectedAoD-or-AoA-r17                                  NR-DL-PRS-
ExpectedAoD-or-AoA-r17      OPTIONAL,
        ...
    }
    NR-DL-PRS-PositioningFrequencyLayer-r16 ::= SEQUENCE {
        dl-PRS-SubcarrierSpacing-r16       ENUMERATED {kHz15, kHz30, kHz60,
kHz120, ...},
        dl-PRS-ResourceBandwidth-r16           INTEGER (1..63),
        dl-PRS-StartPRB-r16                    INTEGER (0..2176),
        dl-PRS-PointA-r16                         ARFCN-ValueNR-r15,
        dl-PRS-CombSizeN-r16                        ENUMERATED {n2, n4, n6, n12, ...},
        ...
    }
    NR-DL-PRS-AggregationInfo-r18 ::= SEQUENCE (SIZE (1..nrMaxNumPRS-
BandWidthAggregation-r18)) OF
                                          NR-linkedDL-PRS-ResourceSetID-
PRS-AggregationList-r18
```

-continued

```
NR-linkedDL-PRS-ResourceSetID-PRS-AggregationList-r18 ::= SEQUENCE
(SIZE (2..3)) OF
                                        NR-DL-PRS-AggregationElement-r18
-- ASN1STOP
```

The NR-DL-PRS-Info Information Element defines the complete downlink positioning reference signal (DL-PRS) configuration for transmission-reception points (TRPs) in New Radio (NR) positioning systems, organizing resources in a hierarchical structure of resource sets and individual resources. Each DL-PRS configuration contains one or more resource sets (NR-DL-PRS-ResourceSet-r16), where each resource set is uniquely identified by a resource set identifier that remains consistent across all frequency layers for a given TRP. The resource set configuration specifies critical timing parameters including periodicity and slot offset relative to system frame number (SFN) zero and slot zero, determining when the first DL-PRS resource of the set occurs within the transmission timeline. Resource repetition can be configured through the resource repetition factor parameter, which specifies how many times each DL-PRS resource is repeated within a single instance of the resource set, with supported values ranging from one to thirty-two repetitions, and an associated time gap parameter defines the slot offset between consecutive repeated instances of the same resource. The configuration includes symbol allocation information specifying the number of OFDM symbols per DL-PRS resource within a slot, ranging from one to twelve symbols, enabling flexible resource utilization based on coverage and accuracy requirements. Advanced muting capabilities are supported through two muting options, where Option-1 muting uses a bitmap pattern with configurable bit repetition factors to indicate transmission (bit value '1') or non-transmission (bit value '0') of DL-PRS resources across consecutive resource set instances. Each resource set contains multiple DL-PRS resources (NR-DL-PRS-Resource-r16), with each resource characterized by a unique resource identifier, a sequence identifier for pseudo-random sequence generation, comb size and resource element offset configuration for frequency domain positioning, and temporal positioning parameters including slot offset and symbol offset within the slot. The quasi-co-location (QCL) information can be specified for each DL-PRS resource, establishing spatial relationship assumptions by referencing either a synchronization signal block (SSB) from the serving or neighboring cell with associated physical cell identity and SSB index, or another DL-PRS resource identified by its resource and resource set identifiers for Type-D QCL associations. Resource power configuration specifies the average energy per resource element (EPRE) in dBm for all resource elements carrying the DL-PRS, with the user equipment assuming constant EPRE across all resource elements of a given DL-PRS resource to maintain consistent signal characteristics. Additionally, the configuration supports prioritization mechanisms through resource priority subsets that associate groups of DL-PRS resources for the purpose of prioritizing angle-of-departure (AoD) measurements and reporting, enabling efficient resource utilization in scenarios requiring selective measurement focus.

```
-- ASN1START
NR-DL-PRS-Info-r16 ::= SEQUENCE {
    nr-DL-PRS-ResourceSetList-r16                    SEQUENCE        (SIZE
(1..nrMaxSetsPerTrpPerFreqLayer-r16)) OF
                                        NR-DL-PRS-ResourceSet-r16,
    ...
}
NR-DL-PRS-ResourceSet-r16 ::= SEQUENCE {
    nr-DL-PRS-ResourceSetID-r16                              NR-DL-PRS-
ResourceSetID-r16,
    dl-PRS-Periodicity-and-ResourceSetSlotOffset-r16         NR-DL-PRS-
Periodicity-and-ResourceSetSlotOffset-r16,
    dl-PRS-ResourceRepetitionFactor-r16                      ENUMERATED
{n2, n4, n6, n8, n16, n32, ...}        OPTIONAL,
    dl-PRS-Resource TimeGap-r16
ENUMERATED {s1, s2, s4, s8, s16, s32, ...}        OPTIONAL,
    dl-PRS-NumSymbols-r16
ENUMERATED {n2, n4, n6, n12, ... , n1-v1800 },
    dl-PRS-MutingOption1-r16                                    DL-PRS-
MutingOption1-r16                       OPTIONAL,
    dl-PRS-ResourcePower-r16                                 INTEGER (–
60..50),
    dl-PRS-ResourceList-r16                                  SEQUENCE
(SIZE (1..nrMaxResourcesPerSet-r16)) OF
                                                             NR-DL-PRS-
Resource-r16,
    ...
}
DL-PRS-MutingOption1-r16 ::= SEQUENCE {
    dl-prs-MutingBitRepetitionFactor-r16         ENUMERATED {n1, n2, n4, n8,
...}    OPTIONAL,
    nr-option1-muting-r16                        NR-MutingPattern-r16,
    ...
}
NR-MutingPattern-r16 ::= CHOICE {
    po2-r16          BIT STRING (SIZE(2)),
```

-continued

```
            po4-r16         BIT STRING (SIZE(4)),
            po8-r16         BIT STRING (SIZE(8)),
            po16-r16        BIT STRING (SIZE(16)),
            po32-r16        BIT STRING (SIZE(32)),
            ...
        }
        NR-DL-PRS-Resource-r16 ::= SEQUENCE {
        nr-DL-PRS-ResourceID-r16                               NR-DL-PRS-ResourceID-r16,
        dl-PRS-SequenceID-r16                                  INTEGER (0..4095),
        dl-PRS-CombSizeN-AndReOffset-r16                       CHOICE {
                n2-r16      INTEGER (0..1),
                n4-r16      INTEGER (0..3),
                n6-r16      INTEGER (0..5),
                n12-r16     INTEGER (0..11),
                ...
            },
            dl-PRS-ResourceSlotOffset-r16                                          INTEGER
(0..nrMaxResourceOffsetValue-1-r16),
            dl-PRS-ResourceSymbolOffset-r16                    INTEGER (0..12),
            dl-PRS-QCL-Info-r16                                          DL-PRS-QCL-Info-r16
OPTIONAL,
            ...
        }
        DL-PRS-QCL-Info-r16 ::= CHOICE {
            ssb-r16             SEQUENCE {
                pci-r16                 NR-PhysCellID-r16,
                ssb-Index-r16           INTEGER (0..63)
            },
            dl-PRS-r16          SEQUENCE {
                qcl-DL-PRS-ResourceID-r16               NR-DL-PRS-ResourceID-r16,
                qcl-DL-PRS-ResourceSetID-r16            NR-DL-PRS-ResourceSetID-r16
            }
        }
        -- ASN1STOP
```

The IE DL-PRS-ID-Info provides the IDs of the reference TRPs' DL-PRS Resources.

```
  -- ASN1START
  DL-PRS-ID-Info-r16 ::= SEQUENCE {
  dl-PRS-ID-r16                              INTEGER (0..255),
  nr-DL-PRS-ResourceID-List-r16SEQUENCE (SIZE (1..nrMaxResourceIDs-r16))
OF
  NR-DL-PRS-ResourceID-r16
                                        OPTIONAL, -- Need ON
  nr-DL-PRS-ResourceSetID-r16           NR-DL-PRS-ResourceSetID-r16
                                        OPTIONAL -- Need ON
  }
  -- ASN1STOP
```

nr-DL-PRS-ResourceID-List: This field provides a list of DL-PRS Resource IDs under the same DL-PRS Resource Set.

The NR-DL-PRS-BeamInfo Information Element is provided by the location server to convey spatial direction information and integrity bounds for downlink positioning reference signal (DL-PRS) resources, organized hierarchically by frequency layers and transmission-reception points (TRPs) to support beam-based positioning measurements. This information element is structured with multiple layers, where NR-DL-PRS-BeamInfoPerFreqLayer-r16 contains beam information for all TRPs operating within a specific frequency layer, and each TRP's beam information (NR-DL-PRS-BeamInfoPerTRP-r16) includes identification parameters such as DL-PRS identifier, physical cell identity, cell global identity, and frequency information to uniquely identify the signal source. The beam information can be provided either directly for each TRP or indirectly through an associated-DL-PRS-ID reference, which allows a TRP to inherit beam configuration from another associated TRP, thereby reducing signaling overhead when multiple TRPs share similar beam characteristics. Coordinate system translation is supported through the lcs-GCS-TranslationParameter field, which provides three rotation angles (bearing angle α, downtilt angle β, and slant angle γ) for converting beam directions from a Local Coordinate System (LCS) to a Global Coordinate System (GCS), with the absence of this parameter indicating that beam directions are already provided in GCS coordinates. For each DL-PRS resource within a resource set, the beam information element specifies the boresight direction through azimuth and elevation angles with both coarse (one-degree resolution) and fine (0.1-degree resolution) granularity, where azimuth is measured counter-clockwise from geographical North in GCS or from the x-axis in LCS, and elevation is measured from zenith toward the horizon in GCS or from the z-axis toward the x-y plane in LCS. To support integrity and quality assessment of beam information, the configuration includes NR-IntegrityBeamInfoBounds-r18, which provides statistical characterization of beam direction uncertainty through mean and standard deviation values for both azimuth and elevation angles, enabling the user equipment to evaluate the reliability of the provided spatial direction information. This comprehensive beam information structure enables advanced positioning techniques such as angle-of-departure (AoD) measurements and beam-specific RSTD calculations, while the flexible referencing mechanism and coordinate system support accommodate diverse network deployment scenarios including distributed antenna systems and repeater configurations.

```
-- ASN1START
NR-DL-PRS-BeamInfo-r16 ::= SEQUENCE (SIZE (1..nrMaxFreqLayers-r16)) OF
                    NR-DL-PRS-BeamInfoPerFreqLayer-r16
NR-DL-PRS-BeamInfoPerFreqLayer-r16          ::=          SEQUENCE          (SIZE
(1..nrMaxTRPsPerFreq-r16)) OF
                              NR-DL-PRS-BeamInfoPerTRP-
r16
NR-DL-PRS-BeamInfoPerTRP-r16 ::= SEQUENCE {
    dl-PRS-ID-r16                    INTEGER (0..255),
    nr-PhysCellID-r16                       NR-PhysCellID-r16
OPTIONAL,
    associated-DL-PRS-ID-r16                    INTEGER (0..255)
OPTIONAL,
    lcs-GCS-TranslationParameter-r16        LCS-GCS-TranslationParameter-
r16     OPTIONAL,
    dl-PRS-BeamInfoSet-r16                  DL-PRS-BeamInfoSet-r16
OPTIONAL,
    ...
}
DL-PRS-BeamInfoSet-r16              ::=                SEQUENCE
(SIZE(1..nrMaxSetsPerTrpPerFreqLayer-r16)) OF
                    DL-PRS-BeamInfoResourceSet-r16
DL-PRS-BeamInfoResourceSet-r16             ::=             SEQUENCE
(SIZE(1..nrMaxResourcesPerSet-r16)) OF
                         DL-PRS-BeamInfoElement-r16
DL-PRS-BeamInfoElement-r16 ::= SEQUENCE {
    dl-PRS-Azimuth-r16               INTEGER (0..359),
    dl-PRS-Azimuth-fine-r16                     INTEGER (0..9)
OPTIONAL,
    dl-PRS-Elevation-r16                      INTEGER (0..180)
OPTIONAL,
    dl-PRS-Elevation-fine-r16                   INTEGER (0..9)
OPTIONAL,
    nr-IntegrityBeamInfoBounds-r18      NR-IntegrityBeamInfoBounds-r18
OPTIONAL,
    ...
}
NR-IntegrityBeamInfoBounds-r18 ::= SEQUENCE {
    meanAzimuth-r18          INTEGER (0..255),
    stdDevAzimuth-r18        INTEGER (0..255),
    meanElevation-r18        INTEGER (0..255),
    stdDevElevation-r18      INTEGER (0..255),
    ...
}
-- ASN1STOP
```

SSB transmission is defined through multiple parameters including halfFrameIndex indicating the five-millisecond offset within a ten-millisecond system frame, ssb-periodicity specifying the transmission periodicity ranging from five to one hundred sixty milliseconds, and sfn-SSB-Offset indicating the ten-millisecond system frame offset within the SSB periodicity cycle. The ssb-PositionsInBurst field uses a bitmap representation (short, medium, or long) to indicate The NR-SSB-Config Information Element defines the synchronization signal block (SSB) configuration for transmission-reception points in New Radio (NR) systems, providing essential parameters for SSB transmission timing, power, and frequency characteristics. The configuration specifies the physical cell identity (nr-PhysCellID), the absolute radio frequency channel number (NR-ARFCN) corresponding to the first resource element of the SSB's resource block number ten, and the average energy per resource element (ss-PBCH-BlockPower) in dBm for secondary synchronization signals. Temporal positioning of which SSB indices are actually transmitted within a half-frame, where each bit position corresponds to a specific SS/PBCH block index with bit value '1' indicating transmission and '0' indicating non-transmission. Additionally, the configuration includes ssb-SubcarrierSpacing to specify the subcarrier spacing of the SSB, with values of fifteen or thirty kilohertz applicable for frequency range one (FR1) and one hundred twenty or two hundred forty kilohertz for frequency range two (FR2), ensuring proper demodulation and timing synchronization.

```
-- ASN1START
NR-SSB-Config-r16 ::= SEQUENCE {
    nr-PhysCellID-r16            NR-PhysCellID-r16,
    nr-ARFCN-r16                    ARFCN-ValueNR-r15,
    ss-PBCH-BlockPower-r16        INTEGER (-60..50),
    halfFrameIndex-r16           INTEGER (0..1),
```

-continued

```
            ssb-periodicity-r16             ENUMERATED {ms5, ms10, ms20, ms40,
ms80, ms160, ...},
            ssb-PositionsInBurst-r16        CHOICE {
                shortBitmap-r16                     BIT STRING (SIZE (4)),
                mediumBitmap-r16                        BIT STRING (SIZE (8)),
                longBitmap-r16                        BIT STRING (SIZE (64))
            }                                   OPTIONAL,
            ssb-SubcarrierSpacing-r16         ENUMERATED {kHz15, kHz30, kHz60,
kHz120, kHz240, ...},
            sfn-SSB-Offset-r16                  INTEGER (0..15),
            ...
    }
    -- ASN1STOP
```

The IE NR-UEB-TRP-LocationData is used in the assistanceDataElement if the posSibType in IE PosSIB-Type indicates 'posSibType6-2'.

```
-- ASN1START
NR-UEB-TRP-LocationData-r16 ::= SEQUENCE {
nr-trp-LocationInfo-r16                       NR-TRP-LocationInfo-r16,
nr-dl-prs-BeamInfo-r16                        NR-DL-PRS-BeamInfo-r16
                OPTIONAL, -- Need ON
...
}
-- ASN1STOP
```

The NR-TRP-LocationInfo Information Element is provided by the location server to convey the geographical coordinates of transmission-reception points (TRPs) and their associated antenna reference points (ARPs), organized hierarchically by frequency layers and resource sets with comprehensive integrity information to support high-accuracy positioning in New Radio (NR) systems. This information element is structured to support multiple frequency layers through NR-TRP-LocationInfoPerFreqLayer-r16, where each frequency layer contains a reference point serving as the coordinate origin for defining relative locations of all TRPs within that layer, with the flexibility to inherit the reference point from the previous frequency layer entry if not explicitly specified. Each TRP within a frequency layer is identified through multiple parameters including DL-PRS identifier, physical cell identity, cell global identity, and frequency information (NR-ARFCN), enabling unambiguous identification of the signal source across the network topology. The TRP location can be specified in two coordinate representations: geodetic coordinates (trp-Location) providing latitude, longitude, and altitude information, or local Cartesian coordinates (trp-LocationCartesian) providing x, y, and z offsets relative to the reference point, allowing flexibility based on deployment scenarios and computational preferences. To reduce signaling overhead in scenarios where multiple TRPs share the same physical location, the associated-DL-PRS-ID field enables a TRP to reference and inherit location information from another associated TRP, eliminating redundant location data transmission. Integrity information for TRP locations is provided through NR-IntegrityTRP-LocationBounds-r18, which specifies an overbounding statistical model characterized by mean and standard deviation values for location error bounds in both horizontal and vertical directions, with configurable units (millimeters, centimeters, or meters) to accommodate varying precision requirements. Beyond the TRP-level location, the information element supports hierarchical antenna reference point specification at the resource set level through trp-DL-PRS-ResourceSets-r16, where each DL-PRS resource set can have its own ARP location defined relative to the TRP location, accommodating distributed antenna systems and multi-panel configurations. For resource sets, the dl-PRS-ResourceSetARP or dl-PRS-ResourceSetARP-Cartesian field specifies the antenna reference point location relative to the TRP location, with the absence of these fields indicating that the resource set ARP coincides with the TRP location. Each resource set can contain multiple DL-PRS resources with individually specified antenna reference points through the dl-PRS-Resource-ARP-List field, enabling resource-level spatial diversity characterization where each resource within a set may be transmitted from slightly different physical locations or antenna elements. The dl-PRS-Resource-ARP-location or dl-PRS-Resource-ARP-locationCartesian field within the resource ARP list specifies each resource's antenna reference point relative to the resource set ARP, with coordinate cascading ensuring that if these fields are absent, the resource ARP coincides with the resource set ARP. Integrity bounds are provided at each hierarchical level-TRP, resource set, and individual resource-through consistently structured fields (nr-IntegrityTRP-LocationBounds, nr-IntegrityDL-PRS-ResourceSetARP-LocationBounds, nr-IntegrityDL-PRS-ResourceARP-LocationBounds) that all use the same statistical overbounding model with horizontal and vertical mean and standard deviation components. The integrity information enables the user equipment and positioning algorithms to assess location quality, compute protection levels for safety-critical applications, and perform consistency checks between measurements and expected signal characteristics based on geometric relationships. This hierarchical location specification structure with three levels (TRP, resource set, resource) provides the necessary granularity to model complex antenna architectures including massive MIMO systems, distributed antenna systems, repeaters, and remote radio heads, where different DL-PRS resources may originate from physically separated antenna elements. The dual coordinate system support (geodetic and Cartesian) throughout the hierarchy ensures compatibility with both global navigation satellite system (GNSS)-based positioning workflows that operate in geodetic coordinates and local positioning systems that utilize Cartesian coordinates for computational efficiency. The comprehensive integrity information at all hierarchical levels enables advanced positioning techniques such as integrity monitoring, fault detection and exclusion, and safety-of-life applications that require guaranteed accuracy bounds with statistical confidence levels for critical infrastructure and autonomous systems.

```
-- ASN1START
NR-TRP-LocationInfo-r16 ::= SEQUENCE (SIZE (1..nrMaxFreqLayers-r16)) OF
                                NR-TRP-LocationInfoPerFreqLayer-r16
NR-TRP-LocationInfoPerFreqLayer-r16 ::= SEQUENCE {
    referencePoint-r16                              ReferencePoint-r16
OPTIONAL,
    trp-LocationInfoList-r16            SEQUENCE (SIZE (1..nrMaxTRPsPerFreq-
r16)) OF
                                        TRP-LocationInfoElement-r16,
    ...
}
TRP-LocationInfoElement-r16 ::= SEQUENCE {
    dl-PRS-ID-r16                               INTEGER (0..255),
    nr-PhysCellID-r16                                   NR-PhysCellID-r16
OPTIONAL,
    associated-DL-PRS-ID-r16                            INTEGER (0..255)
OPTIONAL,
    trp-Location-r16                                  RelativeLocation-r16
OPTIONAL,
    trp-LocationCartesian-r18                   RelativeCartesianLocation-
r18         OPTIONAL,
    nr-IntegrityTRP-LocationBounds-r18                                 NR-
IntegrityLocationBounds-r18             OPTIONAL,
    trp-DL-PRS-ResourceSets-r16                                   SEQUENCE
(SIZE(1..nrMaxSetsPerTrpPerFreqLayer-r16)) OF
                                                DL-PRS-ResourceSets-
TRP-Element-r16         OPTIONAL,
    ...
}
DL-PRS-ResourceSets-TRP-Element-r16 ::= SEQUENCE {
    dl-PRS-ResourceSetARP-r16
RelativeLocation-r16                    OPTIONAL,
    dl-PRS-ResourceSetARP-Cartesian-r18
RelativeCartesianLocation-r18           OPTIONAL,
    nr-IntegrityDL-PRS-ResourceSetARP-LocationBounds-r18              NR-
IntegrityLocationBounds-r18         OPTIONAL,
    dl-PRS-Resource-ARP-List-r16
SEQUENCE (SIZE(1..nrMaxResourcesPerSet-r16)) OF
                                                                      DL-
PRS-Resource-ARP-Element-r16 OPTIONAL,
    ...
}
DL-PRS-Resource-ARP-Element-r16 ::= SEQUENCE {
    dl-PRS-Resource-ARP-location-r16
RelativeLocation-r16                    OPTIONAL,
    dl-PRS-Resource-ARP-locationCartesian-r18
RelativeCartesianLocation-r18           OPTIONAL,
    nr-IntegrityDL-PRS-ResourceARP-LocationBounds-r18                 NR-
IntegrityLocationBounds-r18         OPTIONAL,
    ...
}
NR-IntegrityLocationBounds-r18 ::= SEQUENCE {
    units-r18                           ENUMERATED {mm, cm, m, ...},
    meanLocationErrorBound-r18          SEQUENCE {
        horizontal-r18                      INTEGER (0..255),
        vertical-r18                        INTEGER (0..255)
    },
    stdDevLocationErrorBound-r18        SEQUENCE {
        horizontal-r18                      INTEGER (0..255),
        vertical-r18                        INTEGER (0..255)
    },
    ...
}
-- ASN1STOP
```

The IE NR-UEB-TRP-RTD-Info is used in the assistanceDataElement if the posSibType in IE PosSIB-Type indicates 'posSibType6-3'.

```
-- ASN1START
NR-UEB-TRP-RTD-Info-r16 ::= SEQUENCE {
nr-rtd-Info-r16                                   NR-RTD-Info-r16,
...
}
-- ASN1STOP
```

The IE NR-RTD-Info is used by the location server to provide time synchronization information between a reference TRP and a list of neighbour TRPs together with integrity information.

```
-- ASN1START
NR-RTD-Info-r16 ::= SEQUENCE {
referenceTRP-RTD-Info-r16               ReferenceTRP-RTD-Info-r16,
rtd-InfoList-r16                        RTD-InfoList-r16,
...
}
ReferenceTRP-RTD-Info-r16 ::= SEQUENCE {
dl-PRS-ID-Ref-r16                             (INTEGER (0..255),
nr-PhysCellID-Ref-r16                   NR-PhysCellID-r16
OPTIONAL,          -- Need ON
nr-CellGlobalID-Ref-r16                       NCGI-r15
          OPTIONAL,            -- Need ON
nr-ARFCN-Ref-r16                              ARFCN-ValueNR-r15
OPTIONAL,          -- Need ON
refTime-r16                                         CHOICE {
          systemFrameNumber-r16                     BIT STRING (SIZE
(10)),
          utc-r16                                         UTCTime,
          ...
},
rtd-RefQuality-r16                            NR-TimingQuality-r16
OPTIONAL,          -- Need ON
...
}
RTD-InfoList-r16 ::= SEQUENCE (SIZE (1..nrMaxFreqLayers-r16)) OF RTD-
InfoListPerFreqLayer-r16
RTD-InfoListPerFreqLayer-r16 ::= SEQUENCE (SIZE(1. . nrMaxTRPsPerFreq-
r16)) OF RTD-InfoElement-r16
RTD-InfoElement-r16 ::= SEQUENCE {
dl-PRS-ID-r16                                 INTEGER (0..255),
nr-PhysCellID-r16                             NR-PhysCellID-r16
OPTIONAL,          -- Need ON
nr-CellGlobalID-r16                           NCGI-r15
          OPTIONAL,          -- Need ON
nr-ARFCN-r16                                  ARFCN-ValueNR-r15
OPTIONAL,          -- Need ON
subframeOffset-r16                            INTEGER (0..1966079),
rtd-Quality-r16                               NR-TimingQuality-r16,
...,
[[
nr-IntegrityRTD-InfoBounds-r18NR-IntegrityRTD-InfoBounds-r18
OPTIONAL -- Need OR
]]
}
NR-IntegrityRTD-InfoBounds-r18 ::= SEQUENCE {
resolution-r18                                ENUMERATED {mdot1, m1,
m10, m30, ...},
meanRTD-r18                                         INTEGER (0..255),
stdDevRTD-r18                                 INTEGER (0..31),
...
}
-- ASN1STOP
```

The NR-TRP-BeamAntennaInfo Information Element is provided by the location server to convey comprehensive beam antenna pattern information for transmission-reception points (TRPs), including relative power characteristics of DL-PRS resources across different spatial directions with associated integrity bounds, organized hierarchically by frequency layers and TRPs to support advanced angle-based positioning and beam modeling. This information element is structured to support multiple frequency layers and TRPs, where each TRP is identified through DL-PRS identifier, physical cell identity, and optionally cell global identity and frequency information, with the flexibility to reference beam antenna information from an associated TRP through the associated-DL-PRS-ID field to reduce signaling overhead when multiple TRPs share similar antenna characteristics. The spatial representation uses azimuth and elevation angles with both coarse (one-degree) and fine (0.1-degree) resolution, organized in a nested structure where each azimuth angle contains multiple elevation angles (up to 1801 entries), and each elevation angle contains a list of beam power elements (2 to maxNumResourcesPerAngle entries) specifying relative power for different DL-PRS resources at that spatial direction. The beamPowerList for each angle-pair defines relative power relationships between DL-PRS resources, where the first element represents the peak power normalized to zero dB for that direction, and subsequent elements specify power relative to this peak with up to 30 dB attenuation range and 0.1 dB fine granularity, enabling detailed antenna pattern characterization including resource-specific beam shapes identified by resource set and resource identifiers. Coordinate system translation is supported through lcs-GCS-TranslationParameter providing bearing, downtilt, and slant angles to convert between Local Coordinate System (LCS) and Global Coordinate System (GCS), and integrity information is provided through NR-IntegrityBeamPowerBounds-r18 specifying mean and standard deviation of beam power error bounds to enable reliability assessment of the antenna pattern information for positioning calculations.

```
-- ASN1START
NR-TRP-BeamAntennaInfo-r17 ::=          SEQUENCE (SIZE (1..nrMaxFreqLayers-r16)) OF
                                        NR-TRP-BeamAntennaInfoPerFreqLayer-r17
NR-TRP-BeamAntennaInfoPerFreqLayer-r17      ::=     SEQUENCE    (SIZE (1..nrMaxTRPsPerFreq-r16)) OF
                                        NR-TRP-Beam AntennaInfoPerTRP-r17
NR-TRP-BeamAntennaInfoPerTRP-r17 ::= SEQUENCE {
    dl-PRS-ID-r17                           INTEGER (0..255),
    nr-PhysCellID-r17                       NR-PhysCellID-r16       OPTIONAL,
    associated-DL-PRS-ID-r17                INTEGER (0..255)        OPTIONAL,
    lcs-GCS-TranslationParameter-r17        LCS-GCS-TranslationParameter-r16       OPTIONAL,
    nr-TRP-BeamAntennaAngles-r17            NR-TRP-Beam AntennaAngles-r17       OPTIONAL,
    ...
}
NR-TRP-BeamAntennaAngles-r17 ::= SEQUENCE (SIZE(1..3600)) OF
                                NR-TRP-BeamAntennaInfoAzimuthElevation-r17
NR-TRP-BeamAntennaInfoAzimuthElevation-r17 ::= SEQUENCE {
    azimuth-r17                 INTEGER     (0..359)    OPTIONAL,
    azimuth-fine-r17            INTEGER     (0..9)      OPTIONAL,
    elevationList-r17       SEQUENCE (SIZE(1..1801)) OF ElevationElement-R17,
    ...
}
ElevationElement-R17 ::= SEQUENCE {
    elevation-r17               INTEGER     (0..180)    OPTIONAL,
    elevation-fine-r17          INTEGER     (0..9)      OPTIONAL,
    beamPowerList-r17           SEQUENCE    (SIZE (2..maxNumResourcesPerAngle-r17)) OF
                            BeamPowerElement-r17,
    ...
}
BeamPowerElement-r17 ::= SEQUENCE {
    nr-dl-prs-ResourceSetID-r17         NR-DL-PRS-ResourceSetID-r16     OPTIONAL,
    nr-dl-prs-ResourceID-r17            NR-DL-PRS-ResourceID-r16,
    nr-dl-prs-RelativePower-r17         INTEGER (0..30),
    nr-dl-prs-RelativePowerFine-r17             INTEGER     (0..9)      OPTIONAL,
    nr-IntegrityBeamPowerBounds-r18     NR-IntegrityBeamPowerBounds-r18       OPTIONAL,
    ...
}
NR-IntegrityBeamPowerBounds-r18 ::= SEQUENCE {
    meanBeamPower-r18           INTEGER (0..127),
    stdDevBeamPower-r18         INTEGER (0..127),
    ...
}
-- ASN1STOP
```

The NR-DL-PRS-TRP-TEG-Info Information Element is provided by the location server to convey the association between DL-PRS resources and TRP transmission Timing Error Groups (Tx TEGs), organized hierarchically by frequency layers and TRPs, where each TRP is identified through DL-PRS identifier, physical cell identity, cell global identity, and frequency information. For each TRP, the dl-PRS-TEG-InfoSet field specifies the TRP Tx TEG identifier associated with each DL-PRS resource, maintaining structural correspondence with the resource list order in NR-DL-PRS-Info to enable unambiguous resource-to-TEG mapping, which allows the user equipment to understand which resources share common timing characteristics and can be grouped for timing error modeling. Additionally, the nr-TRP-TxTEG-TimingErrorMargin field provides a timing error margin value applicable to all TRP Tx TEGs within a single TRP entry, enabling the user equipment to account for potential timing uncertainties when performing time-of-

```
-- ASN1START
NR-DL-PRS-TRP-TEG-Info-r17 ::= SEQUENCE (SIZE (1..nrMaxFreqLayers-r16)) OF
        NR-DL-PRS-TRP-TEG-InfoPerFreqLayer-r17
NR-DL-PRS-TRP-TEG-InfoPerFreqLayer-r17 ::= SEQUENCE (SIZE (1..nrMaxTRPsPerFreq-r16)) OF
        NR-DL-PRS-TRP-TEG-InfoPerTRP-r17
NR-DL-PRS-TRP-TEG-InfoPerTRP-r17 ::= SEQUENCE {
    dl-PRS-ID-r17                    INTEGER (0..255),
    nr-PhysCellID-r17                NR-PhysCellID-r16    OPTIONAL,
    dl-PRS-TEG-InfoSet-r17           SEQUENCE (SIZE(1..nrMaxSetsPerTrpPerFreqLayer-r16)) OF
        DL-PRS-TEG-InfoPerResourceSet-r17,
    nr-TRP-TxTEG-TimingErrorMargin-r17    TEG-TimingErrorMargin-r17    OPTIONAL,
    ...
}
DL-PRS-TEG-InfoPerResourceSet-r17 ::= SEQUENCE (SIZE(1..nrMaxResourcesPerSet-r16)) OF
        DL-PRS-TEG-InfoElement-r17
DL-PRS-TEG-InfoElement-r17 ::= SEQUENCE {
    dl-prs-trp-Tx-TEG-ID-r17    INTEGER (0..maxNumOfTRP-TxTEGs-1-r17),
    ...
}
-- ASN1STOP
```

The NR-PRU-DL-Info Information Element is provided by the location server to convey carrier phase measurements and associated reference signal measurements collected by a Positioning Reference Unit (PRU) for supporting UE-based downlink time difference of arrival (DL-TDOA) positioning at a target user equipment. This information element includes the PRU's location coordinates (nr-PRU-Location-Info-r18), carrier phase measurement information for DL-TDOA calculations (nr-PRU-DL-TDOA-MeasInfo-r18), angle-of-departure measurement information (nr-PRU-DL-AoD-MeasInfo-r18), and detailed reference signal carrier phase (RSCP) measurements (nr-PRU-RSCP-MeasInfo-r18) with associated downlink positioning reference signal received power (DL-PRS-RSRP) and first path RSRP measurements for each transmission-reception point identified by DL-PRS identifier, physical cell identity, and resource identifiers. The RSCP measurement information for each TRP includes temporal characterization through timestamps, line-of-sight/non-line-of-sight indicators applicable per TRP or per resource, phase quality indicators, and support for multiple sample measurements with differential encoding to enable statistical analysis and multipath characterization, while additional measurements for up to three resources per TRP can be provided with resource set and resource identifiers to capture spatial diversity and improve positioning accuracy through combining measurements from multiple DL-PRS resources.

```
-- ASN1START
NR-PRU-DL-Info-r18 ::= SEQUENCE {
    nr-PRU-LocationInfo-r18          LocationCoordinates    OPTIONAL,
    nr-PRU-DL-TDOA-MeasInfo-r18      NR-DL-TDOA-SignalMeasurementInformation-r16    OPTIONAL,
    nr-PRU-DL-AoD-MeasInfo-r18       NR-DL-AoD-SignalMeasurementInformation-r16    OPTIONAL,
    nr-PRU-RSCP-MeasInfo-r18         NR-PRU-RSCP-MeasurementInformation-r18    OPTIONAL,
    ...
}
NR-PRU-RSCP-MeasurementInformation-r18 :: = SEQUENCE (SIZE(1..nrMaxTRPs-r16)) OF
        NR-PRU-RSCP-MeasElement-r18
NR-PRU-RSCP-MeasElement-r18 ::= SEQUENCE {
    dl-PRS-ID-r18                    INTEGER (0..255),
    nr-PhysCellID-r18                NR-PhysCellID-r16    OPTIONAL,
    nr-DL-PRS-ResourceID-r18         NR-DL-PRS-ResourceID-r16    OPTIONAL,
    nr-DL-PRS-ResourceSetID-r18      NR-DL-PRS-ResourceSetID-r16 OPTIONAL,
    nr-TimeStamp-r18                 NR-TimeStamp-r16,
    nr-los-nlos-Indicator-r18        CHOICE {
        perTRP                LOS-NLOS-Indicator-r17,
```

-continued

```
        perResource            LOS-NLOS-Indicator-r17
      }                                                              OPTIONAL,
      nr-RSCP-r18                                                       INTEGER
(0..3599)      OPTIONAL,
      nr-DL-PRS-RSRP-Result-r18                                         INTEGER
(0..126)       OPTIONAL,
      nr-DL-PRS-FirstPathRSRP-Result-r18                                INTEGER
(0..126)       OPTIONAL,
      nr-PhaseQuality-r18                                                   NR-
PhaseQuality-r18     OPTIONAL,
      nr-PRU-RSCP-AdditionalMeasurements-r18                           NR-PRU-
RSCP-AdditionalMeasurements-r18 OPTIONAL,
      ...
   }
   NR-PRU-RSCP-AdditionalMeasurements-r18 ::= SEQUENCE (SIZE (1..3)) OF
                                                      NR-PRU-RSCP-
AdditionalMeasurementElement-r18
   NR-PRU-RSCP-AdditionalMeasurementElement-r18 ::= SEQUENCE {
      nr-DL-PRS-ResourceID-r18                    NR-DL-PRS-ResourceID-r16
OPTIONAL,
      nr-DL-PRS-ResourceSetID-r18                 NR-DL-PRS-ResourceSetID-
r16 OPTIONAL,
      nr-DL-PRS-RSRP-ResultDiff-r18                        INTEGER (0..61)
OPTIONAL,
      nr-DL-PRS-FirstPathRSRP-ResultDiff-r18          INTEGER          (0..61)
OPTIONAL,
      ...
   }
   -- ASN1STOP
```

The NR-On-Demand-DL-PRS-Configurations Information Element provides a set of possible downlink positioning reference signal (DL-PRS) configurations that can be requested by the target user equipment on-demand, where each configuration is uniquely identified by a DL-PRS configuration identifier and includes a subset of positioning frequency layer parameters (specifically resource bandwidth and comb size) from NR-DL-PRS-PositioningFrequency-Layer and a subset of resource information parameters (specifically periodicity, resource repetition factor, number of symbols, comb size with resource element offset, and quasi-co-location information) from NR-DL-PRS-Info, with the target device instructed to ignore all other fields not explicitly listed as applicable. The on-demand-dl-prs-configuration-list provides up to maxOD-DL-PRS-Configs configurations from which the target device can select and request appropriate DL-PRS transmissions based on its positioning requirements, enabling flexible and efficient resource utilization by activating DL-PRS only when needed rather than maintaining continuous transmission. Additionally, the onDemandDL-PRS-AggregationList field supports bandwidth aggregation by specifying groups of two or three on-demand DL-PRS configuration identifiers that can be combined for aggregated measurements, allowing the target device to request coordinated multi-configuration transmissions to achieve wider effective bandwidth and improved positioning accuracy when supported by the network infrastructure.

```
      -- ASN1START
      NR-On-Demand-DL-PRS-Configurations-r17 ::=     SEQUENCE {
         on-demand-dl-prs-configuration-list-r17     SEQUENCE (SIZE (1..maxOD-
DL-PRS-Configs-r17)) OF
                                                             On-Demand-DL-PRS-
Configuration-r17,
         onDemandDL-PRS-AggregationList-r18                     SEQUENCE (SIZE
(1..maxOD-DL-PRS-Configs-r17)) OF
                                                             OnDemandDL-PRS-
AggregationInfo-r18         OPTIONAL,
         ...
      }
      On-Demand-DL-PRS-Configuration-r17 ::= SEQUENCE {
         dl-prs-configuration-id-r17                    DL-PRS-Configuration-ID-
r17,
         nr-DL-PRS-PositioningFrequencyLayer-r17                      NR-DL-PRS-
PositioningFrequencyLayer-r16,
         nr-DL-PRS-Info-r17                                     NR-DL-PRS-Info-r16,
         ...
      }
      DL-PRS-Configuration-ID-r17 ::= SEQUENCE {
         nr-dl-prs-configuration-id-r17      INTEGER (1..maxOD-DL-PRS-Configs-
r17),
         ...
      }
```

-continued

```
OnDemandDL-PRS-AggregationInfo-r18 ::= SEQUENCE (SIZE (2..3)) OF DL-
PRS-Configuration-ID-r17
-- ASN1STOP
```

<Assistance Data for AIML>

Assistance data for AIML can be provided via various ways.

>: Approach 1 where NR-DL-PRS-AssistanceData-r16 that comprises AIML-related parameter set is used to provide assistance data for AIML; or >: Approach 2 where AIML-NR-DL-PRS-Assistance-Data-r19 is used to provide assistance data for AIML.

Approach 1: Reusing Existing assistanceDataElements

In approach 1, LMF includes AIML-related parameter in the NR-DL-PRS-AssistanceData-r16 as follows.

NR-DL-PRS-AssistanceData-r16 includes:

>: parentAssociationID field that contains AssociationID IE.

NR-DL-PRS-AssistanceDataPerTRP-r16 includes:

>: childAssociationID field that contains AssociationID IE.

NR-DL-PRS-ResourceSet-r16 includes:

>: grandChildAssociationID field that contains AssociationID IE.

A NR-DL-PRS-ResourceSet-r16 is associated with AssociationID indicated in parentAssociationID field if:

>: grandChildAssociationID field associated with the NR-DL-PRS-ResourceSet-r16 is absent; and >: childAssociationID field associated with the NR-DL-PRS-AssistanceDataPerTRP-r16 that includes the NR-DL-PRS-ResourceSet-r16 is absent.

A NR-DL-PRS-ResourceSet-r16 is associated with AssociationID indicated in childAssociationID field of the corresponding NR-DL-PRS-AssistanceDataPerTRP-r16 if:

>: grandChildAssociationID field associated with the NR-DL-PRS-ResourceSet-r16 is absent; and >: childAssociationID field associated with the NR-DL-PRS-AssistanceDataPerTRP-r16 that includes the NR-DL-PRS-ResourceSet-r16 is present.

A NR-DL-PRS-ResourceSet-r16 is associated with AssociationID indicated in grandChildAssociationID field of the corresponding NR-DL-PRS-ResourceSet-r16 if:

>: grandChildAssociationID field associated with the NR-DL-PRS-ResourceSet-r16 is present.

The terminal ignores the AssociationIDs and the relevant fields in case that the terminal is performing positioning measurement that does not involve AIML operations.

The terminal determines whether to perform AIML operations based on the AssociationIDs in case that the terminal is performing positioning measurement that involves AIML operations.

Approach 2: New assistanceDataElements

AIML-NR-DL-PRS-AssistanceData-r19 is used by the location server to provide DL-PRS assistance data for AIML operations such as inference/training. This IE is provided to the UE via LPP message (ProvideAssistanceData) or via system information. As illustrated in A2-10, the IE can be included in ProvideAssistanceData message. As illustrated in A2-20, the IE can be included in AssistanceDataSIBelement-r15 in posSibType6-7.

AIML-NR-DL-PRS-AssistanceData

As illustrated in A2-30, the AIML-NR-DL-PRS-AssistanceData may include one or more AIML-NR-DL-PRS-AssistanceDataPerFreq-r16 and parentAssociationID field.

As illustrated in A2-40, AIML-NR-DL-PRS-AssistanceDataPerFreq-r16 includes a nr-DL-PRS-PositioningFrequencyLayer-r16 and one or more NR-DL-PRS-AssistanceDataPerTRP-r16 and a childAssociationID field. The nr-DL-PRS-PositioningFrequencyLayer-r16 included in the NR-DL-PRS-AssistanceDataPerFreq-r16 is associated with the one or more NR-DL-PRS-AssistanceDataPerTRP-r16 included in the same NR-DL-PRS-AssistanceDataPerFreq-r16. Configuration parameters in the nr-DL-PRS-PositioningFrequencyLayer-r16 are commonly/equally applied to the one or more NR-DL-PRS-AssistanceDataPerTRP-r16 that are associated with the nr-DL-PRS-PositioningFrequencyLayer-r16.

As illustrated in A2-50, NR-DL-PRS-AssistanceDataPerTRP-r16 may include a set of parameters A2-60 and a NR-DL-PRS-Info-r16. The set of parameters A2-60 included in the NR-DL-PRS-AssistanceDataPerTRP-r16 is associated with the NR-DL-PRS-Info-r16 included in the same NR-DL-PRS-AssistanceDataPerTRP-r16. Configuration parameters in the set of parameters A2-60 are commonly/equally applied to the one or more NR-DL-PRS-ResourceSet-r16 included in the NR-DL-PRS-Info-r16 that is associated with the set of parameters A2-60.

As illustrated in A2-70, the NR-DL-PRS-Info-r16 may include one or more NR-DL-PRS-ResourceSet-r16.

As illustrated in A2-80, NR-DL-PRS-ResourceSet-r16 may include a set of parameters A2-90 and one or more NR-DL-PRS-Resource-r16 and a grandChildAssociationID. The set of parameters A2-90 included in the NR-DL-PRS-ResourceSet-r16 is associated with the one or more NR-DL-PRS-Resource-r16 included in the same NR-DL-PRS-ResourceSet-r16. Configuration parameters in the set of parameters A2-90 are commonly/equally applied to the one or more NR-DL-PRS-Resource-r16 included in the same NR-DL-PRS-ResourceSet-r16.

AssociationID INTEGER (0 . . . YYY)

YYY is the highest integer that is determined from n bit.

AssociationID indicates certain set of network configuration/applicable conditions. It is allocated by LMF. The m MSBs of the AssociationID corresponds to LMF identifier. This ensures that AssociationID is unique within a certain area. A specific value (e.g. 0) indicates that the corresponding parameter is not for AIML operations (e.g. the corresponding parameter is not associated with any AIML configuration/condition). A parentAssociationID may be associated with a plurality of TRPs. The terminal may assume that the coordinates of the TRP(s) belonging to the indicated cell have not changed if the value of nr-AIML-AssociatedID is the same.

<Assistance Data Procedure>

If the system information does not provide required configuration information for positioning measurement, UE may perform ASSISTANCE DATA PROCEDURE.

Training Configuration Request

UE transmits to LMF RequestAssistanceData message to request DL PRS.

UE includes NR-AIML-PRS-RequestAssistanceData field in case that the assistance data is:

>: required for PRS measurement related with AIML operation,

UE does not include NR-AIML-PRS-RequestAssistance-Data field and include nr-on-demand-DL-PRS-Request in case that:

>: the assistance data is required for PRS measurement not related with AIML operation; and >: target device requires on-demand DL-PRS.

RequestAssistanceData

```
-- ASN1START
RequestAssistanceData ::= SEQUENCE {
criticalExtensions                    CHOICE {
        c1                                            CHOICE {
              requestAssistanceData-r9         RequestAssistanceData-r9-IEs,
              spare3 NULL, spare2 NULL, spare1 NULL
        },
        criticalExtensionsFuture SEQUENCE { }
}
}
RequestAssistanceData-r9-IEs ::= SEQUENCE {
commonIEsRequestAssistanceData
CommonIEsRequestAssistanceData                         OPTIONAL,
a-gnss-RequestAssistanceData               A-GNSS-RequestAssistanceData
OPTIONAL,
otdoa-RequestAssistanceData                            OTDOA-
RequestAssistanceData                 OPTIONAL,
epdu-RequestAssistanceData                             EPDU-Sequence
                                      OPTIONAL,
...,
[[      sensor-RequestAssistanceData-r14
Sensor-RequestAssistanceData-r14           OPTIONAL,
        tbs-RequestAssistanceData-r14      TBS-RequestAssistanceData-r14
OPTIONAL,
        wlan-RequestAssistanceData-r14WLAN-RequestAssistanceData-r14
        OPTIONAL
]],
[[    nr-Multi-RTT-RequestAssistanceData-r16                NR-Multi-RTT-
RequestAssistanceData-r16         OPTIONAL,
      nr-DL-AoD-RequestAssistanceData-r16                   NR-DL-AoD-
RequestAssistanceData-r16              OPTIONAL,
      nr-DL-TDOA-RequestAssistanceData-r16                  NR-DL-TDOA-
RequestAssistanceData-r16         OPTIONAL
]],
[[
      bt-RequestAssistanceData-r18                          BT-
RequestAssistanceData-r18              OPTIONAL
]]
[[
      nr-aiml-prs-RequestAssistanceData                     NR-AIML-PRS-
RequestAssistanceData
]]
}
-- ASN1STOP
```

NR-AIML-PRS-RequestAssistanceData

The IE NR-AIML-PRS-RequestAssistanceData is used by the target device to request assistance data related with AIML from a location server.

```
-- ASN1START
NR-AIML-PRS-RequestAssistanceData-r16 ::= SEQUENCE {
nr-PhysCellID-r16                              NR-PhysCellID-r16
                                       OPTIONAL,
nr-aiml-lcm                                          BIT STRING    {training
(0), inference (1)}
requestedAssociationId                 AssocaitionID
NewTraining                                          Boolean       {TRUE,
FALSE}
nr-AdType-r16                                  BIT STRING { dl-prsOnly
(0),
posCalcAndDl-prs (1) } (SIZE (1..8)),
...,
[[
nr-PosCalcAssistanceRequest-r17        BIT STRING {      trpLoc        (0),
beamInfo       (1),
rtdInfo        (2),
losNlosInfo    (3),
```

-continued

```
trpTEG-Info        (4),
nr-IntegrityBounds-r18 (5),
pruInfo-r18        (6)
                   }          (SIZE (1..8))                         OPTIONAL,
nr-on-demand-DL-PRS-Request-r17          NR-On-Demand-DL-PRS-Request-r17
                              OPTIONAL,
nr-DL-PRS-ExpectedAoD-or-AoA-Request-r17
ENUMERATED { eAoD, eAoA }
OPTIONAL,
]],
]]
nr-PeriodicAssistDataReq-r18                  NR-PeriodicAssistDataReq-r18
OPTIONAL, -- Cond PerADReq
nr-Integrity AssistanceRequest-r18        BIT STRING {
serviceParameters              (0),
serviceAlert                   (1),
riskParameters                 (2),
integrity Para TRP-Loc     (3),
integrity ParaBeamInfo     (4),
integrityParaRTD-Info      (5)
} (SIZE (1..8))                           OPTIONAL
]]
}
-- ASN1STOP
```

nr-PhysCellID: This field specifies the NR physical cell identity of the current primary cell of the target device.

requestedAssociation: This field indicates the association ID. Association ID may be associated with certain set of network condition/configuration that are applied to DL-PRS transmission. Example is set of TRPs, quasi-collocation configurations, transmission power etc, antenna angles etc.

If the requested assistance data is for 'training':

>: if the terminal already has trained data and the terminal determines to continue 'training' with the existing trained data, >>: the terminal sets this field with the association ID of the trained data.

>: if the terminal already has trained data and the terminal determines to starts new 'training', >> the terminal sets this field with the association ID of the trained data and includes an indication (newTraining) that DL-PRS configuration of which association ID is different from the indicated one is required (i.e. certain network condition/configuration that is different from what is indicated by the association ID), If the requested assistance data is for 'inference', the terminal sets this field with the association ID of the selected AIML model.

NewTraining field is present only when the terminal requests the assistance data for new training and the terminal does not want to use specific configuration (associated with the associationID).

nr-aiml-lcm: This field indicates for which AIML process the requested assistance data is requested. 'training' means requested assistance data is for AIML training. 'inference' means requested assistance data is for AIML inference.

nr-AdType: This field indicates the requested assistance data. dl-prsOnly means requested assistance data is nr-DL-PRS-AssistanceData, posCalcAndDL-prs means requested assistance data is nr-PositionCalculationAssistance and nr-DL-PRS-AssistanceData.

nr-PosCalcAssistanceRequest: This field indicates the Position Calculation Assistance Data requested. This is represented by a bit string, with a one value at the bit position means the particular assistance data is requested; a zero value means not requested.

>: bit 0 indicates whether the field nr-TRP-LocationInfo in IE NR-PositionCalculationAssistance is requested or not;

>: bit 1 indicates whether the field nr-DL-PRS-BeamInfo in IE NR-PositionCalculationAssistance is requested or not;

>: bit 2 indicates whether the field nr-RTD-Info in IE NR-PositionCalculationAssistance is requested or not;

>: bit 3 indicates whether the field nr-DL-PRS-Expected-LOS-NLOS-Assistance in IE NR-PositionCalculation-Assistance is requested or not;

>: bit 4 indicates whether the field nr-DL-PRS-TRP-TEG-Info in IE NR-PositionCalculationAssistance is requested or not;

>: bit 5 together with bit 0 indicates whether the fields nr-Integrity TRP-LocationBounds, nr-IntegrityDL-PRS-ResourceSetARP-LocationBounds, nr-IntegrityDL-PRS-ResourceARP-LocationBounds in IE NR-TRP-LocationInfo are requested or not; bit 5 together with bit 1 indicates whether the field nr-IntegrityBeamInfoBounds in IE NR-DL-PRS-BeamInfo is requested or not; bit 5 together with the bit 2 indicates whether the field nr-IntegrityRTD-InfoBounds in IE NR-RTD-Info is requested or not;

>: bit it 6 indicates whether the field nr-PRU-DL-Info in IE NR-PositionCalculationAssistance is requested or not.

This field may only be present if the 'posCalc' bit in nr-AdType is set to value '1'.

nr-on-demand-DL-PRS-Request: This field indicates the on-demand DL-PRS. This field may be included when the dl-prs bit in nr-AdType is set to value '1'.

nr-DL-PRS-ExpectedAoD-or-AoA-Request: This field, if present, indicates that the IE NR-DL-PRS-ExpectedAoD-or-AoA in NR-DL-PRS-AssistanceData is requested. Enumerated value 'eAoD' indicates that expected AoD information is requested; value 'eAoA' indicates that expected AoA information is requested. This field may only be present if the 'dl-prs' bit in nr-AdType is set to value '1'.

nr-PeriodicAssistDataReq: This field indicates the control parameters for a periodic assistance data delivery session (e.g., interval and duration) for UE based carrier phase positioning.

Training Configuration Provision

LMF determines whether to provide DL-PRS configuration for training. If determined so, LMF selects the DL-PRS configuration for training and provide the configuration information in AIML-ProvideAssistanceData-r19 in ProvideAssistanceData message.

ProvideAssistanceData

NR-SelectedDL-PRS-IndexList-r19

The IE NR-SelectedDL-PRS-IndexList-r19 is used by the location server to provide the selected DL-PRS Resource of nr-DL-PRS-AssistanceDataList for AIML operation to the target device.

In the case of assistance data for multiple NR positioning methods are provided, the IE NR-DL-PRS-AssistanceData shall be present in only one of NR-Multi-RTT-Provide

```
-- ASN1START
ProvideAssistanceData ::= SEQUENCE {
criticalExtensions                    CHOICE {
      c1                                        CHOICE {
            provideAssistanceData-r9              ProvideAssistanceData-r9-IEs,
            spare3 NULL, spare2 NULL, spare1 NULL
      },
      criticalExtensionsFuture SEQUENCE { }
}
}
ProvideAssistanceData-r9-IEs ::= SEQUENCE {
commonIEsProvideAssistanceData
CommonIEsProvideAssistanceData              OPTIONAL,      -- Need ON
a-gnss-ProvideAssistanceData           A-GNSS-ProvideAssistanceData
OPTIONAL,        -- Need ON
otdoa-ProvideAssistanceData                 OTDOA-ProvideAssistanceData
            OPTIONAL,      -- Need ON
epdu-Provide-Assistance-Data           EPDU-Sequence
                  OPTIONAL,      -- Need ON
...,
[[
sensor-ProvideAssistanceData-r14       Sensor-ProvideAssistanceData-r14
OPTIONAL,        -- Need ON
tbs-ProvideAssistanceData-r14          TBS-ProvideAssistanceData-r14
OPTIONAL,        -- Need ON
wlan-ProvideAssistanceData-r14         WLAN-ProvideAssistanceData-r14
      OPTIONAL       -- Need ON
]],
[[    nr-Multi-RTT-ProvideAssistanceData-r16
NR-Multi-RTT-ProvideAssistanceData-r16
                                       OPTIONAL,      -- Need ON
      nr-DL-AoD-ProvideAssistanceData-r16
NR-DL-AoD-ProvideAssistanceData-r16OPTIONAL,          -- Need ON
      nr-DL-TDOA-ProvideAssistanceData-r16
NR-DL-TDOA-ProvideAssistanceData-r16
                                        OPTIONAL      -- Need ON
]],
[[
      aiml-ProvideAssistanceData            AIML-PRS-ProvideAssistanceData-r19
      OPTIONAL       -- Need ON
]]
}
-- ASN1STOP
```

AIML-ProvideAssistanceData A2-15

The IE AIML- ProvideAssistanceData is used by the location server to provide assistance data to enable AIML training or inference.

```
-- ASN1START
AIML-ProvideAssistanceData-r19 ::= SEQUENCE {
aiml-nr-DL-PRS-AssistanceData-r19                  AIML-NR-DL-PRS-
AssistanceData-r19        OPTIONAL,      -- Need ON
nr-SelectedDL-PRS-IndexList-r19                              NR-SelectedDL-PRS-
IndexList-r19             OPTIONAL,      -- Need ON
nr-PositionCalculationAssistance-r19
NR-PositionCalculationAssistance-r19
                                          OPTIONAL,      -- Cond UEB
nr-On-Demand-DL-PRS-Configurations-r19
NR-On-Demand-DL-PRS-Configurations-r19
                                          OPTIONAL,      -- Need ON
nr-On-Demand-DL-PRS-Configurations-Selected-IndexList-r19
NR-On-Demand-DL-PRS-Configurations-Selected-IndexList-r19
                              OPTIONAL,        -- Need ON
nr-PeriodicAssistData-r19              NR-PeriodicAssistData-r19
OPTIONAL             -- Cond CtrTrans
}
-- ASN1STOP
```

Assistance Data, NR-DL-AoD-Provide AssistanceData, or NR-DL-TDOA-Provide Assistance Data, or NR-AIML-Provide Assistance Data.

the first entry in nr-DL-PRS-AssistanceDataPerFreq in IE NR-DL-PRS-AssistanceData, a value of 1 refers to the second entry, and so forth.

```
-- ASN1START
NR-SelectedDL-PRS-IndexList-r19 ::= SEQUENCE {
associationIDList                                  AssociationIDList
nr-SelectedDL-PRS-IndexList-r19                 NR-SelectedDL-PRS-IndexList-
r16
...
}
AssociationIDList ::= SEQUENCE (SIZE (1..nrMaxSelectedIndexList-r19)) OF
AssociationID-r19
NR-SelectedDL-PRS-IndexList-r16 ::= SEQUENCE                               (SIZE
(1..nrMaxFreqLayers-r16)) OF
NR-SelectedDL-PRS-PerFreq-r16
NR-SelectedDL-PRS-PerFreq-r16 ::= SEQUENCE {
nr-SelectedDL-PRS-FrequencyLayerIndex-r16      INTEGER
(0..nrMaxFreqLayers-1-r16),
nr-SelectedDL-PRS-IndexListPerFreq-r16                SEQUENCE        (SIZE
(1..nrMaxTRPsPerFreq-r16)) OF
NR-SelectedDL-PRS-IndexPerTRP-r16
                                   OPTIONAL,           -- Need OP
...
}
NR-SelectedDL-PRS-IndexPerTRP-r16 ::= SEQUENCE {
nr-SelectedTRP-Index-r16                                    INTEGER
(0..nrMaxTRPsPerFreq-1-r16),
dl-SelectedPRS-ResourceSetIndexList-r16               SEQUENCE        (SIZE
(1..nrMaxSetsPerTrpPerFreqLayer-r16))
OF          DL-SelectedPRS-ResourceSetIndex-r16
                                   OPTIONAL,           -- Need OP
...
}
DL-SelectedPRS-ResourceSetIndex-r16 ::= SEQUENCE {
nr-DL-SelectedPRS-ResourceSetIndex-r16            INTEGER
(0..nrMaxSetsPerTrpPerFreqLayer-1-r16),
dl-SelectedPRS-ResourceIndexList-r16            SEQUENCE                  (SIZE
(1..nrMaxResourcesPerSet-r16)) OF
DL-SelectedPRS-ResourceIndex-r16
                                   OPTIONAL            -- Need OP
}
DL-SelectedPRS-ResourceIndex-r16 ::= SEQUENCE {
nr-DL-SelectedPRS-ResourceIdIndex-r16             INTEGER
(0..nrMaxNumDL-PRS-ResourcesPerSet-1-r16),
...
}
-- ASN1STOP
```

associationIDList: This field provides a list of association IDs corresponding to the nr-SelectedDL-PRS-IndexList. The first entry in the associationIDList pertains to the first entry of the nr-SelectedDL-PRS-IndexList; similarly, the second entry relates to the second entry of the nr-SelectedDL-PRS-IndexList, and so forth.

nr-SelectedDL-PRS-IndexList: This field specifies the selected DL-PRS Resource from nr-DL-PRS-AssistanceDataList for AIML operations.

nr-SelectedDL-PRS-FrequencyLayerIndex: This field indicates the frequency layer provided in IE NR-DL-PRS-AssistanceData. A value of 0 corresponds to the first frequency layer in nr-DL-PRS-AssistanceDataList in IE NR-DL-PRS-AssistanceData, a value of 1 corresponds to the second frequency layer in nr-DL-PRS-AssistanceDataList, and so on.

nr-SelectedDL-PRS-IndexListPerFreq: This field provides a list of addressed TRPs for the selected frequency layer. If this field is absent, all DL-PRS Resources of all TRPs in the specified frequency layer are addressed.

nr-SelectedTRP-Index: This field denotes the addressed TRP of the selected frequency layer. A value of 0 refers to dl-SelectedPRS-ResourceSetIndexList: This field specifies the list of addressed DL-PRS Resource Sets for the selected TRPs of the identified frequency layer. If this field is absent, all DL-PRS Resource Sets and Resources of the indicated TRP are addressed.

nr-DL-SelectedPRS-ResourceSetIndex: This field identifies the addressed DL-PRS Resource Set for the selected TRP of the designated frequency layer. A value of 0 refers to the first entry in nr-DL-PRS-ResourceSetList in IE NR-DL-PRS-Info within IE NR-DL-PRS-AssistanceData, while a value of 1 refers to the second entry in the nr-DL-PRS-ResourceSetList.

dl-SelectedPRS-ResourceIndexList: This field provides the list of addressed DL-PRS Resources for the selected DL-PRS Resource Set of the chosen TRP within the assigned frequency layer. If absent, all DL-PRS Resources of the indicated DL-PRS Resource Set are considered.

nr-dl-SelectedPRS-ResourceIdIndex: This field designates the addressed DL-PRS Resource of the selected DL-PRS Resource Set for the TRP in the specified frequency layer. A value of 0 refers to the first entry in dl-PRS- ResourceList in IE NR-DL-PRS-Info within IE NR-DL-PRS-AssistanceData, while a value of 1 refers to the second entry.

NR-PositionCalculationAssistance-r19

The IE NR-PositionCalculationAssistance-r19 is used by the location server to provide assistance data including integrity information to enable UE-based downlink positioning.

associationID: This field provides the association ID related to the NR-PositionCalculationAssistance-r16.

nr-TRP-LocationInfo: This field indicates the location coordinates of the TRPs and antenna reference points for DL-PRS Resource Sets and DL-PRS Resources of the TRPs.

nr-DL-PRS-BeamInfo: This field specifies the spatial directions of DL-PRS Resources for TRPs.

```
-- ASN1START
NR- PositionCalculationAssistance-r19 ::=            SEQUENCE {
associationID                                          AssociationID
nr-PositionCalculationAssistance-r16                 NR-
PositionCalculationAssistance-r16
...
}
NR-PositionCalculationAssistance-r16 ::= SEQUENCE {
nr-TRP-LocationInfo-r16                              NR-TRP-LocationInfo-r16
                    OPTIONAL,        -- Need ON
nr-DL-PRS-BeamInfo-r16                               NR-DL-PRS-BeamInfo-r16
                    OPTIONAL,        -- Need ON
nr-RTD-Info-r16                                        NR-RTD-Info-r16
                                OPTIONAL,         -- Need ON
...,
[[
nr-TRP-BeamAntennaInfo-r17                  NR-TRP-BeamAntennaInfo-r17
        OPTIONAL,           -- Need ON
nr-DL-PRS-Expected-LOS-NLOS-Assistance-r17
NR-DL-PRS-ExpectedLOS-NLOS-Assistance-r17
                          OPTIONAL,         -- Need ON
nr-DL-PRS-TRP-TEG-Info-r17                  NR-DL-PRS-TRP-TEG-Info-r17
        OPTIONAL,           -- Need ON
]],
[[
nr-Integrity ServiceParameters-r18          NR-IntegrityServiceParameters-r18
OPTIONAL,           -- Need OR
nr-Integrity ServiceAlert-r18               NR-IntegrityServiceAlert-r18
OPTIONAL,           -- Need OR
nr-IntegrityRiskParameters-r18              NR-IntegrityRiskParameters-r18
OPTIONAL,           -- Need OR
nr-IntegrityParametersTRP-LocationInfo-r18                      NR-
IntegrityParametersTRP-LocationInfo-r18
                          OPTIONAL, -- Cond Integrity 1
nr-IntegrityParametersDL-PRS-BeamInfo-r18
NR-IntegrityParametersDL-PRS-BeamInfo-r18
                          OPTIONAL, -- Cond Integrity2
nr-IntegrityParametersRTD-Info-r18NR-IntegrityParametersRTD-Info-r18
                          OPTIONAL, -- Cond Integrity3
nr-IntegrityParametersTRP-BeamAntennaInfo-r18                   NR-
IntegrityParametersTRP-BeamAntennaInfo-r18
                          OPTIONAL, -- Cond Integrity4
nr-PRU-DL-Info-r18                                              NR-PRU-DL-Info-r18
                       OPTIONAL -- Need ON
]]
}
NR-IntegrityParametersTRP-LocationInfo-r18 ::= SEQUENCE {
trp-ErrorCorrelation Time-r18
INTEGER(0..255)                  OPTIONAL, -- Need ON
dl-PRS-ResourceSetARP-ErrorCorrelationTime-r18                  INTEGER(0..255)
         OPTIONAL, -- Need ON
dl-PRS-ResourceARP-ErrorCorrelationTime-r18                     INTEGER(0..255)
         OPTIONAL, -- Need ON
...
}
NR-IntegrityParametersDL-PRS-BeamInfo-r18 ::= SEQUENCE {
dl-PRS-BeamInfoErrorCorrelationTime-r18                         INTEGER (0..255),
...
}
NR-IntegrityParametersRTD-Info-r18 ::= SEQUENCE {
rtd-ErrorCorrelationTime-r18                 INTEGER (0..255),
...
}
NR-IntegrityParametersTRP-BeamAntennaInfo-r18 ::= SEQUENCE {
trp-Beam AntennaInfoErrorCorrelationTime-r18                    INTEGER (0..255),
...
}
-- ASN1STOP
```

nr-RTD-Info: This field contains the time synchronization information between the reference TRP and neighboring TRPs.

nr-TRP-BeamAntennaInfo: This field details the relative DL-PRS Resource power between DL-PRS Resources per angle per TRP.

nr-DL-PRS-ExpectedLOS-NLOS-Assistance: This field provides the expected likelihood of a LOS propagation path from a TRP to the target device, presented per TRP or per DL-PRS Resource.

nr-DL-PRS-TRP-TEG-Info: This field lists the TRP Tx TEG ID associated with the transmission of each DL-PRS Resource of the TRP.

nr-PRU-DL-Info: This field includes the measurements reported by a PRU to the target UE.

NR-On-Demand-DL-PRS-Configurations-r19

The IE NR-On-Demand-DL-PRS-Configurations provides a set of possible DL-PRS configurations which can be requested by the target device on-demand.

applicable: dl-PRS-ResourceBandwidth, dl-PRS-CombSizeN. The target device shall ignore the remaining fields in IE NR-DL-PRS-PositioningFrequencyLayer.

nr-DL-PRS-Info: This field, together with nr-DL-PRS-PositioningFrequencyLayer, provides the On-demand DL-PRS Configuration information. Only the following fields in IE NR-DL-PRS-Info are applicable: DL-PRS periodicity in dl-PRS-Periodicity-and-ResourceSetSlotOffset, dl-PRS-ResourceRepetitionFactor, dl-PRS-NumSymbols, comb-size in dl-PRS-CombSizeN-AndReOffset, dl-PRS-QCL-Info. The target device shall ignore the remaining fields in IE NR-DL-PRS-Info.

onDemandDL-PRS-AggregationList: This field provides a list of DL-PRS bandwidth aggregation information where each entry of DL-PRS bandwidth aggregation information indicates the identities of 2 or 3 On-demand DL-PRS Configuration information for DL-PRS that are available for aggregation.

```
-- ASN1START
NR- PositionCalculationAssistance-r19 ::=     SEQUENCE {
associationID                                        AssociationID
nr-On-Demand-DL-PRS-Configurations-r17               NR-On-Demand-DL-
PRS-Configurations-r17
...
}
NR-On-Demand-DL-PRS-Configurations-r17 ::=     SEQUENCE {
on-demand-dl-prs-configuration-list-r17              SEQUENCE (SIZE (1..maxOD-
DL-PRS-Configs-r17)) OF
On-Demand-DL-PRS-Configuration-r17,
...,
[[
onDemandDL-PRS-AggregationList-r18                   SEQUENCE (SIZE (1..
maxOD-DL-PRS-Configs-r17)) OF
            OnDemandDL-PRS-AggregationInfo-r18       OPTIONAL -- Need OR
]]
}
On-Demand-DL-PRS-Configuration-r17 ::= SEQUENCE {
dl-prs-configuration-id-r17                                DL-PRS-
Configuration-ID-r17,
nr-DL-PRS-PositioningFrequencyLayer-r17              NR-DL-PRS-
PositioningFrequencyLayer-r16,
nr-DL-PRS-Info-r17                                             NR-
DL-PRS-Info-r16,
...
}
DL-PRS-Configuration-ID-r17 ::= SEQUENCE {
nr-dl-prs-configuration-id-r17                       INTEGER (1..maxOD-
DL-PRS-Configs-r17),
...
}
OnDemandDL-PRS-AggregationInfo-r18 ::= SEQUENCE (SIZE (2..3)) OF DL-
PRS-Configuration-ID-r17
-- ASN1STOP
```

associationIDList: This field provides a list of association IDs corresponding to the on-demand-dl-prs-configuration-list-r17. The first entry in the associationIDList pertains to the first entry of on-demand-dl-prs-configuration-list-r17; similarly, the second entry relates to the second entry of the on-demand-dl-prs-configuration-list-r17, and so forth.

dl-prs-configuration-id: This field identifies an On-demand DL-PRS Configuration information.

nr-DL-PRS-PositioningFrequencyLayer: This field, together with nr-DL-PRS-Info, provides the On-demand DL-PRS Configuration information. Only the following fields in IE NR-DL-PRS-PositioningFrequencyLayer are NR-On-Demand-DL-PRS-Configurations-Selected-IndexList-r19

The IE NR-On-Demand-DL-PRS-Configurations-Selected-IndexList-r19 is used by the location server to provide the selected available on-demand DL-PRS configurations to the target device for AI-ML purpose.

In the case of available on-demand DL-PRS configurations for multiple NR positioning methods are provided, the NR-On-Demand-DL-PRS-Configurations shall be present in only one of NR-Multi-RTT-ProvideAssistanceData, NR-DL-AoD-Provide AssistanceData, or NR-DL-TDOA-Provide AssistanceData or NR-AIML-Provide Assistance Data.

```
-- ASN1START
NR-On-Demand-DL-PRS-Configurations-Selected-IndexList-r19 ::= SEQUENCE
{
  associationIDList                                  AssociationIDList
  nr-On-Demand-DL-PRS-Configurations-Selected-IndexList-r17          NR-
On-Demand-DL-PRS-Configurations-Selected-IndexList-r17
  ...
  }
  NR-On-Demand-DL-PRS-Configurations-Selected-IndexList-r17 ::=
    SEQUENCE (SIZE (1..maxOD-DL-PRS-Configs-r17)) OF
      DL-PRS-Configuration-ID-r17
  -- ASN1STOP
```

<Measurement Opportunity Procedure>

To get the measurement opportunities to measure DL-PRS for training, UE may perform MEASUREMENT OPPORTUNITY PROCEDURE with serving base station.

MEASUREMENT OPPORTUNITY PROCEDURE consists of LOCATION MEASUREMENT INDICATION, MEASUREMENT OPPORTUNITY CONFIGURATION and MEASUREMENT OPPORTUNITY ACTIVATION.

Location Measurment Indication

When a User Equipment (UE) is configured with downlink positioning reference signal (DL-PRS) assistance data and requires measurement gaps to perform inter-frequency measurements that are not currently configured or insufficient, the UE performs the Location Measurement Indication procedure to inform the network that it will start or stop location-related measurements toward Evolved Universal Terrestrial Radio Access (E-UTRA) or New Radio (NR) systems. If upper layers indicate to start performing location measurements and preconfigured measurement gaps for positioning with posMG-Request are configured, the UE triggers the lower layers to initiate a measurement gap activation request using uplink medium access control control element (UL MAC CE); otherwise, the UE initiates the procedure to indicate start by transmitting a LocationMeasurementIndication message. When upper layers indicate to stop performing location measurements, the UE either cancels any previously triggered UL MAC CE transmission for measurement gap activation, triggers deactivation of all activated preconfigured measurement gaps for positioning, or initiates the procedure to indicate stop depending on the current measurement gap configuration state. The LocationMeasurementIndication message content is set according to the measurement type and operation: for starting measurements, the measurementIndication field is set to eutra-RSTD for E-UTRA reference signal time difference measurements, nr-PRS-Measurement for NR positioning measurements, or eutra-FineTimingDetection for E-UTRA timing detection; for stopping measurements, the field is set to release. Upon completing the message configuration based on information received from upper layers, the UE submits the LocationMeasurementIndication message to lower layers for transmission, after which the procedure terminates.

Measurement Opportunity Configuration

The base station configures measurement gaps for the User Equipment (UE) by transmitting an RRCReconfiguration message containing measGapConfig, which supports three types of measurement gap configurations: frequency range one (FR1) measurement gaps configured by gapFR1, frequency range two (FR2) measurement gaps configured by gapFR2, and per-UE measurement gaps configured by gapUE, each of which can be independently set up or released based on the configuration indication. When setting up any measurement gap configuration, the UE calculates the timing of gap occurrences using the received gapOffset parameter, where the first subframe of each gap occurs at a system frame number (SFN) and subframe satisfying the condition SFN mod T=FLOOR (gapOffset/10) and subframe=gapOffset mod 10, with T=MGRP/10 representing the measurement gap repetition period divided by ten as defined in technical specifications. The UE applies a specified timing advance (mgta) to these calculated gap occurrences, meaning the UE starts the measurement mgta milliseconds before the actual gap subframe occurrences to accommodate processing and tuning delays. The configuration supports flexible gap management through gapToReleaseList for releasing existing measurement gaps by measGapId, gapToAddModList for adding or modifying measurement gaps with associated parameters including gap type (per-UE, FR1, or FR2), gap sharing configuration, and measurement gap identifier, and posMeasGapPreConfigToReleaseList and PosMeasGapPreConfigToAddModList for managing preconfigured positioning measurement gaps identified by measPosPreConfigGapId. Gap sharing configuration can be optionally enabled for each measurement gap when the gapSharing parameter is present in the GapConfig, allowing the measurement gap to be shared with other radio access technologies or functions as defined in technical specifications, and is released if the parameter is absent. After configuration, the activation state of each measurement gap is determined based on its configuration source: measurement gaps configured by GapConfig with preConfigInd-r17 present have their activation status determined by the UE according to activation procedures, preconfigured positioning measurement gaps (PosGapConfig) are initially considered deactivated until explicitly activated, and all other measurement gaps are immediately considered activated upon setup. The release procedure removes the specified measurement gap configuration, freeing the associated resources and allowing the UE to discontinue gap-based measurements for the released configuration, with the UE handling releases for existing configurations before setting up new ones when the same configuration identifier is reused to prevent configuration conflicts.

To configure PPW, the base station transmits a RRCReconfiguration message that comprises DL-PPW-PreConfig.

PPW

The downlink positioning reference signal processing window (DL-PRS processing window or DL-PPW) is a configurable measurement window within which the User Equipment (UE) is expected to measure DL-PRS signals, provided that the window falls within the active downlink bandwidth part (BWP) and uses the same numerology as the active DL BWP. The DL-PPW configuration is provided through the DL-PPW-PreConfig Information Element, which specifies parameters including a unique DL-PPW identifier (dl-PPW-ID), periodicity and starting slot offset (dl-PPW-PeriodicityAndStartSlot), window length in slots (length), optional window type (type), and optional priority level (priority) to manage resource conflicts between DL-PRS and other downlink signals or channels. The dl-PPW-PeriodicityAndStartSlot parameter defines both the repetition periodicity of the processing window in slots and the temporal offset of the first window occurrence relative to system frame number zero and slot zero of the serving cell, with different periodicity options available for each subcarrier spacing configuration (15 kHz, 30 kHz, 60 kHz, and 120 kHz) to accommodate various deployment scenarios and positioning update rate requirements. The length parameter specifies the duration of the DL-PRS processing window in slots, with values ranging from one to one hundred sixty slots, where a value of one indicates a single-slot window duration, a value of two indicates a two-slot duration, and so on, enabling flexible window sizing to match DL-PRS resource configurations and measurement complexity. The priority parameter indicates the relative priority between physical downlink control channel (PDCCH), physical downlink shared channel (PDSCH), channel state information reference signal (CSI-RS), and positioning reference signal (PRS) as specified in technical specifications, with enumerated values st1, st2, and st3 representing different priority states that determine whether the UE prioritizes DL-PRS measurements over reception of other downlink signals and channels during the processing window. The type parameter specifies the DL-PRS processing window type with enumerated values type1A, type1B, and type2, which define different operational behaviors and measurement expectations for the UE, enabling network flexibility in configuring processing windows that match specific positioning use cases and performance requirements. Multiple DL-PPW configurations can be simultaneously active for a given downlink BWP, with the dl-PPW-PreConfigToAddModList field in BWP-DownlinkDedicated providing a list of DL-PRS processing window configurations to be added or modified (supporting up to maxNrofPPW-Config-r17 configurations), and the dl-PPW-PreConfigToReleaseList field specifying configurations to be released through their DL-PPW identifiers. Based on the priority indication received in the DL-PPW configuration, the UE determines the relative importance of DL-PRS measurements compared to other downlink operations, and when DL-PRS priority is higher, the UE is expected to prioritize DL-PRS measurements and may deprioritize or skip reception of other downlink signals and channels during the processing window to ensure positioning measurement quality. The processing window configuration enables efficient resource allocation by defining specific time intervals during which the UE focuses on DL-PRS measurements, allowing the network to coordinate positioning resource usage with data transmission and other radio resource management operations while providing the UE with clear expectations about when to perform positioning measurements. This structured approach to DL-PRS processing window configuration supports advanced positioning techniques by enabling precise temporal coordination between network transmissions and UE measurements, facilitating both periodic and on-demand positioning operations while maintaining flexibility to adapt window parameters based on service requirements, radio conditions, and network load.

```
-- ASN1START
DL-PPW-PreConfig-r17 ::= SEQUENCE {
    dl-PPW-ID-r17                           DL-PPW-ID-r17,
    dl-PPW-PeriodicityAndStartSlot-r17              DL-PPW-PeriodicityAndStartSlot-
r17,
    length-r17                              INTEGER (1..160),
    type-r17                                    ENUMERATED {type1A, type1B,
type2}    OPTIONAL,
    priority-r17                                    ENUMERATED {st1, st2, st3}
OPTIONAL
}
DL-PPW-ID-r17 ::= INTEGER (0..maxNrofPPW-ID-1-r17)
DL-PPW-PeriodicityAndStartSlot-r17 ::= CHOICE {
    scs15       CHOICE{
        n4          INTEGER (0..3),
        n8          INTEGER (0..7),
        n16         INTEGER (0..15),
        n32         INTEGER (0..31),
        n64         INTEGER (0..63),
        n160        INTEGER (0..159),
        n320        INTEGER (0..319),
        n640        INTEGER (0..639),
        ...
    },
    scs30       CHOICE {
        n8          INTEGER (0..7),
        n16         INTEGER (0..15),
        n32         INTEGER (0..31),
        n64         INTEGER (0..63),
        n128        INTEGER (0..127),
        n320        INTEGER (0..319),
        ...
    }
    scs60       CHOICE {
        n16         INTEGER (0..15),
        n32         INTEGER (0..31),
        n64         INTEGER (0..63),
        n256        INTEGER (0..255),
        n640        INTEGER (0..639),
        ...
    }
    scs120      CHOICE {
```

-continued

```
            n32       INTEGER (0..31),
            n64       INTEGER (0..63),
            n128      INTEGER (0..127),
            n512      (INTEGER (0..511),
            n1280     INTEGER (0..1279),
            ...
        },
        ...
    }
    DL-PPW-PreConfigToAddModList-r17 ::= SEQUENCE (SIZE (1..maxNrofPPW-
Config-r17)) OF DL-PPW-PreConfig-r17
    DL-PPW-PreConfigToReleaseList-r17 ::= SEQUENCE (SIZE (1..maxNrofPPW-
Config-r17)) OF DL-PPW-ID-r17
    -- ASN1STOP
```

Measurement Opportunity Activation.

Positioning Measurment Gap Activation/Deactivation

The User Equipment (UE) can request activation or deactivation of preconfigured positioning measurement gaps by transmitting an uplink Medium Access Control Control Element (UL MAC CE) for Positioning Measurement Gap Activation/Deactivation Request when configured with preconfigured positioning measurement gaps and authorized for MAC CE-based gap control, where the MAC entity cancels any previously triggered request and initiates a new request according to upper layer indications. When a Positioning Measurement Gap Activation/Deactivation Request MAC CE has been triggered, the UE cancels it if the upper layer indicates cancellation or if the target measurement gap has already been activated or deactivated; otherwise, if uplink shared channel (UL-SCH) resources are available that can accommodate the MAC CE and its subheader through logical channel prioritization, the UE generates and transmits the MAC CE then cancels the trigger, but if resources are insufficient, the UE initiates a scheduling request to obtain transmission resources. The network can also control preconfigured positioning measurement gap states by sending a downlink MAC CE for Positioning Measurement Gap Activation/Deactivation Command to the UE, upon reception of which the UE either deactivates the specified positioning measurement gap if the command indicates deactivation, or activates the gap and executes the measurement gap procedure if the command indicates activation. Both the uplink request MAC CE and downlink command MAC CE are identified by MAC subheaders with embedded logical channel identifiers (eLCID) and have fixed eight-bit formats comprising a four-bit Positioning MG ID field identifying the target preconfigured positioning measurement gap, a one-bit A/D field indicating activation (value 1) or deactivation (value 0), and three reserved bits set to zero. During an activated measurement gap on serving cells within the corresponding frequency range configured by measGapConfig, the UE implements transmission restrictions including prohibition of hybrid automatic repeat request (HARQ) feedback, scheduling request (SR), channel state information (CSI), sounding reference signal (SRS) transmission, and uplink shared channel (UL-SCH) transmission except for random access message three (Msg3) or MSGA payload. Physical downlink control channel (PDCCH) monitoring and downlink shared channel (DL-SCH) reception during measurement gaps are conditionally allowed only when the random access response window (ra-ResponseWindow), contention resolution timer (ra-ContentionResolutionTimer), or MSGB response window (msgB-ResponseWindow) is running, or when there is an ongoing random access channel-less (RACH-less) layer-1/layer-2-triggered mobility (LTM) cell switch or RACH-less handover procedure; otherwise, the UE shall not monitor PDCCH or receive DL-SCH during the gap. This coordinated approach to positioning measurement gap management through MAC control elements enables dynamic and efficient activation and deactivation of measurement resources based on positioning service demands, supporting both network-controlled gap management through downlink commands and UE-initiated gap requests through uplink signaling while maintaining protocol compliance during active measurement gap periods.

PPW Activation/Deactivation; Operation

The network controls preconfigured downlink positioning reference signal processing windows (DL-PPWs) by sending a downlink Medium Access Control Control Element (DL MAC CE) for PPW Activation/Deactivation Command to the User Equipment (UE), and upon reception, the UE either deactivates the specified PPW if the command indicates deactivation or activates the PPW according to the PPW operation procedure if the command indicates activation, with all PPWs considered deactivated upon activation of a downlink bandwidth part (DL BWP) or upon reconfiguration of PPWs for the active DL BWP. The PPW Activation/Deactivation Command MAC CE is identified by a MAC subheader with embedded logical channel identifier (eLCID) and has variable size comprising a two-bit numEntry field indicating the number of entries minus one (where 00 corresponds to two entries, 01 to three entries, and so on), followed by one or more entries each containing a five-bit Serving Cell ID identifying the target serving cell, a two-bit PPW ID indicating the PPW index within the active DL BWP's PPW configuration list ordered by increasing dl-PPW-ID values, a one-bit A/D field set to 1 for activation or 0 for deactivation, and one reserved bit set to zero. When a PPW is activated and positioning reference signals (PRS) have higher priority than downlink channels and signals, the UE applies transmission and reception restrictions during the affected symbols within the PPW, where physical downlink control channel (PDCCH) monitoring is conditionally allowed only when the random access response window (ra-ResponseWindow), contention resolution timer (ra-ContentionResolutionTimer), or MSGB response window (msgB-Response Window) is running. If none of these timers or windows are active during the high-priority PPW, the UE shall not receive downlink shared channel (DL-SCH) or monitor PDCCH during the affected symbols, thereby prioritizing positioning reference signal measurements over data reception and control channel monitoring to ensure positioning measurement quality. This PPW activation and deactivation mechanism through MAC control elements enables dynamic coordination between positioning operations and normal data communication, allowing the network to schedule positioning measurements efficiently while managing the impact on downlink throughput and latency based on service priorities and radio resource availability.

<LR Procedure>

To get the third location estimate, UE performs LR PROCEDURE as follows.

The UE sends to AMF an MO-LR Request message included in a UL NAS TRANSPORT message. The MO-LR Request may optionally include up to three LPP positioning message(s). Different types of location services can be requested: location estimate of the UE, location estimate of the UE to be sent to an LCS client or AF, or location assistance data. If the UE is requesting its own location or that its own location be sent to an LCS client or AF, this message carries LCS requested QoS information (e.g. accuracy, response time, LCS QoS Class), the requested maximum age of location, the requested type of location (e.g. "current location", "current or last known location") and, optionally for a current location, a scheduled location time. In addition, a Service Type indicates which MO-LR service of the LCS Client is requested by the UE may be included. The message also may include a pseudonym indicator to indicate a pseudonym should be assigned by the network and transferred to the LCS Client as the UE's identity. The message may also include integrity requirements including Time-to-Alert (TTA), Target Integrity Risk (TIR) and Alert Limit (AL).

If the UE is requesting its own location for training:

>: UE may include an indication that the MO-LR session is for AIML training. Based on the indication, LMF may determines to trigger uplink positioning method for the MO-LR session;

>: UE may include an association ID of the DL-PRS configuration for which positioning measurement is performed; and >: UE sets the requested type of location to "current location".

The AMF selects an LMF. AMF may be configured locally a mapping table of UE identity e.g. MSISDN and LMF address. When receiving a MO-LR, AMF determines LMF based on local configuration or by retrieving from UDM in the UE LCS subscriber data. The AMF forwards the information included in the MO-LR Request message to the selected LMF.

When a location estimate best satisfying the requested QoS has been obtained or when the requested location assistance data has been transferred to the UE, the LMF returns the Nlmf_Location_DetermineLocation Response towards the AMF. The service operation includes the LCS Correlation identifier, the location estimate, if this was obtained, its age and accuracy and may include information about the positioning method.

The AMF sends an MO-LR Response message included in a DL NAS TRANSPORT message. If the UE is requesting its own location, the response carries any location estimate requested by the UE and the timestamp of the location estimate (if available) including the indication received from LMF whether the obtained location estimate satisfies the requested accuracy or not, or an indicator whether a location estimate was successfully transferred to the identified LCS client or AF. If the location estimate was successfully transferred to the identified LCS Client or AF, the MO-LR Response message shall specify whether the location estimate of the UE has been handled successfully by the identified LCS Client or AF, and if not, the corresponding error cause obtained in step 13. In addition, AMF may record charging information.

<Positioning Measurement>

The UE can be configured with one or more DL PRS resource set configuration(s) as indicated by the higher layer parameters NR-DL-PRS-ResourceSet and NR-DL-PRS-Resource. Each DL PRS resource set consists of K≥1 DL PRS resource(s) where each has an associated spatial transmission filter. The UE can be configured with one or more DL PRS positioning frequency layer configuration(s) as indicated by the higher layer parameter NR-DL-PRS-PositioningFrequencyLayer. A DL PRS positioning frequency layer is defined as a collection of DL PRS resource sets which have common parameters configured by NR-DL-PRS-PositioningFrequencyLayer.

The UE assumes that the following parameters for each DL PRS resource(s) are configured via higher layer parameters NR-DL-PRS-PositioningFrequencyLayer, NR-DL-PRS-ResourceSet and NR-DL-PRS-Resource.

A DL PRS positioning frequency layer is configured by NR-DL-PRS-PositioningFrequencyLayer, consists of one or more DL PRS resource sets and it is defined by:

>: dl-PRS-SubcarrierSpacing defines the subcarrier spacing for the DL PRS resource. All DL PRS resources and DL PRS resource sets in the same DL PRS positioning frequency layer have the same value of dl-PRS-SubcarrierSpacing.

>: dl-PRS-CyclicPrefix defines the cyclic prefix for the DL PRS resource. All DL PRS Resources and DL PRS Resource sets in the same DL PRS positioning frequency layer have the same value of dl-PRS-CyclicPrefix.

>: dl-PRS-PointA defines the absolute frequency of the reference resource block. Its lowest subcarrier is also known as Point A. All DL PRS resources belonging to the same DL PRS resource set have common Point A and all DL PRS resources sets belonging to the same DL PRS positioning frequency layer have a common Point A.

The UE expects that it will be configured with dl-PRS-ID each of which is defined such that it is associated with multiple DL PRS resource sets. The UE expects that one of these dl-PRS-ID along with a nr-DL-PRS-ResourceSetID and a nr-DL-PRS-ResourceID-r16 can be used to uniquely identify a DL PRS resource.

The UE may be configured by the network with nr-PhysCellID, nr-CellGlobalID, and nr-ARFCN associated with a dl-PRS-ID.

>: If nr-PhysCellID or nr-CellGlobalID is provided, and if nr-PhysCellID, nr-CellGlobalID and nr-ARFCN associated with the dl-PRS-ID, if provided, are the same as the corresponding information of a serving cell, the UE may assume that the DL PRS is transmitted from the serving cell;

>: Otherwise, the UE may assume that the DL PRS is not transmitted from a serving cell.

If the UE assumes that the DL PRS is transmitted from a serving cell, and if the serving cell is the same as the serving cell defined by the SS/PBCH block, the UE may assume that the DL PRS and the SS/PBCH block are transmitted from the same serving cell.

If the UE assumes that the DL PRS is not transmitted from a serving cell, and if nr-PhysCellID is provided, and is the same as physical cell ID of the SS/PBCH block from a non-serving cell of the same band as the DL PRS, the UE may assume that the DL PRS and the SS/PBCH block are transmitted from the same non-serving cell.

A DL PRS resource set is configured by NR-DL-PRS-ResourceSet, consists of one or more DL PRS resources and it is defined by:

>: nr-DL-PRS-ResourceSetID defines the identity of the DL PRS resource set configuration.

>: dl-PRS-Periodicity-and-ResourceSetSlotOffset defines the DL PRS resource periodicity and the slot offset for DL PRS resource set with respect to SFN0 slot 0. All the DL PRS resources within one DL PRS resource set are configured with the same DL PRS resource periodicity.

>: dl-PRS-ResourceRepetitionFactor defines how many times each DL-PRS resource is repeated for a single instance of the DL-PRS resource. All the DL PRS resources within one resource set have the same resource repetition factor.

>: dl-PRS-ResourceTimeGap defines the offset in number of slots between two repeated instances of a DL PRS resource with the same nr-DL-PRS-ResourceID within a single instance of the DL PRS resource set. The UE only expects to be configured with dl-PRS-Resource-TimeGap if dl-PRS-ResourceRepetitionFactor is configured with value greater than 1. The time duration spanned by one instance of a nr-DL-PRS-ResourceSet is not expected to exceed the configured value of DL PRS periodicity. All the DL PRS resources within one resource set have the same value of dl-PRS-Resource-TimeGap.

>: dl-PRS-MutingOption1 and dl-PRS-MutingOption2 define the time locations where the DL PRS resource is expected to not be transmitted for a DL PRS resource set. If dl-PRS-MutingOption1 is configured, each bit in the bitmap of dl-PRS-MutingOption1 corresponds to a configurable number provided by higher layer parameter dl-prs-MutingBitRepetitionFactor of consecutive instances of a DL PRS resource set where all the DL PRS resources within the set are muted for the instance that is indicated to be muted. The length of the bitmap can be {2, 4, 6, 8, 16, 32} bits. If dl-PRS-MutingOption2 is configured each bit in the bitmap of dl-PRS-MutingOption2 corresponds to a single repetition index for each of the DL PRS resources within each instance of a nr-DL-PRS-ResourceSet and the length of the bitmap is equal to the values of dl-PRS-ResourceRepetitionFactor. Both dl-PRS-MutingOption1 and dl-PRS-MutingOption2 may be configured at the same time in which case the logical AND operation is applied to the bit maps.

>: NR-DL-PRS-SFN0-Offset defines the time offset of the SFN0 slot 0 for the DL PRS resource set with respect to SFN0 slot 0 of reference provided by nr-DL-PRS-ReferenceInfo.

>: dl-PRS-ResourceList determines the DL PRS resources that are contained within one DL PRS resource set.

>: dl-PRS-CombSizeN defines the comb size of a DL PRS resource. All DL PRS resource sets belonging to the same DL PRS positioning frequency layer have the same value of dl-PRS-CombSizeN.

>: dl-PRS-ResourceBandwidth defines the number of resource blocks configured for DL PRS transmission. The parameter has a granularity of 4 PRBs with a minimum of 24 PRBs and a maximum of 272 PRBs. All DL PRS resources sets within a DL PRS positioning frequency layer have the same value of dl-PRS-ResourceBandwidth.

>: dl-PRS-StartPRB defines the starting PRB index of the DL PRS resource with respect to reference Point A, where reference Point A is given by the higher-layer parameter dl-PRS-PointA. The starting PRB index has a granularity of one PRB with a minimum value of 0 and a maximum value of 2176 PRBs. All DL PRS resource sets belonging to the same DL PRS positioning frequency layer have the same value of dl-PRS-StartPRB.

>: dl-PRS-NumSymbols defines the number of symbols of the DL PRS resource within a slot.

A DL PRS resource is defined by:

>: nr-DL-PRS-ResourceID determines the DL PRS resource configuration identity. All DL PRS resource IDs are locally defined within a DL PRS resource set.

>: dl-PRS-SequenceID is used to initialize cinit value used in pseudo random generator as described in Clause 7.4.1.7.2 of [4, TS 38.211] for generation of DL PRS sequence for a given DL PRS resource.

>: dl-PRS-CombSizeN-AndReOffset defines the starting RE offset of the first symbol within a DL PRS resource in frequency. The relative RE offsets of the remaining symbols within a DL PRS resource are defined based on the initial offset.

>: dl-PRS-ResourceSlotOffset determines the starting slot of the DL PRS resource with respect to corresponding DL PRS resource set slot offset.

>: dl-PRS-ResourceSymbolOffset determines the starting symbol of a slot configured with the DL PRS resource.

>: dl-PRS-QCL-Info defines any quasi co-location information of the DL PRS resource with other reference signals. The DL PRS may be configured with QCL 'typeD' with a DL PRS associated with the same dl-PRS-ID, or with rs-Type set to 'typeC', 'typeD', or 'typeC-plus-typeD' with a SS/PBCH Block from a serving or non-serving cell.

>: dl-PRS-ResourcePrioritySubset defines a subset of DL-PRS resources for the DL PRS resource for the purpose of prioritization of measurement reporting.

The UE assumes constant EPRE is used for all REs of a given DL PRS resource.

The UE may be indicated by the network that DL PRS resource(s) can be used as the reference for the DL RSTD, DL PRS-RSRP, DL PRS-RSRPP, and UE Rx-Tx time difference measurements in a higher layer parameter nr-DL-PRS-ReferenceInfo. The reference indicated by the network to the UE can also be used by the UE to determine how to apply higher layer parameters nr-DL-PRS-ExpectedRSTD and nr-DL-PRS-ExpectedRSTD-Uncertainty. The UE expects the reference to be indicated whenever it is expected to receive the DL PRS. This reference provided by nr-DL-PRS-ReferenceInfo may include a dl-PRS-ID, a DL PRS resource set ID, and optionally a single DL PRS resource ID or a list of DL PRS resource IDs. The UE may use different DL PRS resources or a different DL PRS resource set to determine the reference for the RSTD measurement as long as the condition that the DL PRS resources used belong to a single DL PRS resource set is met. If the UE chooses to use a different reference than indicated by the network, then it is expected to report the dl-PRS-ID, the DL PRS resource ID(s) or the DL PRS resource set ID used to determine the reference.

The UE may be configured to report quality metrics NR-TimingQuality corresponding to the DL RSTD and UE Rx-Tx time difference measurements which include the following fields:

>: timingQualityValue which provides the best estimate of the uncertainty of the measurement >: timingQualityResolution which specifies the resolution levels used in the timingQualityValue field.

The UE expects to be configured with higher layer parameter nr-DL-PRS-ExpectedRSTD, which defines the time difference with respect to the received DL subframe timing the UE is expected to receive DL PRS, and nr-DL-PRS-ExpectedRSTD-Uncertainty, which defines a search window around the nr-DL-PRS-ExpectedRSTD.

For DL UE positioning measurement reporting in higher layer parameters NR-DL-TDOA-SignalMeasurementInformation or NR-Multi-RTT-SignalMeasurementInformation the UE can be configured to report the DL PRS resource ID(s) or the DL PRS resource set ID(s) associated with the DL PRS resource(s) or the DL PRS resource set(s) which are used in determining the UE measurements DL RSTD, or UE Rx-Tx time difference, respectively.

For the DL RSTD, DL PRS-RSRP, DL PRS-RSRPP, and UE Rx-Tx time difference measurements the UE reports an associated higher layer parameter nr-TimeStamp. The nr-TimeStamp can include the dl-PRS-ID, the SFN and the slot number for a subcarrier spacing. These values correspond to the reference which is provided by nr-DL-PRS-ReferenceInfo.

The UE is expected to measure the DL PRS resource outside the active DL BWP or with a numerology different from the numerology of the active DL BWP if the measurement is made during a configured measurement gap. When the UE is expected to measure the DL PRS resource, the UE may request a measurement gap via higher layer parameter NR-PRS-MeasurementInfoList. The UE may be preconfigured with one or more measurement gaps each associated with a measPosPreConfigGapId. When the UE requests activation or deactivation of a measurement gap it can request one of the preconfigured measurement gaps by referring to the measPosPreConfigGapId.

The UE assumes that the DL PRS from the serving cell is not mapped to any symbol that contains SS/PBCH block from the serving cell. If the time frequency location of the SS/PBCH block transmissions from non-serving cells are provided to the UE then the UE also assumes that the DL PRS from a non-serving cell is not mapped to any symbol that contains the SS/PBCH block of the same non-serving cell.

The UE may be configured to measure and report, subject to UE capability, up to 4 DL RSTD measurements per pair of dl-PRS-ID with each measurement between a different pair of DL PRS resources or DL PRS resource sets within the DL PRS configured for those dl-PRS-ID. If the UE is not configured to report with multiMeasInSameReport-r17, the up to 4 measurements being performed on the same pair of dl-PRS-ID and all DL RSTD measurements in the same report use a single reference timing. If the UE is configured to report with multiMeasInSameReport-r17, the up to 4 measurements being performed on the same pair of dl-PRS-ID and all DL RSTD measurements in the same measurement instance of the same report use a single reference timing.

The UE may be configured to measure and report, subject to UE capability, up to 24 DL PRS-RSRP measurements on DL PRS resources associated with the same dl-PRS-ID. When the UE reports DL PRS-RSRP measurements from one DL PRS resource set, the UE may indicate which DL PRS-RSRP measurements associated with the same higher layer parameter nr-DL-PRS-RxBeamIndex have been performed using the same spatial domain filter for reception if for each nr-DL-PRS-RxBeamIndex reported there are at least 2 DL PRS-RSRP measurements associated with it within the DL PRS resource set. When the UE reports DL PRS-RSRP measurements for a DL PRS resource, the reported multiple DL PRS-RSRP measurements associated with the same or different higher layer parameter nr-DL-PRS-RxBeamIndex may have the same or different timestamps.

The UE may be configured to measure and optionally report, subject to UE capability, up to 24 DL PRS-RSRPP for the first detected path on DL PRS resources associated with the same dl-PRS-ID. When the UE reports DL PRS-RSRPP measurements for a DL PRS resource, the reported multiple DL PRS-RSRPP measurements associated with the same or different higher layer parameter nr-DL-PRS-RxBeamIndex may have the same or different timestamps. When the UE reports DL PRS-RSRPP measurements from one DL PRS resource set, the UE may indicate which DL PRS-RSRPP measurements associated with the same higher layer parameter nr-DL-PRS-RxBeamIndex have been performed using the same spatial domain filter for reception if for each nr-DL-PRS-RxBeamIndex reported there are at least 2 DL PRS-RSRPP measurements associated with it within the DL PRS resource set.

The UE may be configured to optionally report a differential DL PRS-RSRPP for a DL PRS resource with reference to nr-DL-PRS-FirstPathRSRP-Result and/or a differential DL PRS RSRP with reference to nr-DL-PRS-RSRP-Result via higher layer parameter NR-DL-AoD-AdditionalMeasurementElement.

For each DL PRS resource, the UE may be configured, subject to UE capability, with dl-PRS-ResourcePrioritySubset that is associated with this DL PRS resource, where the subset of DL PRS resources associated with the DL PRS resource can be in the same or different DL PRS resource set than the DL PRS resource. The UE may include UE measurements for the subset of DL PRS resources in NR-DL-AoD-AdditionalMeasurementElement if the UE measurements of the associated PRS resource are reported, where the UE measurement can be DL PRS-RSRP and/or DL PRS-RSRPP. The UE may report DL PRS-RSRP and/or DL PRS-RSRPP measurements only for the subset of DL PRS resources. Subject to UE capability, the UE may be configured with boresight direction via higher layer parameter DL-PRS-BeamInfoElement for each DL PRS resource.

The UE may be provided with beam/antenna information via higher layer parameter NR-TRP-BeamAntennaInfo.

The UE may request to be provided with either expected DL-AoD/ZOD and uncertainty range(s) of expected DL-AoD/ZoD, or expected DL-AoA/ZoA and uncertainty range (s) of the expected DL-AoA/ZoA. The UE may be provided with expected DL-AoD/ZoD and uncertainty range(s) of the expected DL-AoD/ZoD. The UE may be provided with expected DL-AoA/ZoA and uncertainty range(s) of the expected DL-AoA/ZoA. The uncertainty range(s) of the expected DL-AoD/DL-AoA may be configured within [0, 60]. The uncertainty range(s) of expected DL-ZoD/DL-ZoA may be configured within [0, 30].

The UE may be configured to measure and report, subject to UE capability, up to 4 UE Rx-Tx time difference measurements corresponding to a single configured SRS resource or resource set for positioning. Each measurement corresponds to a single received DL PRS resource or resource set which can be in different DL PRS positioning frequency layers.

The UE may be configured to measure and report via higher layer parameter additionalPaths or additionalPathsExt, subject to UE capability, the timing and the quality metrics of up to 8 additional detected paths, that are associated with each RSTD or UE Rx−Tx time difference. The timing of each additional path is reported relative to the path timing used for determining nr-RSTD or nr-UE-RxTxTimeDiff. For UE positioning measurement reporting higher in layer parameters NR-DL-TDOA-SignalMeasurementInformation or NR-Multi-RTT-SignalMeasurementInformation, the UE may be configured to measure and report, subject to UE capability, the DL PRS-RSRPP of the first path and the up to 8 additional paths that are associated with each RSTD or UE Rx−Tx time difference.

The UE may be requested, subject to UE capability, to report LoS/NLOS indicator(s) via higher layer parameter nr-los-nlos-IndicatorRequest. The UE can report LoS/NLOS indicator(s) via higher layer parameter nr-los-nlos-Indicator associated with each DL RSTD, DL PRS-RSRP, DL PRS-RSRPP, and UE Rx−Tx time difference measurements. The UE can report LoS/NLOS indicator(s) via higher layer parameter nr-los-nlos-Indicator associated with each dl-PRS-ID in a measurement report. For the LoS/NLoS indicator(s) associated with DL RSTD, the UE may report one indicator associated with the dl-PRS-ID indicated by higher layer parameter dl-PRS-ReferenceInfo and one indicator associated with the dl-PRS-ID of the DL RSTD measurement. A UE may be provided with LoS/NLOS indicator(s) via higher layer parameter nr-los-nlos-Indicator, and it may be associated with each DL PRS resource of each configured dl-PRS-ID or may be associated with each configured dl-PRS-ID. The values of the higher layer parameter LOS-NLOS-Indicator may be soft values (0, 0.1, . . . , 0.9, 1) or hard values (0, 1) with the values corresponding to the likelihood of LoS, with a value of 1 corresponding to LoS and a value of 0 corresponding to NLoS.

If the UE is configured with DL-PRS-QCL-Info and the QCL relation is between two DL PRS resources, then the UE assumes those DL PRS resources are associated with the same dl-PRS-ID. If DL-PRS-QCL-Info is configured to the UE with QCL set to 'type-D' with a source DL PRS resource then the nr-DL-PRS-ResourceSetId and the nr-DL-PRS-ResourceId of the source DL PRS resource are expected to be indicated to the UE.

The UE is expected to measure the DL PRS outside the measurement gap, subject to UE capability, if the DL PRS is inside the active DL BWP and has the same numerology as the active DL BWP and is within the DL PRS processing window indicated by higher layer parameter DL-PPW-PreConfig. The UE is not expected to measure the DL PRS outside the measurement gap if the expected received timing difference between the DL PRS from the non-serving cell and that from the serving cell, determined by the higher layer parameters nr-DL-PRS-ExpectedRSTD and nr-DL-PRS-ExpectedRSTD-Uncertainty, is larger than maximum Rx timing difference provided by UE capability. For receiving the DL PRS outside the measurement gap and within the DL PRS processing window, the UE determines the DL PRS priority as indicated by higher layer parameter priority subject to UE capability or as implied by UE capability, except for SSB:

>: with value 'st1' where the DL PRS is higher priority than all the DL signals and channels, or >: with value 'st2' where the DL PRS is lower priority than PDCCH and the PDSCH scheduled by DCI formats 1_1, 1_2, 1_3 or 4_2 with the priority indicator field in the corresponding DCI format set to 1, and is higher priority than other DL signals and channels, or >: with value 'st3' where the DL PRS is lower priority than all the DL signals and channels.

Inside one DL-PPW-PreConfig the UE is only expected to measure a single DL PRS positioning frequency layer.

When the UE is expected to measure the DL PRS outside the measurement gap in a configured DL PRS processing window with type1A and if the DL PRS is determined to be higher priority than the DL signals and channels inside the DL PRS processing window, those DL signals and channels are not expected to be measured by the UE. When the UE is expected to measure the DL PRS outside the measurement gap in a configured DL PRS processing window with type1B and if the DL PRS is determined to be higher priority than the DL signals and channels inside the DL PRS processing window, those DL signals and channels in the same band as the DL PRS are not expected to be measured by the UE. When the UE is expected to measure the DL PRS outside the measurement gap in a configured DL PRS processing window with type2 if the DL PRS is determined to be higher priority than the DL signals and channels inside the DL PRS processing window, those DL signals and channels from the impacted serving cells are not expected to be measured by the UE on the overlapped symbols with the DL PRS, where impacted serving cells refer to the serving cell on which the DL-PPW-PreConfig is configured for a frequency range 1 band, and all the serving cells in the same band as the DL PRS for a frequency range 2 band.

When the UE has an activated DL PRS processing window with type1A or type1B and the UE determines the presence of other DL signals and channels, except SSB, of higher priority than the DL PRS in the DL PRS processing window no later than N2 symbols before the first symbol of the DL PRS processing window, the UE is expected to receive the other DL signals and channels and drop all PRS within the DL PRS processing window. When the UE has an activated DL PRS processing window with type2 and the UE determines the presence of other DL signals and channels, except SSB, of higher priority than the DL PRS on a symbol configured with the DL PRS no later than N2 symbols before the DL PRS symbol, the UE is expected to receive the other DL signals and channels and drop the DL PRS symbol.

When the UE has an activated DL PRS processing window with type1A or type1B and the UE determines the presence of other DL signals and channels, except SSB, of higher priority than the DL PRS in the DL PRS processing window later than N2 symbols before the first symbol of the DL PRS processing window, the UE is not required to receive the other DL signals and channels and may receive the DL PRS and consider the DL PRS as higher priority in the DL PRS processing window. When the UE has an activated DL PRS processing window with type2 and the UE determines the presence of other DL signals and channels, except SSB, of higher priority than the DL PRS on a symbol configured with the DL PRS later than N2 symbols before the DL PRS symbols, the UE is not required to receive the other DL signals and channels and may receive the DL PRS symbol and consider the DL PRS as higher priority in that symbol.

Within a positioning frequency layer, the DL PRS resources are sorted in the decreasing order of priority for measurement to be performed by the UE, with the reference indicated by nr-DL-PRS-ReferenceInfo being the highest priority for measurement, and the following priority is assumed:

>: Up to 64 NR-SelectedDL-PRS-IndexPerTRP of the DL PRS positioning frequency layer are sorted according to priority if nr-SelectedDL-PRS-IndexListPerFreq is provided, or up to 64 NR-DL-PRS-AssistanceDataPerTRP of the frequency layer are sorted according to priority; except when the UE is requested to perform aggregated measurement(s), in which case:

>>: A DL-PRS ID associated with DL PRS bandwidth aggregation linkage has higher priority than a DL-PRS ID not associated with DL PRS bandwidth aggregation linkage. If multiple DL-PRS ID are associated with DL PRS bandwidth aggregation linkage, they are sorted according to priority.

>: Up to 2 DL-SelectedPRS-ResourceSetIndex per dl-PRS-ID of the DL PRS positioning frequency layer are sorted according to priority if dl-SelectedPRS-ResourceSetIndexList is provided, or up to 2 NR-DL-PRS-ResourceSet per dl-PRS-ID of the DL PRS positioning frequency layer are sorted according to priority except when the UE is requested to perform aggregated measurement(s), in which case:

>>: A DL PRS resource set linked for a DL PRS bandwidth aggregation has higher priority than a DL PRS resource set not linked for DL PRS bandwidth aggregation. If multiple DL PRS resource sets are linked for DL PRS bandwidth aggregation, then they are sorted according to priority.

Timing Error Group(s) (TEG(s)) at UE side are defined:

>: UE Rx TEG is associated with one or more DL measurements, which have the Rx timing error difference within a certain margin.

>: UE RxTx TEG is associated with one or more UE Rx−Tx time difference measurements, which have the 'Rx timing errors+Tx timing errors' difference within a certain margin.

The UE may be configured to report, subject to UE capability, via high layer parameter nr-UE-RxTEG-Request, the association information of DL RSTD measurement(s) with UE Rx TEG(s) via higher layer parameter nr-UE-Rx-TEG-ID when the UE reports the DL RSTD measurement (s). The UE may report up to 4 RSTD measurements associated with different DL PRS resources per UE Rx TEG per dl-PRS-ID.

The UE may report a UE Rx TEG ID via higher layer parameter nr-UE-Rx-TEG-ID for a RSTD reference time dl-PRS-ReferenceInfo and a UE Rx TEG ID for each DL RSTD measurement, where the DL RSTD can be DL RSTD measurement in NR-DL-TDOA-MeasElement and/or NR-DL-TDOA-AdditionalMeasurementElement.

If the UE reports a UE Rx TEG ID with a DL RSTD measurement, the UE may report a UE Rx TEG timing error margin value, via high layer parameter nr-UE-RxTEG-TimingErrorMargin, for all the UE Rx TEGs within one NR-DL-TDOASignalMeasurementInformation.

The UE may be configured to measure and report, via high layer parameter measureSameDL-PRS-ResourceWith-DifferentRxTEGs subject to UE capability, RSTD measurements on a DL PRS resource associated with a dl-PRS-ID using up to 8 different UE Rx TEGs with the same dl-PRS-ReferenceInfo. The higher layer parameter measureSameDL-PRS-ResourceWithDifferentRxTEGs applies to all DL PRS positioning frequency layers.

The UE may be provided with association information of DL PRS resource(s) with TRP Tx TEGs via higher layer parameter dl-prs-trp-Tx-TEG-ID for a dl-PRS-ID.

The UE may be configured to report, via high layer parameter nr-UE-RxTxTEG-Request, subject to UE capability, the association information of UE Rx−Tx time difference measurement(s) with UE RxTx TEG(s) via higher layer parameter nr-UE-RxTx-TEG-ID. The UE may report up to 4 UE Rx−Tx time difference measurements associated with different DL PRS resources per UE RxTx TEG per dl-PRS-ID.

If the UE reports a UE RxTx TEG ID with a UE Rx−Tx time difference measurement, the UE may report a UE RxTx TEG timing error margin value, via high layer parameter nr-UE-RxTxTEG-TimingErrorMargin, for all the UE RxTx TEGs within one NR-Multi-RTT-SignalMeasurementInformation.

The UE may be configured to report, via high layer parameter nr-UE-RxTxTEG-Request, subject to UE capability, the association information of UE Rx−Tx time difference measurement(s) with the UE Rx TEG(s) and UE Tx TEG(s) via the higher layer parameters of nr-UE-Rx-TEG-ID, and nr-UE-Tx-TEG-Index. The UE may report up to 4 UE Rx−Tx time difference measurements associated with different DL PRS resources per UE Rx TEG per dl-PRS-ID.

If the UE reports a UE Rx TEG ID with a UE Rx−Tx time difference measurement, the UE may report a UE Rx TEG timing error margin value, via high layer parameter nr-UE-RxTEG-TimingErrorMargin, for all the UE Rx TEGs within one NR-Multi-RTT-SignalMeasurementInformation.

The UE may be configured to measure and report, via high layer parameter measureSameDL-PRS-ResourceWith-DifferentRxTEGs subject to UE capability, UE Rx−Tx time difference measurements on a PRS resource associated with a dl-PRS-ID using up to 8 different UE Rx TEGs. The high layer parameter measureSameDL-PRS-Resource WithDifferentRxTEGs applies to all DL PRS positioning frequency layers.

The UE may be configured to measure and report, via high layer parameter measureSameDL-PRS-ResourceWith-DifferentRxTxTEGs subject to UE capability, UE Rx-Tx time difference measurements with the same UE Tx TEG using up to 8 different UE RxTx TEGs. The high layer parameter measureSameDL-PRS-ResourceWithDifferentRxTxTEGs applies to all DL PRS positioning frequency layers.

The UE may be configured to measure and report, via higher layer parameter [undetermined NTN related parameter] subject to UE capability, UE Rx−Tx time difference measurements on a PRS resource associated with a dl-PRS-ID, and report the UE Rx−Tx time difference subframe offset and the DL timing drift.

The UE in RRC_INACTIVE or RRC_IDLE mode is expected to prioritize the reception of any other DL signals and DL channels than the reception of DL PRS.

The UE in RRC_INACTIVE or RRC_IDLE mode, subject to UE capability, is expected to process DL PRS outside or inside of the initial DL BWP. For DL PRS processing outside of the initial DL BWP, the UE may be configured with the same or different subcarrier spacing and CP for DL PRS resources than those of the initial DL BWP. For DL PRS processing inside of the initial DL BWP, the UE is configured with the same subcarrier spacing and CP for DL PRS resources as those of the initial DL BWP.

When the UE is expected to perform aggregated measurements for bandwidth aggregation across DL PRS positioning frequency layers, the UE expects to be configured with linkage information, via higher layer parameter nr-DL-PRS-AggregationInfo, between DL PRS resource sets across DL PRS positioning frequency layers. For the linked DL PRS resource sets, the UE is expected to be configured with the same values of dl-PRS-QCL-Info, dl-PRS-Periodicity-and-ResourceSetSlotOffset, dl-PRS-NumSymbols, dl-PRS-Resource TimeGap, dl-PRS-ResourceRepetitionFactor, dl-PRS-ResourceSymbolOffset, dl-PRS- MutingBitRepetitionFactor, dl-PRS-SubcarrierSpacing, dl-PRS-CyclicPrefix, dl-PRS-CombSizeN, dl-PRS-ResourcePower, NR-MutingPattern, and NR-DL-PRS-SFN0-Offset, and the UE is expected to be configured with DL PRS resources that maintain uniformly spaced DL PRS RE pattern within a symbol across aggregated DL PRS positioning frequency layers. The UE assumes that DL PRS resources across the linked DL PRS resource sets which satisfy the above conditions are linked for bandwidth aggregation, and the UE may assume phase continuity on the DL PRS resources on same symbol(s); otherwise, the UE does not assume that PRS resources from the linked DL PRS resource sets are linked for bandwidth aggregation.

The UE may be indicated by the network that aggregated DL PRS resource set(s) can be used as the reference for the aggregated DL RSTD, DL PRS-RSRP, DL PRS-RSRPP, and UE Rx−Tx time difference measurements.

The UE may be configured to measure and report, subject to UE capability, up to 4 aggregated DL RSTD measurement (s) per pair of dl-PRS-ID, from a different pair of aggregated DL PRS resources across two or three DL PRS positioning frequency layers. The UE may report up to 4 RSTD measurements associated with different aggregated DL PRS resources per UE Rx TEG per dl-PRS-ID.

The UE may be configured to measure and report, subject to UE capability, up to 4 aggregated UE Rx−Tx time difference measurement(s) from aggregated DL PRS resources across two or three DL PRS positioning frequency layers. The UE may report up to 4 UE Rx−Tx time difference measurements associated with different aggregated DL PRS resources per UE RxTx TEG per dl-PRS-ID.

The UE may be requested via higher layer parameter nr-DL-PRS-JointMeasurementRequestedPFL-List to perform the aggregated DL RSTD measurement(s) or the aggregated UE Rx−Tx time difference measurement(s) across two or three DL PRS positioning frequency layers.

The UE may report via higher layer parameter nr-RSTD-BasedOnAggregatedResources or nr-UE-RxTxTimeDiff-BasedOnAggregatedResources in a measurement report whether the aggregated DL RSTD measurement(s) or the aggregated UE Rx−Tx time difference measurement(s) is performed. If any aggregated measurement is performed, the two or three DL PRS positioning frequency layers to be used may also be reported by reporting PRS resource set IDs.

If the UE reports a DL PRS-RSRP or a DL PRS-RSRPP with aggregated DL RSTD measurement(s) or aggregated UE Rx−Tx time difference measurement(s), the DL PRS-RSRP or the DL PRS-RSRPP correspond to the aggregated DL PRS resources across two or three DL PRS positioning frequency layers.

For PRS resources on multiple DL PRS positioning frequency layers (PFLs) linked for aggregation, the channel over which a symbol on one PFL for PRS transmission is conveyed can be inferred from the channel over which the same symbol of another PFL or the aggregated PFL is conveyed.

<Positioning Measurement Result Management>

Based on the positioning measurement, the following measurement results are obtained. UE puts a specific part of the measurement results into the AIML model. UE may convert the specific part of the measurement results to a specific format that are more suitable for AIML training before the measurement results are put into the AIML model.

UE may maintain plurality of logged measurement result sets. Each set is associated with a association ID. A set associated with association ID x may include a dl-PRS-ReferenceInfo-r16 IE and plurality of NR-DL-TDOA-MeasElement-r16 IEs. Each NR-DL-TDOA-MeasElement-r16 IE is tagged with NR-TimeStamp-r16. UE may tag (stores together) the NR-DL-TDOA-MeasElement-r16 IE with UTC determined from the corresponding NR-TimeStamp-r16.

UE may determine the mapping between NR-TimeStamp and UTCTime based on timeInfo in SIB9.

NR-DL-TDOA-SignalMeasurementInformation

The NR-DL-TDOA-SignalMeasurementInformation Information Element provides downlink time difference of arrival (DL-TDOA) measurements for New Radio (NR) positioning, where all reference signal time difference (RSTD) measurements (nr-RSTD and nr-RSTD-ResultDiff) are reported relative to a designated “RSTD reference” transmission-reception point (TRP) identified by dl-PRS-ReferenceInfo, which may differ from the “assistance data reference” TRP used for assistance data coordination. Each measurement element (NR-DL-TDOA-MeasElement) contains timing measurements for a specific TRP or resource identified by dl-PRS-ID, physical cell identity, resource set identifier, and resource identifier, with the nr-RSTD field providing the relative timing difference between the neighbor TRP and the reference TRP using variable-resolution encoding (k0 through k5 and extended kMinus6 through kMinus1) to accommodate different timing measurement ranges and precision requirements. The nr-TimeStamp field specifies the exact time instance (system frame number, slot, and optionally symbol) at which time-of-arrival (TOA), reference signal carrier phase (RSCP), and reference signal received power (RSRP) or received path power (RSRPP) measurements were performed, with all timing references corresponding to the reference TRP specified in dl-PRS-ReferenceInfo to enable consistent temporal alignment across measurements. Measurement quality and propagation characteristics are captured through nr-TimingQuality indicating TOA measurement quality, nr-PhaseQuality indicating carrier phase measurement quality, and nr-los-nlos-Indicator specifying line-of-sight or non-line-of-sight propagation conditions either per TRP or per resource, enabling the location server to weight measurements appropriately during position calculation. The information element supports advanced measurement scenarios including multiple additional RSTD measurements per TRP pair through nr-DL-TDOA-AdditionalMeasurements and nr-DL-TDOA-AdditionalMeasurementsExt (supporting up to four measurements with different UE receive timing error groups per resource), multipath detection through nr-AdditionalPathList and nr-AdditionalPathListExt (providing up to eight additional detected path timings relative to the primary path), and bandwidth aggregation through nr-MeasBasedOnAggregatedResources with nr-AggregatedDL-PRS-ResourceInfo-List identifying the aggregated resource sets used for combined measurements. Carrier phase measurements are supported through nr-RSCPD (reference signal carrier phase difference) and nr-RSCPD-AddMeasurementSamples fields providing up to four phase measurement samples per TRP pair to enable high-precision positioning techniques, with differential encoding used for additional measurements (nr-RSTD-ResultDiff, nr-DL-PRS-RSRP-ResultDiff, nr-DL-PRS-FirstPathRSRP-ResultDiff) relative to the primary measurement to reduce signaling overhead while maintaining measurement precision across multiple resources and samples.

```
-- ASN1START
NR-DL-TDOA-SignalMeasurementInformation-r16 ::= SEQUENCE {
    dl-PRS-ReferenceInfo-r16                DL-PRS-ID-Info-r16,
    nr-DL-TDOA-MeasList-r16                 NR-DL-TDOA-MeasList-r16,
    nr-UE-RxTEG-TimingErrorMargin-r17       TEG-TimingErrorMargin-r17    OPTIONAL,
    ...
}
NR-DL-TDOA-MeasList-r16 ::= SEQUENCE (SIZE(1..nrMaxTRPs-r16)) OF NR-DL-TDOA-MeasElement-r16
NR-DL-TDOA-MeasElement-r16 ::= SEQUENCE {
    dl-PRS-ID-r16                           INTEGER (0..255),
    nr-PhysCellID-r16                       NR-PhysCellID-r16    OPTIONAL,
    nr-DL-PRS-ResourceID-r16                NR-DL-PRS-ResourceID-r16    OPTIONAL,
    nr-DL-PRS-ResourceSetID-r16             NR-DL-PRS-ResourceSetID-r16    OPTIONAL,
    nr-TimeStamp-r16                        NR-TimeStamp-r16,
    nr-RSTD-r16                             CHOICE {
        k0-r16    INTEGER (0..1970049),
        k1-r16    INTEGER (0..985025),
        k2-r16    INTEGER (0..492513),
        ...
    },
    nr-AdditionalPathList-r16               NR-AdditionalPathList-r16    OPTIONAL,
    nr-TimingQuality-r16                    NR-TimingQuality-r16,
    nr-DL-PRS-RSRP-Result-r16               INTEGER (0..126)    OPTIONAL,
    nr-DL-TDOA-AdditionalMeasurements-r16   NR-DL-TDOA-AdditionalMeasurements-r16    OPTIONAL,
    nr-UE-Rx-TEG-ID-r17                     INTEGER (0..maxNumOfRxTEGs-1-r17)    OPTIONAL,
    nr-DL-PRS-FirstPathRSRP-Result-r17      INTEGER (0..126)    OPTIONAL,
    nr-los-nlos-Indicator-r17               CHOICE {
        perTRP-r17          LOS-NLOS-Indicator-r17,
        perResource-r17     LOS-NLOS-Indicator-r17
    }                                       OPTIONAL,
    nr-MeasBasedOnAggregatedResources-r18   ENUMERATED {true}    OPTIONAL,
    nr-RSCPD-r18                            INTEGER (0..3599)    OPTIONAL,
    nr-PhaseQuality-r18                     NR-PhaseQuality-r18    OPTIONAL,
    ...
    }
    NR-DL-TDOA-AdditionalMeasurements-r16 ::= SEQUENCE (SIZE (1..3)) OF
                                            NR-DL-TDOA-AdditionalMeasurementElement-r16
    NR-DL-TDOA-AdditionalMeasurementElement-r16 ::= SEQUENCE {
        nr-DL-PRS-ResourceID-r16            NR-DL-PRS-ResourceID-r16
                OPTIONAL,
    nr-DL-PRS-ResourceSetID-r16             NR-DL-PRS-ResourceSetID-r16    OPTIONAL,
    nr-TimeStamp-r16                        NR-TimeStamp-r16,
    nr-RSTD-ResultDiff-r16                  CHOICE {
        k0-r16    INTEGER (0..8191),
        k1-r16    INTEGER (0..4095),
        ...
    },
    nr-TimingQuality-r16                    NR-TimingQuality-r16,
    nr-DL-PRS-RSRP-ResultDiff-r16           INTEGER (0..61)    OPTIONAL,
    ...
  }
  -- ASN1STOP
```

NR-TimeStamp

The IE NR-TimeStamp defines the UE measurement associated time stamp.

```
-- ASN1START
NR-TimeStamp-r16 ::= SEQUENCE {
dl-PRS-ID-r16                    INTEGER (0..255),
nr-PhysCellID-r16                NR-PhysCellID-r16
OPTIONAL,      -- Need ON
nr-CellGlobalID-r16              NCGI-r15
        OPTIONAL,      --Need ON
        nr-ARFCN-r16             ARFCN-ValueNR-r15
OPTIONAL,      -- Need ON
nr-SFN-r16                           INTEGER (0..1023),
nr-Slot-r16                          CHOICE {
               scs15-r16                 INTEGER (0..9),
               scs30-r16                 INTEGER (0..19),
               scs60-r16                 INTEGER (0..39),
               scs120-r16                INTEGER (0..79)
},
...,
[[
nr-Symbol-r18                    INTEGER (0..13)
OPTIONAL       -- Need ON
]]
}
-- ASN1STOP
```

dl-PRS-ID: This field specifies the DL-PRS ID of the TRP for which the nr-SFN is applicable.

nr-PhysCellID: This field specifies the physical cell identity of the associated TRP, as defined in TS 38.331 [35].

nr-CellGlobalID: This field specifies the NCGI, the globally unique identity of a cell in NR, of the associated TRP, as defined in TS 38.331 [35].

nr-ARFCN: This field specifies the ARFCN of the TRP's CD-SSB (as defined in TS 38.300 [47]) corresponding to nr-PhysCellID associated with the dl-PRS-ID.

nr-SFN: This field specifies the NR system frame number for the time stamp.

nr-Slot: This field specifies the NR slot number within the NR system frame number indicated by nr-SFN for the time stamp.

nr-Symbol: This field specifies the NR symbol index within the NR slot number indicated by nr-Slot for the time stamp for RSCP/RSCPD measurement.

SIB9

SIB9 contains information related to GPS time and Coordinated Universal Time (UTC). The UE may use the parameters provided in this system information block to obtain the UTC, the GPS and the local time.

The UE may use the time information for numerous purposes, possibly involving upper layers e.g. to assist GPS initialisation, to synchronise the UE clock.

```
        -- ASN1START
        -- TAG-SIB9-START
        SIB9 ::=                      SEQUENCE {
            timeInfo                      SEQUENCE {
                timeInfoUTC                   INTEGER (0..549755813887),
                dayLightSavingTime                BIT STRING (SIZE (2))
OPTIONAL,       -- Need R
                leapSeconds                           INTEGER(-127..128 )
OPTIONAL,       --Need R
                localTimeOffset                           INTEGER(-63..64)
OPTIONAL        --Need R
            }
OPTIONAL,       --Need R
            lateNonCriticalExtension                      OCTET STRING
OPTIONAL,
            ...,
            [[
            referenceTimeInfo-r16                 ReferenceTimeInfo-r16
OPTIONAL        -- Need R
            ]],
            [[
            eventID-TSS-r18                               INTEGER(0..63)
OPTIONAL        -- Need R
            ]]
        }
        -- TAG-SIB9-STOP
        -- ASN1STOP
```

DayLightSavingTime: Indicates if and how daylight-saving time (DST) is applied to obtain the local time. The first/leftmost bit of the bit string contains the b2 of octet 3 and the second bit of the bit string contains b1 of octet 3 in the value part of the Daylight Saving Time IE.

eventID-TSS: This field indicates the status of the 5G access stratum time distribution parameter Clock Quality Reporting Control Information.

LeapSeconds: Number of leap seconds offset between GPS Time and UTC. UTC and GPS time are related i.e. GPS time-leapSeconds=UTC time.

LocalTimeOffset: Offset between UTC and local time in units of 15 minutes. Actual value=field value*15 minutes. Local time of the day is calculated as UTC time+localTimeOffset.

TimeInfoUTC: Coordinated Universal Time corresponding to the SFN boundary at or immediately after the ending boundary of the SI-window in which SIB9 is transmitted. The field counts the number of UTC seconds in 10 ms units since 00:00:00 on Gregorian calendar date 1 Jan. 1900 (midnight between Sunday, Dec. 31, 1899 and Monday, Jan. 1, 1900). See NOTE 1. This field is excluded when determining changes in system information, i.e. changes of timeInfoUTC should neither result in system information change notifications nor in a modification of valueTag in SIB1.

<AIML Training>

UE performs followings.

>: UE obtains label (second location estimate or third location estimate).

>: UE determines time stamp of the label.

>: UE determines relevant measurement results from the logged/stored measurement results.

>: UE determines the first location estimate from the relevant measurement results.

>: UE adjusts the AIML model based on the difference between the first location estimate and the label.

When a second location estimate is available, UE performs AIML training based on the second location estimate and relevant first location estimate. The second location estimate becomes available when the GNSS module in the UE determines the second location estimate.

When a third location estimate is available, UE performs AIML training based on the third location estimate and relevant first location estimate. The third location estimate becomes available when the MO-LR response containing the third location estimate is received from the LMF.

The relevant first location estimate is first location estimate that is determined from the measurement results that are relevant with the second location estimate or with the third location estimate respectively.

The measurement results are relevant with the second (or third) location estimate in case that the difference between UTCTime of the measurement results and the UTCTime of the second (or third) location estimate are within a specific range (e.g. time distance between two are smaller than a threshold).

The measurement result is relevant with the second (or third) location estimate in case that difference between UTCTime of the measurement result and the UTCTime of the second (or third) location estimate is within a specific range and is smallest.

utcTime: This field provides the time stamp of the refTime in UTC time and comprises the following subfields:

>: utcTime in the form of YYMMDDhhmmssZ.

>: utcTime-ms specifies the fractional part of the UTC time in ms resolution.

LocationCoordinates

The LocationCoordinates Information Element provides a comprehensive set of geographic shape representations for specifying locations in positioning systems, offering multiple encoding formats with varying levels of precision and dimensionality to accommodate different positioning accuracy requirements and use cases ranging from basic two-dimensional positioning to high-accuracy three-dimensional positioning with uncertainty characterization. The information element supports basic geographic shapes including Ellipsoid-Point for simple point locations, Ellipsoid-PointWithUncertaintyCircle for locations with circular uncertainty regions, EllipsoidPointWithUncertaintyEllipse for locations with elliptical uncertainty that better represents directional accuracy variations, Polygon for area-based location representations, EllipsoidPointWithAltitude for three-dimensional point locations, EllipsoidPointWithAltitude-AndUncertaintyEllipsoid for three-dimensional locations with three-dimensional uncertainty ellipsoids, and EllipsoidArc for arc-shaped geographic regions. For enhanced positioning accuracy requirements, the information element includes high-accuracy variants such as HighAccuracyEllipsoidPointWithUncertaintyEllipse-r15 and HighAccuracyEllipsoidPointWithAltitudeAndUncertaintyEllipsoid-r15, which use extended integer ranges for latitude (−2147483648 to 2147483647) and longitude (−2147483648 to 2147483647) to provide sub-meter and even centimeter-level coordinate precision compared to standard variants that use 23-bit and 24-bit fields with coarser quantization. The Ellipsoid-PointWithUncertainty-Circle shape specifies a location through latitudeSign (north or south), degreesLatitude (0 to 8388607 range providing approximately 1.35-meter resolution), degreesLongitude (−8388608 to 8388607 range), and uncertainty (0 to 127) representing the radius of the circular uncertainty region, enabling simple yet effective representation of locations where directional accuracy variations are minimal or unknown. The EllipsoidPointWithUncertaintyEllipse shape extends circular uncertainty to elliptical uncertainty through additional parameters including uncertaintySemiMajor and uncertaintySemiMinor (both ranging 0 to 127) representing the semi-major and semi-minor axes of the uncertainty ellipse, orientationMajorAxis (0 to 179 degrees) indicating the bearing of the major axis, and confidence (0 to 100 percent) specifying the probability that the true location lies within the defined ellipse, allowing more accurate representation of positioning errors that vary with direction due to factors like geometric dilution of precision. The Ellipsoid-PointWithAltitudeAndUncertaintyEllipsoid shape adds three-dimensional capability through altitudeDirection (height above or depth below reference surface), altitude (0 to 32767 range providing approximately 1-meter vertical resolution), uncertaintyAltitude (0 to 127) for vertical uncertainty, and confidence (0 to 100 percent) for combined horizontal and vertical confidence level, enabling full three-dimensional location specification with complete uncertainty characterization suitable for applications requiring altitude information such as aviation, multi-floor indoor positioning, and terrain-aware navigation. Advanced high-accuracy variants introduced in later releases use significantly extended ranges: HighAccuracyEllipsoid-PointWithAltitudeAndUncertaintyEllipsoid-r15 provides altitude range of −64000 to 1280000 (supporting 640 meters below to 12800 meters above reference with 0.01-meter resolution), uncertaintySemiMajor and uncertaintySemiMinor range of 0 to 255 (providing finer uncertainty quantization), and separate horizontalConfidence and verticalConfidence parameters to independently characterize horizontal and vertical positioning quality with values ranging from 0 to 100 percent. The HA-EllipsoidPointWithAltitudeAnd-ScalableUncertaintyEllipsoid-r16 and HA-Ellipsoid-PointWithScalableUncertaintyEllipse-r16 variants introduce scalable uncertainty representation through Boolean flags ha-HorizontalExtendedRangeUsed-r16 and ha-VerticalExtendedRangeUsed-r16 (or ha-ExtendedUncertaintyRangeUsed-r16 for 2D variant), which indicate whether extended uncertainty ranges are used, enabling dynamic range adaptation based on actual positioning accuracy while maintaining backward compatibility with standard uncertainty encoding and supporting applications that require flexibility in uncertainty representation across different deployment scenarios. Additionally, the information element supports local coordinate system representations through Local2dPointWithUncertaintyEllipse-r18 and Local3dPointWithUncertaintyEllipsoid-r18, which provide location coordinates in local Cartesian reference frames rather than global geodetic coordinates, enabling more efficient and accurate positioning in confined areas such as indoor environments, industrial facilities, or campus settings where local coordinate systems offer computational advantages and better alignment with physical infrastructure. This hierarchical approach to location representation with multiple accuracy levels and uncertainty characterization methods enables flexible deployment strategies where network operators and service providers can select appropriate location encoding formats based on application requirements, balancing between signaling overhead, computational complexity, and positioning accuracy to optimize performance across diverse use cases ranging from basic outdoor navigation to precision indoor positioning and safety-critical applications requiring centimeter-level accuracy with rigorous uncertainty quantification.

```
-- ASN1START
LocationCoordinates ::= CHOICE {
  ellipsoidPoint                                  Ellipsoid-Point,
  ellipsoidPointWithUncertaintyCircle                         Ellipsoid-
PointWithUncertaintyCircle,
  ellipsoidPointWithUncertaintyEllipse
EllipsoidPointWithUncertaintyEllipse,
  ellipsoidPointWithAltitudeAndUncertaintyEllipsoid
EllipsoidPointWithAltitudeAndUncertaintyEllipsoid,
  highAccuracyEllipsoidPointWithUncertaintyEllipse-v1510
              HighAccuracyEllipsoidPointWithUncertaintyEllipse-r15,
  highAccuracyEllipsoidPointWithAltitudeAndUncertaintyEllipsoid-v1510
HighAccuracyEllipsoidPointWithAltitudeAndUncertaintyEllipsoid-r15,
  ha-EllipsoidPointWithScalableUncertaintyEllipse-v1680
              HA-EllipsoidPointWithScalableUncertaintyEllipse-r16,
  ha-EllipsoidPointWithAltitudeAndScalableUncertaintyEllipsoid-v1680
              HA-
EllipsoidPointWithAltitudeAndScalableUncertaintyEllipsoid-r16,
  ...
}
-- Basic 2D with circular uncertainty
Ellipsoid-PointWithUncertaintyCircle ::= SEQUENCE {
  latitudeSign         ENUMERATED {north, south},
  degreesLatitude      INTEGER (0..8388607),
  degreesLongitude     INTEGER (−8388608..8388607),
  uncertainty          INTEGER (0..127)
}
-- Basic 2D with elliptical uncertainty
EllipsoidPointWithUncertaintyEllipse ::= SEQUENCE {
  latitudeSign            ENUMERATED {north, south},
  degreesLatitude         INTEGER (0..8388607),
  degreesLongitude        INTEGER (-8388608..8388607),
  uncertaintySemiMajor    INTEGER (0..127),
  uncertaintySemiMinor    INTEGER (0..127),
  orientationMajorAxis    INTEGER (0..179),
  confidence              INTEGER (0..100)
}
-- Basic 3D with ellipsoidal uncertainty
EllipsoidPointWithAltitudeAndUncertaintyEllipsoid ::= SEQUENCE {
  latitudeSign            ENUMERATED {north, south},
  degreesLatitude         INTEGER (0..8388607),
  degreesLongitude        INTEGER (−8388608..8388607),
  altitudeDirection       ENUMERATED {height, depth},
  altitude                INTEGER (0..32767),
  uncertaintySemiMajor    INTEGER (0..127),
  uncertaintySemiMinor    INTEGER (0..127),
  orientationMajorAxis    INTEGER (0..179),
  uncertainty Altitude    INTEGER (0..127),
  confidence              INTEGER (0..100)
}
-- High-accuracy 2D with elliptical uncertainty
HighAccuracyEllipsoidPointWithUncertaintyEllipse-r15 ::= SEQUENCE {
  degreesLatitude-r15         INTEGER(−2147483648..2147483647),
  degreesLongitude-r15        INTEGER(-2147483648..2147483647),
  uncertaintySemiMajor-r15    INTEGER (0..255),
  uncertaintySemiMinor-r15    INTEGER (0..255),
```

-continued

```
    orientationMajorAxis-r15        INTEGER (0..179),
    confidence-r15                  INTEGER (0..100)
  }
  -- High-accuracy 3D with ellipsoidal uncertainty
  HighAccuracyEllipsoidPointWithAltitudeAndUncertaintyEllipsoid-r15 ::=
SEQUENCE {
    degreesLatitude-r15             INTEGER(-2147483648..2147483647),
    degreesLongitude-r15            INTEGER(-2147483648..2147483647),
    altitude-r15                    INTEGER(-64000..1280000),
    uncertaintySemiMajor-r15        INTEGER (0..255),
    uncertaintySemiMinor-r15        INTEGER (0..255),
    orientationMajorAxis-r15        INTEGER (0..179),
    horizontalConfidence-r15        INTEGER (0..100),
    uncertainty Altitude-r15        INTEGER (0..255),
    verticalConfidence-r15          INTEGER (0..100)
  }
  -- High-accuracy with scalable uncertainty (3D)
  HA-EllipsoidPointWithAltitudeAndScalableUncertaintyEllipsoid-r16 ::=
SEQUENCE {
    degreesLatitude-r16                                   INTEGER(-
2147483648..2147483647),
    degreesLongitude-r16                                  INTEGER(-
2147483648..2147483647),
    altitude-r16                          INTEGER(-64000..1280000),
    uncertaintySemiMajor-r16              INTEGER (0..255),
    uncertaintySemiMinor-r16              INTEGER (0..255),
    orientationMajorAxis-r16              INTEGER (0..179),
    horizontalConfidence-r16              INTEGER (0..100),
    uncertainty Altitude-r16              INTEGER (0..255),
    verticalConfidence-r16                INTEGER (0..100),
    ha-HorizontalExtendedRangeUsed-r16    BOOLEAN,
    ha-VerticalExtendedRangeUsed-r16      BOOLEAN,
  }
  --ASN1STOP
```

Basic Accuracy Shapes:

Latitude/Longitude encoding uses 23-bit and 24-bit fields respectively, providing approximately 1.35-meter horizontal resolution suitable for general outdoor positioning applications where meter-level accuracy is sufficient.

Altitude encoding uses 15-bit field with range 0 to 32767, providing approximately 1-meter vertical resolution with altitudeDirection indicating whether the value represents height above or depth below the reference ellipsoid surface.

Uncertainty parameters use 0 to 127 range with logarithmic scaling to cover uncertainty values from sub-meter to several kilometers, enabling compact representation across diverse accuracy scenarios.

High Accuracy Shapes:

Latitude/Longitude encoding uses 32-bit signed integers ranging from −2147483648 to 2147483647, providing centimeter-level or sub-centimeter horizontal resolution necessary for precision applications such as autonomous vehicle navigation, precise surveying, and industrial automation.

Altitude encoding uses extended range −64000 to 1280000 representing −640 meters to 12800 meters with 0.01-meter quantization, accommodating applications from underground mining to high-altitude aviation with decimeter or centimeter vertical accuracy.

Uncertainty parameters use extended 0 to 255 range with refined scaling to represent sub-meter uncertainties more accurately, supporting applications requiring rigorous error characterization and quality-of-service guarantees.

Scalable Uncertainty Shapes:

High-accuracy coordinate encoding identical to standard high-accuracy shapes maintains centimeter-level position resolution across all scalable uncertainty variants.

Boolean flags (ha-HorizontalExtendedRangeUsed, ha-VerticalExtendedRangeUsed, ha-ExtendedUncertaintyRangeUsed) enable receivers to interpret uncertainty values with either standard or extended scaling, providing backward compatibility while supporting future enhancements.

Separate horizontal and vertical confidence parameters allow independent quality characterization for horizontal and vertical dimensions, recognizing that positioning accuracy often differs significantly between these dimensions due to satellite geometry and measurement characteristics.

Uncertainty Representation Methods:

Circular uncertainty (Circle) uses single radius parameter representing isotropic uncertainty, appropriate when positioning errors are approximately equal in all horizontal directions or when directional error characteristics are unknown.

Elliptical uncertainty (Ellipse) uses semi-major axis, semi-minor axis, and orientation parameters to represent anisotropic horizontal uncertainty, capturing the directional dependence of positioning errors caused by geometric dilution of precision, multipath effects, or asymmetric measurement availability.

Ellipsoidal uncertainty (Ellipsoid) combines horizontal elliptical uncertainty with independent vertical uncertainty, providing complete three-dimensional error characterization essential for applications requiring altitude accuracy assessment such as aircraft landing systems, drone operations, and multi-floor indoor positioning.

<Training RRC Procedure>

When training starts, UE transmits an RRC message to the GNB. The RRC message includes the following fields/IEs.

>: a field that indicates AIML model training is ongoing (or just started);

>: a field that contains association ID of the AIML model;

>: a field that indicates the expected duration for AIML training;

>: a field that contains information on DL-PRS resources used for AIML training.

The RRC message could be LOCATION MEASUREMENT INDICATION. The RRC message could be UEAssistanceInformation. For UE to use UEAssistanceInformation, UE receives a RRCReconfiguration message that includes a specific field. The specific field indicates that UE is allowed to send UEAssistanceInformation to report AIML model training status.

Upon reception of the RRC message, GNB may apply proper policy to the UE such as refraining state transition to RRC_IDLE.

When training is successfully completed, UE transmits the RRC message to the GNB. The RRC message includes the following fields/IEs.

>: a field that indicates AIML model training is completed;

>: a field that contains association ID of the AIML model;

>: a field that contains information on DL-PRS resources used for AIML training.

In case that:

>: UE receives RRCReconfiguration message that includes Reconfiguration WithSync; and >: UE is performing AIML training, UE stops DL-PRS measurement before starting DL synchronization to the target cell; and UE performs MEASUREMENT OPPORTUNITITY PROCEDURE when synchronous reconfiguration is successfully completed (e.g. when random access is successfully completed in the target cell).

UE associates the AIML model with the association ID of the assistance data.

UE trains the AIML model based on input, output and the label (ground-truth).

>: UE performs periodic measurement on the DL-PRS configured by the assistance data;

>: UE stores/logs the measurement results together with time stamp;

>: UE receives location information from the LMF (for the location service session established for training);

>: UE identifies logged measurement result that is closest in time domain to the time stamp of the location information;

>: UE put the logged measurement results and network configuration into the AIML model;

>: UE trains the AIML model based on the output and the location information.

Input (O100) includes:

>: measurement results on DL-PRS configured by the assistance data;

>: network configurations/conditions (e.g. TRP locations . . . ) corresponding to the association ID.

Output (O200) includes:

>: latitude; longitude and uncertainty that are determined from the input.

>: altitude and uncertainty that are determined from the input.

Label includes:

>: latitude; longitude and uncertainty that are indicated from the LMF.

>: altitude and uncertainty that are determined from the LMF.

When training is completed:

>: UE stores the AIML model together with the association ID;

>: UE sends first set of messages to release the session/resources:

>>: UE sends a message to GNB to deactivate/release measurement gap (or PPW).

The message is either LocationMeasurementIndication or Positioning Measurement Gap Activation/Deactivation Request or both;

>>: UE sends a message to LMF to deactivate/release the DL-PRS;

>>: UE sends a message to XXX to stop the location service session;

If DL-PRS is released before training is completed:

>: UE stores the AIML model together with the association ID;

>: If UE battery is enough and training is allowed in the current cell, UE may determine to continue training. UE sends a message to GNB to request the measurement gap;

>: If UE battery is low or training is not allowed in the current cell, UE may determine to stop the training. UE sends first set of messages.

If location service stops before training is completed:

>: UE stores the AIML model together with the association ID;

>: If UE battery is enough and training is allowed in the current cell, UE may determine to continue training. UE sends a message to XXX to request new location service session;

>: If UE battery is low or training is not allowed in the current cell, UE may determine to stop the training. UE sends first set of messages.

The following are used interchangeably:

>: location estimate determined by AI/ML model inference operation and AIML-based location estimate;

>: UE and target device and terminal;

>: LMF and location server;

>: AIML model and associationID

Figure 3J:
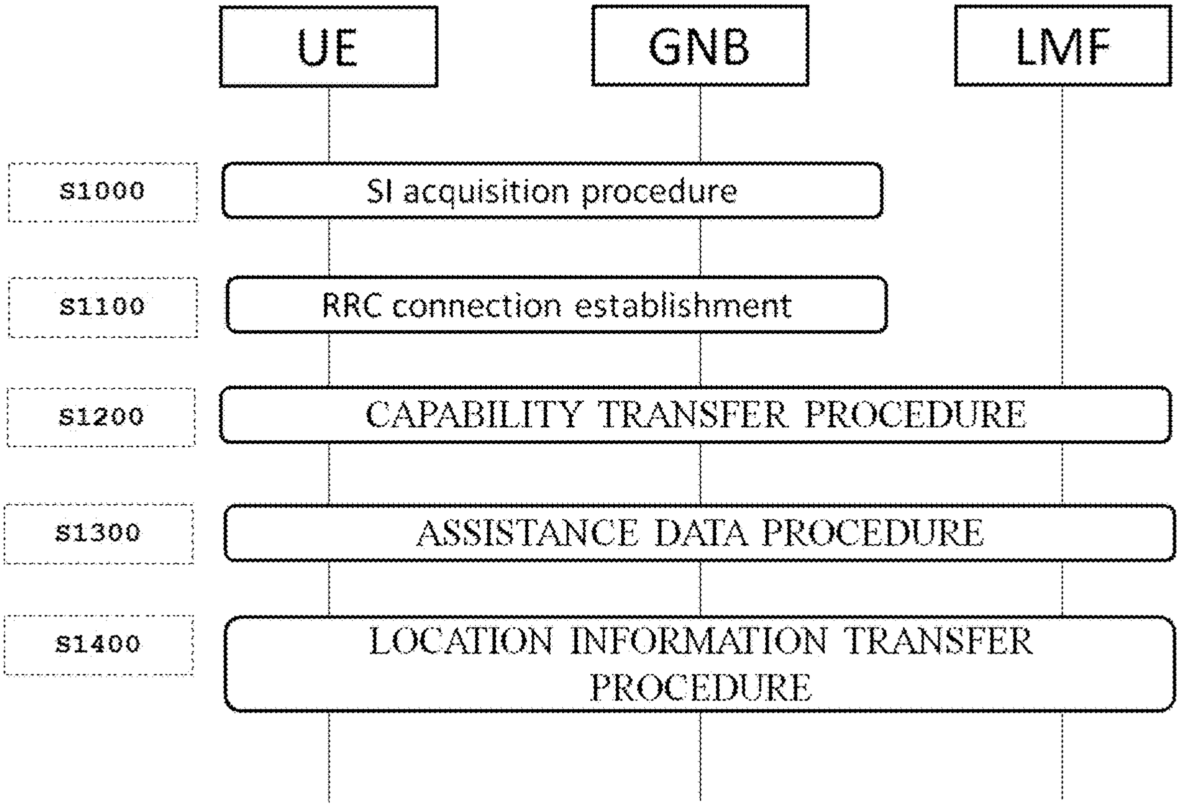
FIG. 3J illustrates overall operation of the UE and network for AIML based positioning.

As illustrated in FIG. 3J, for AIML inference operation, UE and LMF may perform the following.

At S1000, UE performs SI acquisition procedure.

At S1100, UE establishes RRC connection with the GNB.

At some point in time, LMF may decide to initiate positioning procedure.

At S1200, UE and LMF perform CAPABILITY TRANSFER PROCEDURE.

At S1300, UE performs ASSISTANCE DATA PROCEDURE.

At S1400, UE performs LOCATION INFORMATION TRANSFER PROCEDURE. UE may perform AIML INFERENCE when LOCATION INFORMATION TRANSFER PROCEDURE is performed.

For AIML-based positioning method, UE needs to determine which AIML model with which association ID shall be used. In UE originated method, UE indicates which association IDs are supported by the UE via ProvideCapabilities message. Network indicates which association ID is applicable for AIML-based positioning via RequestLocationInformation message. In the LMF originated method, LMF indicates which associationIDs are supported for AIML-based positioning via RequestLocationInformation message. UE selects one of associationID and reports it via ProvideCapabilities message. LMF may provide required assistance information via ProvideAssistanceData message.

Figure 3K:
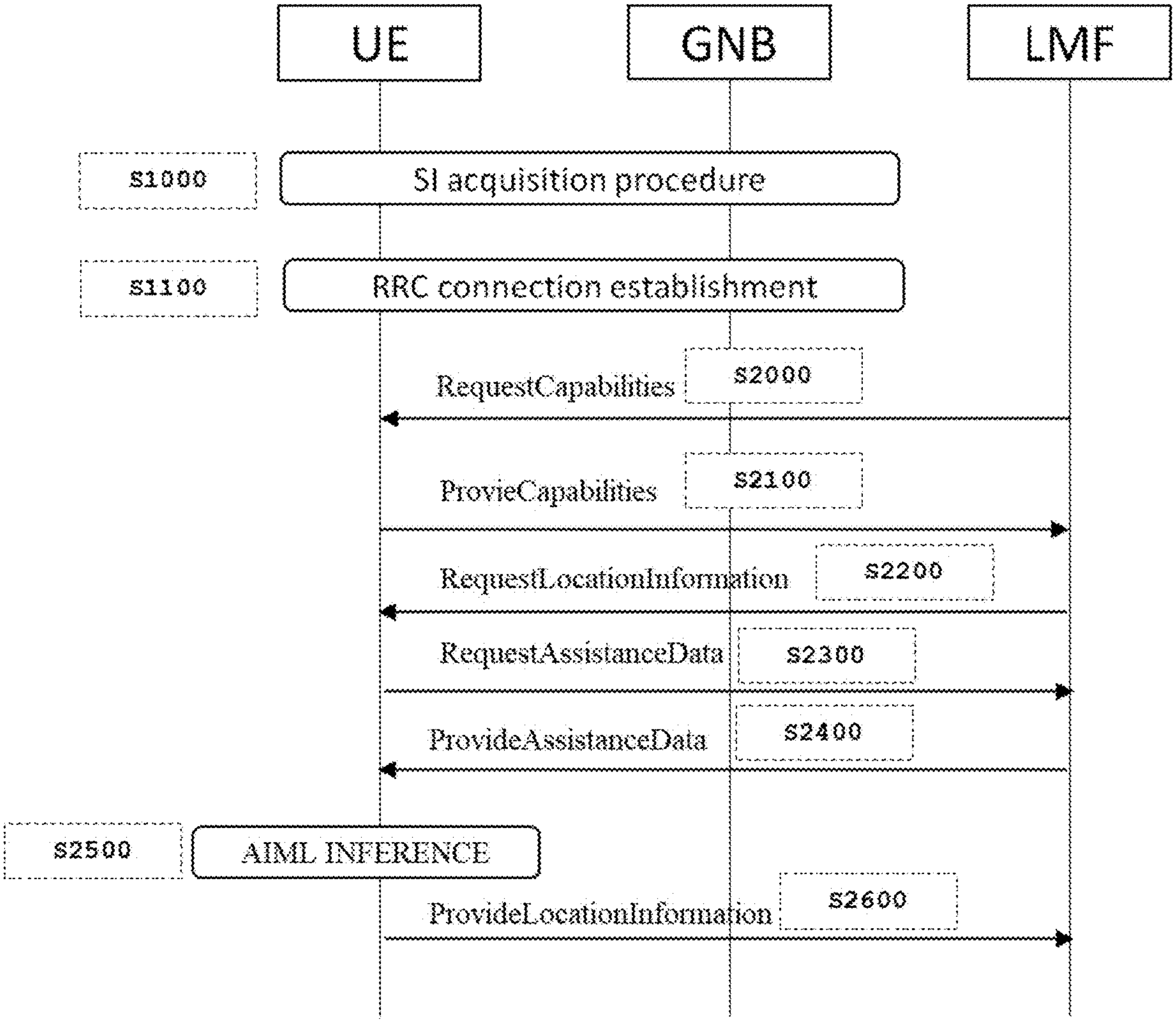
FIG. 3K illustrates overall operation of the UE and network for AIML based positioning.
Figure 3L:
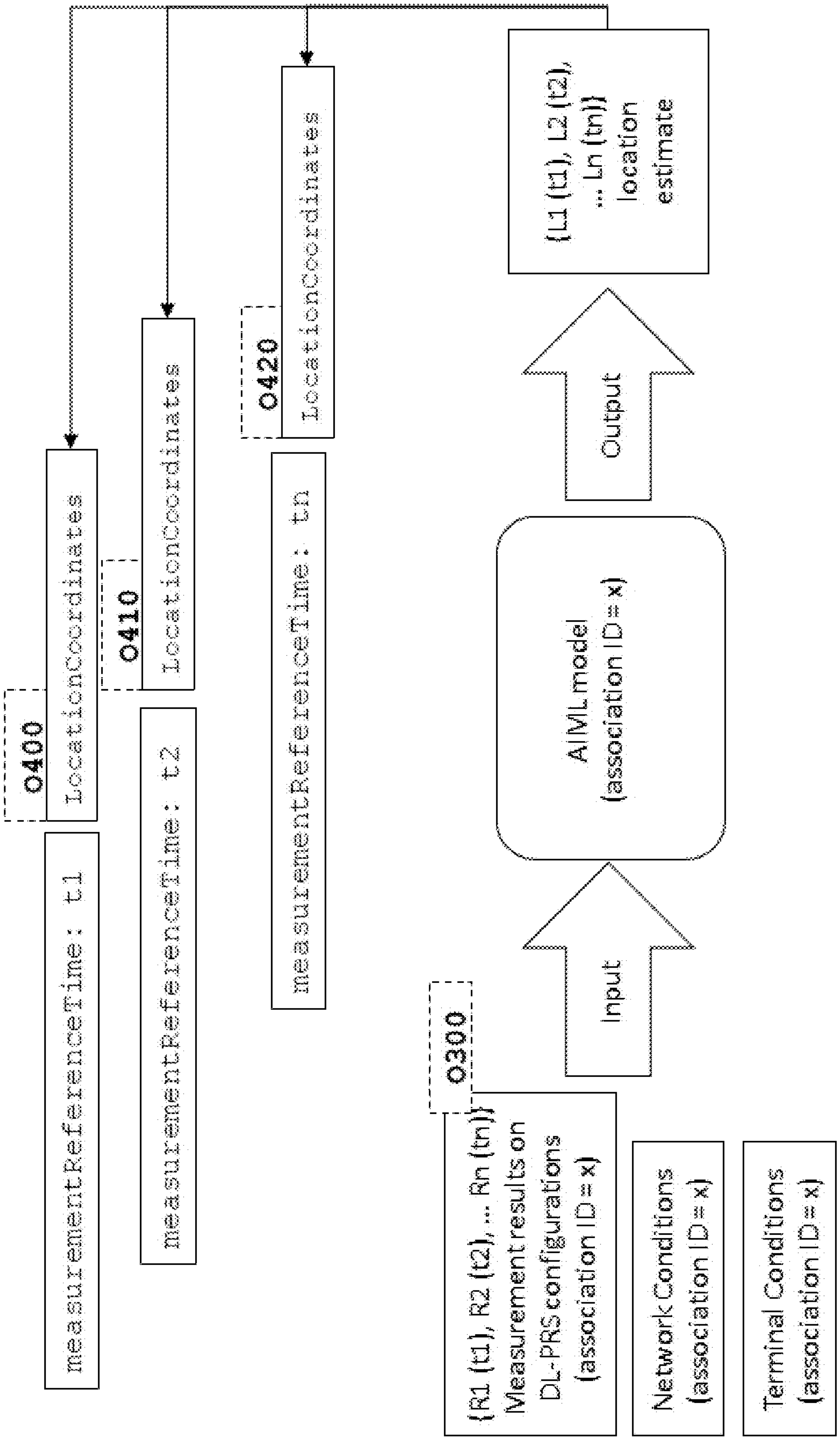
FIG. 3L is a diagram illustrating example of inference operation for AIML based positioning.

As illustrated in FIG. 3K, for AIML inference operation, UE and LMF may perform the following.

At S1000, UE performs SI acquisition procedure.

At S1100, UE establishes RRC connection with the GNB.

At some point in time, LMF may decide to initiate positioning procedure.

At S2000, LMF sends to the UE a RequestCapabilities LPP message.

LMF includes nr-AIML-RequestCapabilities field in the message. LMF may include other fields such as nr-DL-TDOA-RequestCapabilities-r16 or nr-DL-AoD-RequestCapabilities if LMF wants to acquire UE capabilities on other positioning method.

At S2100, UE sends to the LMF a ProvideCapabilities LPP message.

UE includes nr-AIML-ProvideCapabilities field in the message in case that nr-AIML-RequestCapabilities field was included in the RequestCapabilities message. nr-AIML-ProvideCapabilities field includes trainedAIMLModelList. nr-AIML-ProvideCapabilities field may include DL-PRS related capabilities such as nr-DL-PRS-ProcessingCapability.

If RequestCapabilities LPP message included nr-DL-AoD-ProvideCapabilities and nr-DL-TDOA-ProvideCapabilities, UE includes nr-DL-AoD-ProvideCapabilities and nr-DL-TDOA-ProvideCapabilities in the message.

At S2200, LMF sends to the UE a RequestLocationInformation LPP message.

Based on the reported capabilities, LMF decides one or more positioning methods.

>: In case that at least one of AIML models indicated in the trainedAIMLModelList:

>>: is supported by the LMF; and

>>: of which expected QoS fulfils the requirement,

>: LMF may decide to apply AIML-based positioning. In this case LMF includes nr-AIML-RequestLocationInformation in the RequestLocationInformation LPP message.

LMF may include other fields such as nr-DL-AoD-RequestLocationInformation and nr-DL-TDOA-RequestLocationInformation to activate other positioning methods if needed.

LMF may include supportedAIMLModelList in NR-AIML-RequestLocationInformation to inform UE which AIML models can be activated.

LMF may set nr-Aiml-AssistanceAvailability to true to inform UE that UE can request assistance data for AMIL models in the supportedAIMLModelList.

At S2300, UE sends to the LMF a RequestAssistanceData LPP message.

In case that system information does not provide required DL PRS configuration for AIML inference operation (e.g. AIML-NR-DL-PRS-AssistanceData with matching associationID), UE sends the RequestAssistanceData LPP message.

UE includes nr-aiml-prs-RequestAssistanceData field in the message. UE may include nr-DL-AoD-RequestLocationInformation and/or nr-DL-TDOA-RequestLocationInformation if needed.

UE includes requestedAssociationId field. UE sets nr-aiml-1 cm field to indicate that the purpose is 'inference'.

At S2400, LMF sends to the UE a ProvideAssistanceData LPP message.

LMF includes aiml-ProvideAssistanceData field in the message.

LMF may include nr-DL-AoD-ProvideAssistanceData and nr-DL-TDOA-ProvideAssistanceData if needed.

LMF includes AIML-NR-DL-PRS-AssistanceData in the AIML-ProvideAssistanceData. AIML-NR-DL-PRS-AssistanceData may include one or more associationIDs. Each associationID may be associated with one or more NR-DL-PRS-ResourceSet.

Upon receiving the message, UE may perform MEASUREMENT OPPORTUNITY PROCEDURE if measurement gap/PPW is required to perform DL-PRS measurement.

UE performs POSITIONING MEASUREMENT.

At S2500, UE performs AIML INFERENCE.

At S2600, UE sends to the LMF a ProvideLocationInformation LPP message.

UE includes nr-AIML-ProvideLocationInformation field in the message. The nr-AIML-ProvideLocationInformation field includes:

>: LocationCoordinates determined from AIML inference operation; and

>: QoS of the LocationCoordinates, if needed;

>: associationID of the AIML model.

<Capability Transfer Procedure>

In CAPABILITY TRANSFER PROCEDURE, LMF transmits RequestCapabilities LPP message and UE responds with ProvideCapabilities LPP message.

RequestCapabilities

The RequestCapabilities message body in a LPP message is used by the location server to request the target device capability information for LPP and the supported individual positioning methods. If LMF has intention to enable AIML inference operation, LMF includes nr-AIML-RequestCapabilities-r19 in the message.

```
-- ASN1START
RequestCapabilities ::= SEQUENCE {
 criticalExtensions              CHOICE {
  c1                                       CHOICE {
   requestCapabilities-r9              RequestCapabilities-r9-IEs,
   spare3 NULL, spare2 NULL, spare1 NULL
  },
  criticalExtensionsFuture SEQUENCE { }
 }
}
RequestCapabilities-r9-IEs ::= SEQUENCE {
 commonIEsRequestCapabilities          CommonIEsRequestCapabilities
 OPTIONAL,   -- Need ON
 a-gnss-RequestCapabilities                    A-GNSS-RequestCapabilities
            OPTIONAL,   -- Need ON
 otdoa-RequestCapabilities                     OTDOA-RequestCapabilities
            OPTIONAL,   -- Need ON
 ecid-RequestCapabilities              ECID-RequestCapabilities
  OPTIONAL,   -- Need ON
 epdu-RequestCapabilities                      EPDU-Sequence
                  OPTIONAL,   -- Need ON
 ...,
 [[   sensor-RequestCapabilities-r13 Sensor-RequestCapabilities-r13
```

-continued

```
    OPTIONAL,    -- Need ON
        tbs-RequestCapabilities-r13                TBS-RequestCapabilities-r13
                    OPTIONAL,    -- Need ON
        wlan-RequestCapabilities-r13    WLAN-RequestCapabilities-r13
    OPTIONAL,    -- Need ON
        bt-RequestCapabilities-r13                 BT-RequestCapabilities-r13
                    OPTIONAL    -- Need ON
    ]],
    [[    nr-ECID-RequestCapabilities-r16         NR-ECID-RequestCapabilities-
r16       OPTIONAL,    -- Need ON
          nr-Multi-RTT-RequestCapabilities-r16
    NR-Multi-RTT-RequestCapabilities-r16
                                              OPTIONAL,    -- Need ON
        nr-DL-AoD-RequestCapabilities-r16
    NR-DL-AoD-RequestCapabilities-r16       OPTIONAL,    -- Need ON
        nr-DL-TDOA-RequestCapabilities-r16
    NR-DL-TDOA-RequestCapabilities-r16    OPTIONAL,    -- Need ON
        nr-UL-RequestCapabilities-r16   NR-UL-RequestCapabilities-r16
    OPTIONAL    -- Need ON
        nr-AIML-RequestCapabilities-r19          NR-AIML-RequestCapabilities-
r16    OPTIONAL    -- Need ON

    ]]
   }
   -- ASN1STOP
```

commonIEsRequestCapabilities

The CommonIEsRequestCapabilities carries common IEs for a Request Capabilities LPP message Type.

```
-- ASN1START
CommonIEsRequestCapabilities ::= SEQUENCE {
...,
[[
lpp-message-segmentation-req-r14              BIT STRING { serverToTarget (0),
targetToServer (1) }          OPTIONAL -- Need ON
]],
[[
remoteUE-IndicationReq-r18                    ENUMERATED { true }
                        OPTIONAL -- Cond NR
]]
}
-- ASN1STOP
```

lpp-message-segmentation-req: This field, if present, indicates that the target device is requested to provide its LPP message segmentation capabilities.

If bit 0 is set to value 1, it indicates that the server is able to send segmented LPP messages to the target device; if bit 0 is set to value 0 it indicates that the server is not able to send segmented LPP messages to the target device.

If bit 1 is set to value 1, it indicates that the server is able to receive segmented LPP messages from the target device; if bit 1 is set to value 0 it indicates that the server is not able to receive segmented LPP messages from the target device.

SegmentationInfo

The IE SegmentationInfo is used by a sender to indicate that LPP message segmentation is used, as specified in clause 4.3.5.

```
  -- ASN1START
  SegmentationInfo-r14 ::= ENUMERATED { noMoreMessages,
moreMessagesOn The Way }
  -- ASN1STOP
```

SegmentationInfo: noMoreMessages indicates that this is the only or last LPP message segment used to deliver the entire message body. moreMessagesOnTheWay indicates that this is one of multiple LPP message segments used to deliver the entire message body.

NCGI

The IE NCGI specifies the NR Cell Global Identifier (NCGI) which is used to identify NR cells globally (TS 38.331 [35]).

```
  -- ASN1START
  NCGI-r15 ::= SEQUENCE {
  mcc-r15                              SEQUENCE (SIZE (3))          OF
INTEGER (0..9),
  mnc-r15                                          SEQUENCE      (SIZE (2..3))
  OF INTEGER (0..9),
```

-continued

```
nr-cellidentity-r15          BIT STRING (SIZE (36)
}
-- ASN1STOP
```

NR-AIML-RequestCapabilities

The IE NR-AIML-RequestCapabilities is used by the location server to request the capability of the target device to support AIML based positioning method and to request NR AIML positioning capabilities from a target device.

```
--ASN1START
NR-AIML-RequestCapabilities-r16::=SEQUENCE {
. . .
}
--ASN1STOP
```

ProvideCapabilities

The ProvideCapabilities message body in a LPP message indicates the LPP capabilities of the target device to the location server. If the UE supports AIML positioning method, UE may include nr-AIML-ProvideCapabilities-r19 in the message.

```
-- ASN1START
ProvideCapabilities ::= SEQUENCE {
criticalExtensions                CHOICE {
        c1                                        CHOICE {
                provideCapabilities-r9          ProvideCapabilities-r9-IEs,
                spare3 NULL, spare2 NULL, spare1 NULL
        },
        criticalExtensionsFuture SEQUENCE { }
}
}
ProvideCapabilities-r9-IEs ::= SEQUENCE {
commonIEsProvideCapabilities          CommonIEsProvideCapabilities
        OPTIONAL,
a-gnss-ProvideCapabilities                    A-GNSS-ProvideCapabilities
                OPTIONAL,
otdoa-ProvideCapabilities                     OTDOA-ProvideCapabilities
                OPTIONAL,
ecid-ProvideCapabilities              ECID-ProvideCapabilities
            OPTIONAL,
epdu-ProvideCapabilities                      EPDU-Sequence
                                      OPTIONAL,
...,
[[      sensor-ProvideCapabilities-r13    Sensor-ProvideCapabilities-r13
        OPTIONAL,
        tbs-ProvideCapabilities-r13               TBS-ProvideCapabilities-r13
                OPTIONAL,
        wlan-ProvideCapabilities-r13      WLAN-ProvideCapabilities-r13
        OPTIONAL,
        bt-ProvideCapabilities-r13                BT-ProvideCapabilities-r13
                OPTIONAL
]],
[[      nr-ECID-ProvideCapabilities-r16           NR-ECID-ProvideCapabilities-
r16             OPTIONAL,
        nr-Multi-RTT-ProvideCapabilities-r16
NR-Multi-RTT-ProvideCapabilities-r16 OPTIONAL,
        nr-DL-AoD-ProvideCapabilities-r16
NR-DL-AoD-ProvideCapabilities-r16                 OPTIONAL,
        nr-DL-TDOA-ProvideCapabilities-r16
NR-DL-TDOA-ProvideCapabilities-r16                OPTIONAL,
        nr-UL-ProvideCapabilities-r16 NR-UL-ProvideCapabilities-r16
        OPTIONAL,
        nr-AIML-ProvideCapabilities-r19           NR-AIML-ProvideCapabilities-
r19             OPTIONAL,
]]
}
-- ASN1STOP
```

CommonIEsProvideCapabilities

The CommonIEsProvideCapabilities carries common IEs for a Provide Capabilities LPP message Type.

```
-- ASN1START
CommonIEsProvideCapabilities ::= SEQUENCE {
...,
[[
segmentationInfo-r14                          SegmentationInfo-r14
OPTIONAL,           -- Cond Segmentation
lpp-message-segmentation-r14 BIT STRING { serverToTarget (0),
                    targetToServer (1) } OPTIONAL
]],
[[
remoteUE-Indication-r18
BOOLEAN                                            OPTIONAL, -- Cond
NR
locationEstimateAndMeasurementReporting-r18   ENUMERATED { supported }
OPTIONAL,
aiml-positioning-r19                          ENUMERATED { supported }
OPTIONAL
]]
}
-- ASN1STOP
```

SegmentationInfo: This field indicates whether this ProvideCapabilities message is one of many segments, as specified in clause 4.3.5.

lpp-message-segmentation: This field, if present, indicates the target device's LPP message segmentation capabilities. If bit 0 is set to value 1, it indicates that the target device supports receiving segmented LPP messages; if bit 0 is set to value 0 it indicates that the target device does not support receiving segmented LPP messages. If bit 1 is set to value 1, it indicates that the target device supports sending segmented LPP messages; if bit 1 is set to value 0 it indicates that the target device does not support sending segmented LPP messages.

remoteUE-Indication: This field indicates whether the target device in NR access is configured as a L2 U2N Remote UE. The target device in NR access may transmit a ProvideCapabilities message with an appropriate value of this field when it starts or stops operation as a U2N Remote UE.

LocationEstimateAndMeasurementReporting: This field, if present, indicates that the PRU supports locationEstimateAndMeasurementsRequired in LocationInformationType.

aiml-positioning: This field, if present, indicates that the UE supports AIML-based positioning.

NR-AIML-ProvideCapabilities

The IE NR-AIML-ProvideCapabilities is used by the target device to indicate its capability to support AIML positioning method and to provide its AIML positioning capabilities to the location server.

```
    -- ASN1START
    NR-AIML-ProvideCapabilities-r16 ::= SEQUENCE {
    trainedAIMLModelList                                  SEQUENCE (SIZE
(1..n)) OF ModelInfo
    nr-DL-TDOA-PRS-Capability-r16                         NR-DL-PRS-
ResourcesCapability-r16,              OPTIONAL, /// if this field is not present,
corresponding field in NR-DL-TDOA-ProvideCapabilities IE is applied for AIML
positioning ///
    nr-DL-TDOA-MeasurementCapability-r16              NR-DL-TDOA-
MeasurementCapability-r16,            OPTIONAL, /// if this field is not present,
corresponding field in NR-DL-TDOA-ProvideCapabilities IE is applied for AIML
positioning ///
    nr-DL-PRS-QCL-ProcessingCapability-r16            NR-DL-PRS-QCL-
ProcessingCapability-r16,             OPTIONAL, /// if this field is not present,
corresponding field in NR-DL-TDOA-ProvideCapabilities IE is applied for AIML
positioning ///
    nr-DL-PRS-ProcessingCapability-r16                NR-DL-PRS-
ProcessingCapability-r16,             OPTIONAL, /// if this field is not present,
corresponding field in NR-DL-TDOA-ProvideCapabilities IE is applied for AIML
positioning ///
    additionalPathsReport-r16                                 ENUMERATED {
supported }                           OPTIONAL,
    ...,
    [[
    ten-ms-unit-ResponseTime-r17                      PositioningModes
                                          OPTIONAL,
    nr-PosCalcAssistanceSupport-r17                           BIT STRING {
    trpLocSup              (0),
            beamInfoSup           (1),
            rtdInfoSup            (2),
            trpTEG-InfoSup(3),
            nr-IntegritySup-r18 (4),
            pruInfoSup-r18 (5)
    }       (SIZE (1..8))                             OPTIONAL,
    nr-DL-PRS-ExpectedAoD-or-AoA-Sup-r17              BIT STRING { eAoD
(0),
            eAoA          (1)
```

-continued

```
        }            (SIZE (1..8))                    OPTIONAL,
        nr-DL-TDOA-On-Demand-DL-PRS-Support-r17 NR-On-Demand-DL-PRS-
Support-r17                     OPTIONAL,
        additionalPathsExtSupport-r17                 ENUMERATED { n4, n6, n8 }
        OPTIONAL,
        scheduledLocationRequestSupported-r17
        ScheduledLocation TimeSupportPerMode-r17                   OPTIONAL,
        nr-dl-prs-AssistanceDataValidity-r17          SEQUENCE {
                                                      area-validity-r17
        INTEGER (1..maxNrOfAreas-r17)                              OPTIONAL,
                                                      ...
                                                      }                 OPTIONAL,
        multiMeasInSameMeasReport-r17                              ENUMERATED        {
supported }                             OPTIONAL,
        mg-ActivationRequest-r17                                   ENUMERATED        {
supported }                             OPTIONAL
        ]],
        [[
        posMeasGapSupport-r17
        ENUMERATED { supported }                                          OPTIONAL
        ]],
        [[
        multiLocationEstimateInSameMeasReport-r17     ENUMERATED { supported }
                                  OPTIONAL
        ]],
        [[
        locationCoordinateTypes-r18
        LocationCoordinateTypes
        OPTIONAL,
        periodicAssistanceData-r18                               BIT STRING { solicited
          (0),
          unsolicited (1)} (SIZE (1..8))    OPTIONAL,
        nr-Integrity AssistanceSupport-r18            BIT STRING {
        serviceParametersSup            (0),
        serviceAlertSup                         (1),
        riskParametersSup                       (2),
        integrity ParaTRP-LocSup                (3),
        integrity ParaBeamInfoSup       (4),
        integrityParaRTD-InfoSup        (5)
        } (SIZE (1..8))                               OPTIONAL,
        nr-DL-TDOA-OnDemandPRS-ForBWA-Support-r18
                    ENUMERATED { supported }
        OPTIONAL,
        periodicReportingIntervalMsSupport-r18
        PeriodicReportingIntervalMsSupportPerMode-r18
        OPTIONAL
        ]]
        }
        ModelInfo::= SEQUENCE {
        associationId                           AssociationID
        expectedqos                                   QoS
        ...,
        }
        -- ASN1STOP
```

ten-ms-unit-ResponseTime: This field, if present, specifies the positioning modes for which the target device supports the enumerated value 'ten-milli-seconds' in the IE Response Time in IE CommonIEsRequestLocationInformation. This is represented by a bit string, with a one value at the bit position means 'ten-milli-seconds' response time unit for the positioning mode is supported; a zero value means not supported. If this field is absent, the target device does not support 'ten-milli-seconds' response time unit in CommonIEsRequestLocationInformation.

nr-PosCalcAssistanceSupport: This field indicates the Position Calculation Assistance Data supported by the target device for AIML positioning. If this parameter is not present in this IE and is present in NR-DL-TDOA-ProvideCapabilities IE, the parameter in the NR-DL-TDOA-ProvideCapabilities IE applies.

nr-DL-PRS-ExpectedAoD-or-AoA-Sup: This field, if present, indicates that the target device supports the NR-DL-PRS-ExpectedAoD-or-AoA in NR-DL-PRS-AssistanceData. If this parameter is not present in this IE and is present in NR-DL-TDOA-ProvideCapabilities IE, the parameter in the NR-DL-TDOA-ProvideCapabilities IE applies.

nr-DL-TDOA-On-Demand-DL-PRS-Support: This field, if present, indicates that the target device supports on-demand DL-PRS requests.

additionalPathsExtSupport: This field, if present, indicates that the target device supports the nr-AdditionalPathListExt reporting in IE NR-DL-TDOA-SignalMeasurementInformation. The enumerated value indicates the number of additional paths supported by the target device.

scheduledLocationRequestSupported: This field, if present, specifies the positioning modes for which the target device supports scheduled location requests—i.e., supports the IE ScheduledLocationTime in IE CommonIEsRequestLocationInformation—and the time base(s) supported for the scheduled location time for each positioning mode. If this field is absent, the target device does not support scheduled location requests.

mg-ActivationRequest: This field, if present, indicates that the target device supports UL MAC CE for positioning measurement gap activation/deactivation request for DL-PRS measurements. The UE can include this field only if the UE supports mg-ActivationRequestPRS-Meas and mg-ActivationCommPRS-Meas defined in TS 38.331 [35]. If this parameter is not present in this IE and is present in NR-DL-TDOA-ProvideCapabilities IE, the parameter in the NR-DL-TDOA-ProvideCapabilities IE applies.

posMeasGapSupport: This field, if present, indicates that the target device supports pre-configured positioning measurement gap for DL-PRS measurements. The UE can include this field only if the UE supports mg-ActivationCommPRS-Meas defined in TS 38.331 [35]. If this parameter is not present in this IE and is present in NR-DL-TDOA-ProvideCapabilities IE, the parameter in the NR-DL-TDOA-ProvideCapabilities IE applies.

multiLocationEstimateInSameMeasReport: This field, if present, indicates that the target device supports multiple location estimate instances in a single measurement report. If this parameter is not present in this IE and is present in NR-DL-TDOA-ProvideCapabilities IE, the parameter in the NR-DL-TDOA-ProvideCapabilities IE applies.

locationCoordinateTypes: This field indicates the geographical location coordinate types that a target device supports for AIML positioning. TRUE indicates that a location coordinate type is supported and FALSE that it is not.

periodicAssistanceData: This field identifies the periodic NR assistance data delivery procedures supported by the target device. This is represented by a bit string, with a one value at the bit position means the periodic NR assistance data delivery procedure is supported; a zero value means not supported.

NR-DL-TDOA-ProvideCapabilities

The IE NR-DL-TDOA-ProvideCapabilities is used by the target device to indicate its capability to support NR DL-TDOA and to provide its NR DL-TDOA positioning capabilities to the location server.

```
-- ASN1START
NR-DL-TDOA-ProvideCapabilities-r16 ::= SEQUENCE {
nr-DL-TDOA-Mode-r16
PositioningModes,
nr-DL-TDOA-PRS-Capability-r16                    NR-DL-PRS-
ResourcesCapability-r16,
nr-DL-TDOA-MeasurementCapability-r16             NR-DL-TDOA-
MeasurementCapability-r16,
nr-DL-PRS-QCL-ProcessingCapability-r16           NR-DL-PRS-QCL-
ProcessingCapability-r16,
nr-DL-PRS-ProcessingCapability-r16               NR-DL-PRS-
ProcessingCapability-r16,
additionalPathsReport-r16                              ENUMERATED       {
supported }                               OPTIONAL,
periodicalReporting-r16                                PositioningModes
                                                 OPTIONAL,
...,
[[
ten-ms-unit-ResponseTime-r17                     PositioningModes
                                          OPTIONAL,
nr-PosCalcAssistanceSupport-r17                        BIT STRING       {
trpLocSup              (0),
        beamInfoSup          (1),
        rtdInfoSup           (2),
        trpTEG-InfoSup(3),
        nr-IntegritySup-r18 (4),
        pruInfoSup-r18       (5)
}       (SIZE (1..8))                            OPTIONAL,
nr-los-nlos-AssistanceDataSupport-r17     SEQUENCE {
             type-r17                     LOS-NLOS-IndicatorType2-r17,
             granularity-r17     LOS-NLOS-IndicatorGranularity2-r17,
             ...
        }              OPTIONAL,
nr-DL-PRS-ExpectedAoD-or-AoA-Sup-r17             BIT STRING { eAoD
(0),
        eAoA           (1)
  }     (SIZE (1..8))                            OPTIONAL,
nr-DL-TDOA-On-Demand-DL-PRS-Support-r17 NR-On-Demand-DL-PRS-
Support-r17                          OPTIONAL,
nr-los-nlos-IndicatorSupport-r17          SEQUENCE {
             type-r17                     LOS-NLOS-IndicatorType2-r17,
             granularity-r17     LOS-NLOS-IndicatorGranularity2-r17,
             ...
        }              OPTIONAL,
additionalPathsExtSupport-r17                    ENUMERATED { n4, n6, n8 }
                                     OPTIONAL,
scheduledLocationRequestSupported-r17
ScheduledLocationTimeSupportPerMode-r17                OPTIONAL,
nr-dl-prs-AssistanceData Validity-r17     SEQUENCE {
                                                 area-validity-r17
INTEGER (1..maxNrOfAreas-r17)                          OPTIONAL,
                                                 ...
                                                 }          OPTIONAL,
multiMeasInSameMeasReport-r17                          ENUMERATED {
supported }                               OPTIONAL,
```

-continued

```
        mg-ActivationRequest-r17                                    ENUMERATED {
supported }                                     OPTIONAL
        ]],
        [[
        posMeasGapSupport-r17
        ENUMERATED { supported }                                             OPTIONAL
        ]],
        [[
        multiLocationEstimateInSameMeasReport-r17                ENUMERATED { supported }
                                        OPTIONAL
        ]],
        [[
        locationCoordinateTypes-r18
        LocationCoordinateTypes
        OPTIONAL,
        periodicAssistanceData-r18                                  BIT STRING { solicited
             (0),
             unsolicited (1)} (SIZE (1..8))       OPTIONAL,
        nr-IntegrityAssistanceSupport-r18                      BIT STRING {
        serviceParametersSup                 (0),
        serviceAlertSup                               (1),
        riskParametersSup                             (2),
        integrityParaTRP-LocSup                       (3),
        integrityParaBeamInfoSup             (4),
        integrityParaRTD-InfoSup             (5)
        } (SIZE (1..8))                                             OPTIONAL,
        nr-DL-TDOA-OnDemandPRS-ForBWA-Support-r18
                     ENUMERATED { supported }
        OPTIONAL,
        periodicReportingIntervalMsSupport-r18
        PeriodicReportingIntervalMsSupportPerMode-r18
        OPTIONAL
        ]]
        }
        -- ASN1STOP
```

nr-DL-TDOA-Mode: This field specifies the NR DL-TDOA mode(s) supported by the target device.

periodicalReporting: This field, if present, specifies the positioning modes for which the target device supports periodicalReporting. This is represented by a bit string, with a one value at the bit position means periodicalReporting for the positioning mode is supported; a zero value means not supported. If this field is absent, the target device does not support periodicalReporting in CommonIEsRequestLocationInformation.

ten-ms-unit-ResponseTime: This field, if present, specifies the positioning modes for which the target device supports the enumerated value 'ten-milli-seconds' in the IE ResponseTime in IE CommonIEsRequestLocationInformation. This is represented by a bit string, with a one value at the bit position means 'ten-milli-seconds' response time unit for the positioning mode is supported; a zero value means not supported. If this field is absent, the target device does not support 'ten-milli-seconds' response time unit in CommonIEsRequestLocationInformation.

nr-PosCalcAssistanceSupport: This field indicates the Position Calculation Assistance Data supported by the target device for UE-based DL-TDOA. This is represented by a bit string, with a one value at the bit position means the particular assistance data is supported; a zero value means not supported.

>: bit 0 indicates whether the field nr-TRP-LocationInfo in IE NR-PositionCalculationAssistance is supported or not;

>: bit 1 indicates whether the field nr-DL-PRS-BeamInfo in IE NR-PositionCalculationAssistance is supported or not;

>: bit 2 indicates whether the field nr-RTD-Info in IE NR-PositionCalculationAssistance is supported or not;

>: bit 3 indicates whether the field nr-DL-PRS-TRP-TEG-Info in IE NR-PositionCalculationAssistance is supported or not. The UE can indicate this bit only if the UE supports prs-ProcessingCapabilityBandList and any of maxNrOfDL-PRS-ResourceSetPerTrpPerFrequencyLayer, maxNrOfTRP-AcrossFreqs, maxNrOfPosLayer, maxNrOfDL-PRS-ResourcesPerResourceSet and maxNrOfDL-PRS-ResourcesPerPositioningFrequencylayer. Otherwise, the UE does not include this field;

>: bit 4 together with bit 0 indicates whether the fields nr-IntegrityTRP-LocationBounds, nr-IntegrityDL-PRS-ResourceSetARP-LocationBounds, nr-IntegrityDL-PRS-ResourceARP-LocationBounds in IE NR-TRP-LocationInfo are supported or not; bit 4 together with bit 1 indicates whether the field nr-IntegrityBeamInfoBounds in IE NR-DL-PRS-BeamInfo is supported or not; bit 4 together with the bit 2 indicates whether the field nr-IntegrityRTD-InfoBounds in IE NR-RTD-Info is supported or not;

>: bit 5 indicates whether the field nr-PRU-DL-Info in IE NR-PositionCalculationAssistance is supported or not.

nr-los-nlos-AssistanceDataSupport: This field, if present, indicates that the target device supports the NR-DL-PRS-ExpectedLOS-NLOS-Assistance in IE NR-PositionCalculationAssistance:

>: type indicates whether the target device supports 'hard' value or 'hard' and 'soft' value in LOS-NLOS-Indicator in IE NR-DL-PRS-ExpectedLOS-NLOS-Assistance.

>: granularity indicates whether the target device supports nr-los-nlos-indicator in IE NR-DL-PRS-ExpectedLOS-NLOS-Assistance 'per-trp', 'per-resource', or both.

The UE can include this field only if the UE supports one of maxDL-PRS-RSRP-MeasurementFR1, maxDL-PRS-RSRP-MeasurementFR2, dl-RSTD-MeasurementPerPairOfTRP-FR1, dl-RSTD-MeasurementPerPairOfTRP-FR2, maxNrOfRx-TX-MeasFR1, maxNrOfRx-TX-MeasFR2, supportOfRSRP-MeasFR1 and supportOfRSRP-MeasFR2. Otherwise, the UE does not include this field.

nr-DL-PRS-ExpectedAoD-or-AoA-Sup: This field, if present, indicates that the target device supports the NR-DL-PRS-ExpectedAoD-or-AoA in NR-DL-PRS-Assistance-Data.

nr-DL-TDOA-On-Demand-DL-PRS-Support: This field, if present, indicates that the target device supports on-demand DL-PRS requests.

nr-los-nlos-IndicatorSupport: This field, if present, indicates that the target device supports nr-los-nlos-Indicator reporting in IE NR-DL-TDOA-SignalMeasurementInformation.

>: type indicates whether the target device supports 'hard' value or 'hard' and 'soft' value in IE LOS-NLOS-Indicator.

>: granularity indicates whether the target device supports LOS-NLOS-Indicator reporting per TRP, per DL-PRS Resource, or both.

additionalPathsExtSupport: This field, if present, indicates that the target device supports the nr-AdditionalPathListExt reporting in IE NR-DL-TDOA-SignalMeasurementInformation. The enumerated value indicates the number of additional paths supported by the target device.

scheduledLocationRequestSupported:

This field, if present, specifies the positioning modes for which the target device supports scheduled location requests—i.e., supports the IE ScheduledLocationTime in IE CommonIEsRequestLocationInformation—and the time base(s) supported for the scheduled location time for each positioning mode. If this field is absent, the target device does not support scheduled location requests.

nr-dl-prs-AssistanceData Validity: This field, if present, indicates that the target device supports validity conditions for pre-configured assistance data and comprises the following subfields:

>: area-validity indicates that the target device supports pre-configured assistance data with area validity. The integer number indicates the maximum number of areas the target device supports.

multiMeasInSameMeasReport: This field, if present, indicates that the target device supports multiple measurement instances in a single measurement report.

mg-ActivationRequest: This field, if present, indicates that the target device supports UL MAC CE for positioning measurement gap activation/deactivation request for DL-PRS measurements. The UE can include this field only if the UE supports mg-ActivationRequestPRS-Meas and mg-ActivationCommPRS-Meas defined in TS 38.331 [35].

posMeasGapSupport: This field, if present, indicates that the target device supports pre-configured positioning measurement gap for DL-PRS measurements. The UE can include this field only if the UE supports mg-ActivationCommPRS-Meas defined in TS 38.331 [35].

multiLocationEstimateInSameMeasReport: This field, if present, indicates that the target device supports multiple location estimate instances in a single measurement report.

locationCoordinateTypes: This field indicates the geographical location coordinate types that a target device supports for UE-based DL-TDOA. TRUE indicates that a location coordinate type is supported and FALSE that it is not.

periodicAssistanceData: This field identifies the periodic NR assistance data delivery procedures supported by the target device. This is represented by a bit string, with a one value at the bit position means the periodic NR assistance data delivery procedure is supported; a zero value means not supported. Bit 0 (solicited) represents the procedure according to clause 5.2.1a; bit (1) (unsolicited) represents the procedure according to clause 5.2.2a.

<Location Information Transfer Procedure>

LMF transmits to the UE RequestLocationInformation.
UE transmits to LMF ProvideLocationInformation.

RequestLocationInformation

The RequestLocationInformation message body in a LPP message is used by the location server to request positioning measurements or a position estimate from the target device.

```
-- ASN1START
RequestLocationInformation ::= SEQUENCE {
criticalExtensions              CHOICE {
    c1                                          CHOICE {
        requestLocationInformation-r9     RequestLocationInformation-r9-
IEs,
        spare3 NULL, spare2 NULL, spare1 NULL
    },
    criticalExtensionsFuture SEQUENCE { }
}
}
RequestLocationInformation-r9-IEs ::= SEQUENCE {
commonIEsRequestLocationInformation
CommonIEsRequestLocationInformation OPTIONAL,       -- Need ON
a-gnss-RequestLocationInformation        A-GNSS-RequestLocationInformation
OPTIONAL,      -- Need ON
otdoa-RequestLocationInformation         OTDOA-RequestLocationInformation
OPTIONAL,      -- Need ON
ecid-RequestLocationInformation                      ECID-
RequestLocationInformation               OPTIONAL,   -- Need ON
epdu-RequestLocationInformation                      EPDU-Sequence
                                         OPTIONAL,   -- Need ON
...,
[[
sensor-RequestLocationInformation-r13
Sensor-RequestLocationInformation-r13
                                         OPTIONAL,       -- Need ON
tbs-RequestLocationInformation-r13       TBS-RequestLocationInformation-r13
OPTIONAL,      -- Need ON
```

-continued

```
        wlan-RequestLocationInformation-r13     WLAN-RequestLocationInformation-
r13     OPTIONAL,       -- Need ON
        bt-RequestLocationInformation-r13       BT-RequestLocationInformation-r13
        OPTIONAL        -- Need ON
        ]],
        [[          nr-ECID-RequestLocationInformation-r16
        NR-ECID-RequestLocationInformation-r16
                                                OPTIONAL,       -- Need ON
                    nr-Multi-RTT-RequestLocationInformation-r16
        NR-Multi-RTT-RequestLocationInformation-r16
                                                OPTIONAL,       -- Need ON
                    nr-DL-AoD-RequestLocationInformation-r16
        NR-DL-AoD-RequestLocationInformation-r16
                                                OPTIONAL,       -- Need ON
                    nr-DL-TDOA-RequestLocationInformation-r16
        NR-DL-TDOA-RequestLocationInformation-r16
                                                OPTIONAL        -- Need ON
                    nr-AIML-RequestLocationInformation-r19
        NR-AIML-RequestLocationInformation-r19
                                                OPTIONAL        -- Need ON
        ]]
        }
        -- ASN1STOP
```

CommonIEsRequestLocationInformation: This field specifies the location information type requested by the location server and optionally other configuration information associated with the requested location information. This field should always be included in this version of the protocol.

CommonIEsRequestLocationInformation

The CommonIEsRequestLocationInformation carries common IEs for a Request Location Information LPP message Type.

```
        -- ASN1START
        CommonIEsRequestLocationInformation ::= SEQUENCE {
        locationInformationType                         LocationInformationType,
        triggeredReporting                              TriggeredReportingCriteria
        OPTIONAL,           -- Cond ECID
        periodicalReporting                             PeriodicalReportingCriteria
OPTIONAL,   -- Need ON
        additionalInformation               AdditionalInformation               OPTIONAL,
        -- Need ON
        qos                                                             QoS
                                            OPTIONAL,       -- Need ON
        environment                                             Environment
                            OPTIONAL,       -- Need ON
        locationCoordinateTypes                         LocationCoordinateTypes
        OPTIONAL,           -- Need ON
        velocityTypes                                   VelocityTypes
        OPTIONAL,           -- Need ON
        ...,
        [[
        messageSizeLimitNB-r14                          MessageSizeLimitNB-r14
        OPTIONAL            -- Need ON
        ]],
        [[
          segmentationInfo-r14              SegmentationInfo-r14                OPTIONAL
        -- Need ON
        ]],
        [[
        scheduledLocationTime-r17
        ScheduledLocationTime-r17           OPTIONAL,       -- Need ON
        targetIntegrityRisk-r17
                                                                TargetIntegrityRisk-r17
        OPTIONAL                    -- Need ON
        ]],
        [[
        periodicalReportingExt-r18
        PeriodicalReportingCriteriaExt-r18
        OPTIONAL                    -- Need ON
        ]]
        }
        LocationInformationType ::= ENUMERATED {
```

```
locationEstimateRequired,
locationMeasurementsRequired,
locationEstimatePreferred,
locationMeasurementsPreferred,
...,
locationEstimateAndMeasurementsRequired-r18
aimlLocationEstimateRequired-r19,
aimlLocationEstimatePreferred-r19,
aimlLocationEstimateAndMeasurementsRequired-r19
}
PeriodicalReportingCriteria ::=          SEQUENCE {
reportingAmount
ENUMERATED {
        ra1, ra2, ra4, ra8, ra16, ra32,
        ra64, ra-Infinity
} DEFAULT ra-Infinity,
reportingInterval                                  ENUMERATED {
        noPeriodicalReporting, ri0-25,
        ri0-5, ri1, ri2, ri4, ri8, ri16, ri32, ri64
}
}
PeriodicalReportingCriteriaExt-r18 ::=          SEQUENCE {
reportingAmount-r18
ENUMERATED {
ra2, ra4, ra8, ra16, ra32,
ra64, ra-Infinity
                    } DEFAULT ra-Infinity,
reportingIntervalMs-r18                                      INTEGER
(1..999),
...
}
TriggeredReportingCriteria ::=          SEQUENCE {
cellChange                                                  BOOLEAN,
reportingDuration                                  ReportingDuration,
...
}
ReportingDuration ::=                              INTEGER (0..255)
AdditionalInformation ::= ENUMERATED {
onlyReturnInformationRequested,
mayReturnAdditionalInformation,
mayReturnAimlLocationInformation,
...
}
QoS ::= SEQUENCE {
horizontalAccuracy                      HorizontalAccuracy
OPTIONAL,        -- Need ON
verticalCoordinateRequest          BOOLEAN,
verticalAccuracy                        VerticalAccuracy
OPTIONAL,        -- Need ON
responseTime                            ResponseTime
OPTIONAL,        -- Need ON
velocityRequest                         BOOLEAN,
...,
[[        responseTimeNB-r14            ResponseTimeNB-r14
OPTIONAL         -- Need ON
]],
[[        horizontalAccuracyExt-r15     HorizontalAccuracyExt-r15
OPTIONAL,        -- Need ON
        verticalAccuracyExt-r15         VerticalAccuracyExt-r15
        OPTIONAL         -- Need ON
]]
}
HorizontalAccuracy ::= SEQUENCE {
accuracy                   INTEGER(0..127),
confidence                 INTEGER(0..100),
...
}
VerticalAccuracy ::= SEQUENCE {
accuracy                   INTEGER(0..127),
confidence                 INTEGER(0..100),
...
}
HorizontalAccuracyExt-r15 ::= SEQUENCE {
accuracyExt-r15            INTEGER(0..255),
confidence-r15             INTEGER(0..100),
...
}
VerticalAccuracyExt-r15 ::= SEQUENCE {
accuracyExt-r15            INTEGER(0..255),
```

```
confidence-r15 INTEGER(0..100),
...
}
ResponseTime ::= SEQUENCE {
time INTEGER (1..128),
...,
[[ responseTimeEarlyFix-r12 INTEGER (1..128)
OPTIONAL -- Need ON
]],
[[ unit-r15 ENUMERATED { ten-seconds, ... , ten-
milli-seconds-v1700 }
OPTIONAL -- Need ON
]]
}
ResponseTimeNB-r14 ::= SEQUENCE {
timeNB-r14 INTEGER (1..512),
responseTimeEarlyFixNB-r14 INTEGER (1..512)
OPTIONAL, -- Need ON
...,
[[ unitNB-r15 ENUMERATED { ten-seconds,
... } OPTIONAL -- Need ON
]]
}
Environment ::= ENUMERATED {
badArea,
notBadArea,
mixedArea,
...
}
MessageSizeLimitNB-r14 ::= SEQUENCE {
measurementLimit-r14 INTEGER (1..512)
OPTIONAL, -- Need ON
...
}
ScheduledLocationTime-r17 ::= SEQUENCE {
utcTime-r17 UTCTime OPTIONAL, -- Need
ON
gnssTime-r17 SEQUENCE {
gnss-TOD-msec-r17
INTEGER (0..3599999),
gnss-TimeID-r17
GNSS-ID
} OPTIONAL,
-- Need ON
networkTime-r17 CHOICE {
e-utraTime-r17
SEQUENCE {
lte-PhysCellId-r17
INTEGER (0..503),
lte-ArfcnEUTRA-r17
ARFCN-ValueEUTRA,
lte-CellGlobalId-r17
CellGlobalIdEUTRA-AndUTRA
OPTIONAL, -- Need ON
lte-
SystemFrameNumber-r17 INTEGER (0..1023)
},
nrTime-r17
SEQUENCE {
nr-PhysCellID-r17
NR-PhysCellID-r16,
nr-ARFCN-r17
ARFCN-ValueNR-r15,
nr-CellGlobalID-r17
NCGI-r15 OPTIONAL, -- Need ON
nr-SFN-r17
INTEGER (0..1023),
nr-Slot-r17
CHOICE {
scs15-r17 INTEGER (0..9),
scs30-r17 INTEGER (0..19),
scs60-r17 INTEGER (0..39),
scs120-r17 INTEGER (0..79)
} OPTIONAL
-- Need ON
},
...
} OPTIONAL,
-- Need ON
```

-continued

```
relativeTime-r17           INTEGER (1..1024)
                           OPTIONAL      -- Need ON
}
TargetIntegrityRisk-r17 ::=          INTEGER (10..90)
-- ASN1STOP
```

locationInformationType: This IE indicates whether the server requires a location estimate or measurements. For 'locationEstimateRequired', the target device shall return a location estimate if possible, or indicate a location error if not possible. For 'locationMeasurementsRequired', the target device shall return measurements if possible, or indicate a location error if not possible. For 'locationEstimatePreferred', the target device shall return a location estimate if possible, but may also or instead return measurements for any requested position methods for which a location estimate is not possible. For 'locationMeasurementsPreferred', the target device shall return location measurements if possible, but may also or instead return a location estimate for any requested position methods for which return of location measurements is not possible. For 'locationEstimateAndMeasurementsRequired', the PRU shall return both location estimate and measurements if possible, or indicate a measurements error if not possible. For 'aimlLocationEstimateRequired', the target device shall return a location estimate determined by AI/ML model inference operation if possible, or indicate a location error if not possible. For 'aimllocationEstimatePreferred', the target device shall return a location estimate determined by AIML model inference operation if possible, but may also or instead return measurements for any requested position methods for which a location estimate is not possible. For 'aimlLocationEstimateAndMeasurementsRequired', the target device shall return both measurement and location estimate determined by AIML model inference operation if possible, or indicate a measurements error if not possible.

'locationEstimateAndMeasurementsRequired' only applies to PRUs. If the PRU is requested to return both location estimate and measurements, the location estimate is determined independently of the reported measurements, and the measurements shall be valid at the reported location.

triggeredReporting: This IE indicates that triggered reporting is requested and comprises the following subfields:

>: cellChange: If this field is set to TRUE, the target device provides requested location information each time the primary cell has changed.

>: reportingDuration: Maximum duration of triggered reporting in seconds. A value of zero is interpreted to mean an unlimited (i.e. "infinite") duration. The target device should continue triggered reporting for the reportingDuration or until an LPP Abort or LPP Error message is received.

The triggeredReporting field should not be included by the location server and shall be ignored by the target device if the periodicalReporting IE or responseTime IE or responseTimeNB IE is included in CommonIEsRequestLocationInformation.

periodicalReporting: This IE indicates that periodic reporting is requested and comprises the following subfields:

>: reportingAmount indicates the number of periodic location information reports requested. Enumerated values correspond to 1, 2, 4, 8, 16, 32, 64, or infinite/indefinite number of reports. If the reportingAmount is 'infinite/indefinite', the target device shou-ld continue periodic reporting until an LPP Abort message is received. The value 'ra1' shall not be used by a sender.

>: reportingInterval indicates the interval between location information reports and the response time requirement for the first location information report. Enumerated values ri0-25, ri0-5, ri1, ri2, ri4, ri8, ri16, ri32, ri64 correspond to reporting intervals of 1, 2, 4, 8, 10, 16, 20, 32, and 64 seconds, respectively. Measurement reports containing no measurements or no location estimate are required when a reportingInterval expires before a target device is able to obtain new measurements or obtain a new location estimate. The value 'noPeriodicalReporting' shall not be used by a sender.

additionalInformation: This IE indicates whether a target device is allowed to return additional information to that requested. If this IE indicates 'onlyReturnInformationRequested' then the target device shall not return any additional information to that requested by the server. If this IE indicates 'mayReturnAdditionalInformation' then the target device may return additional information to that requested by the server. If a location estimate (including AIML-based location estimate) is returned, any additional information is restricted to that associated with a location estimate (e.g. might include velocity if velocity was not requested but cannot include measurements). If measurements are returned, any additional information is restricted to additional measurements (e.g. might include E-CID measurements if A-GNSS measurements were requested but not E-CID measurements).

Qos: This IE indicates the quality of service and comprises a number of sub-fields. In the case of measurements, some of the sub-fields apply to the location estimate that could be obtained by the server from the measurements provided by the target device assuming that the measurements are the only sources of error. Fields are as follows:

>: horizontalAccuracy indicates the maximum horizontal error in the location estimate at an indicated confidence level. The 'accuracy' corresponds to the encoded and 'confidence' corresponds to confidence.

>: verticalCoordinateRequest indicates whether a vertical coordinate is required (TRUE) or not (FALSE)>

>: verticalAccuracy indicates the maximum vertical error in the location estimate at an indicated confidence level and is only applicable when a vertical coordinate is requested. The 'accuracy' corresponds to the encoded uncertainty altitude and 'confidence' corresponds to confidence.

>: responseTime

>>: time indicates the maximum response time as measured between receipt of the RequestLocationInformation and transmission of a ProvideLocationInformation. If the unit field is absent, this is given as an integer number of seconds between 1 and 128. If the unit field is present with enumerated value 'ten-seconds', the maximum response time is given in units of 10-seconds, between 10 and 1280 seconds. If the unit field is present with enumerated value 'ten-milli-seconds', the maximum response time is given in units of 10-milliseconds, between 0.01 and 1.28 seconds. If the periodicalReporting IE is included in CommonIEsRequestLocationInformation, this field should not be included by the location server and shall be ignored by the target device (if included).

>>: responseTimeEarlyFix indicates the maximum response time as measured between receipt of the RequestLocationInformation and transmission of a ProvideLocationInformation containing early location measurements or an early location estimate. If the unit field is absent, this is given as an integer number of seconds between 1 and 128. If the unit field is present with enumerated value 'ten-seconds', the maximum response time is given in units of 10-seconds, between 10 and 1280 seconds. If the unit field is present with enumerated value 'ten-milli-seconds', the maximum response time is given in units of 10-milli-seconds, between 0.01 and 1.28 seconds. When this IE is included, a target should send a ProvideLocationInformation (or more than one ProvideLocationInformation if location information will not fit into a single message) containing early location information according to the responseTimeEarlyFix IE and a subsequent ProvideLocationInformation (or more than one ProvideLocationInformation if location information will not fit into a single message) containing final location information according to the time IE. A target shall omit sending a ProvideLocationInformation if the early location information is not available at the expiration of the time value in the responseTimeEarlyFix IE. A server should set the response TimeEarlyFix IE to a value less than that for the time IE. A target shall ignore the responseTimeEarlyFix IE if its value is not less than that for the time IE.

>>: unit indicates the unit of the time and response TimeEarlyFix fields. Enumerated value 'ten-seconds' corresponds to a resolution of 10 seconds. Enumerated value 'ten-milli-seconds' corresponds to a resolution of 0.01 seconds. If this field is absent, the unit/resolution is 1 second. Enumerated value 'ten-milli-seconds' is only applicable for NR E-CID Positioning, NR DL-TDOA Positioning, NR DL-AoD Positioning, and NR Multi-RTT Positioning. If the enumerated value 'ten-milli-seconds' is included for methods others than NR E-CID Positioning, NR DL-TDOA Positioning, NR DL-AoD Positioning, and NR Multi-RTT Positioning the target device shall ignore the unit field.

>: velocityRequest indicates whether velocity (or measurements related to velocity) is requested (TRUE) or not (FALSE).

>: responseTimeNB

If the periodicalReporting IE or responseTime IE is included in CommonIEsRequestLocationInformation, this field should not be included by the location server and shall be ignored by the target device (if included).

>>: timeNB indicates the maximum response time as measured between receipt of the RequestLocationInformation and transmission of a ProvideLocationInformation. If the unitNB field is absent, this is given as an integer number of seconds between 1 and 512. If the unitNB field is present, the maximum response time is given in units of 10-seconds, between 10 and 5120 seconds.

>>: response TimeEarlyFixNB indicates the maximum response time as measured between receipt of the RequestLocationInformation and transmission of a ProvideLocationInformation containing early location measurements or an early location estimate. If the unitNB field is absent, this is given as an integer number of seconds between 1 and 512. If the unitNB field is present, the maximum response time is given in units of 10-seconds, between 10 and 5120 seconds. When this IE is included, a target should send a ProvideLocationInformation (or more than one ProvideLocationInformation if location information will not fit into a single message) containing early location information according to the response TimeEarlyFixNB IE and a subsequent ProvideLocationInformation (or more than one ProvideLocationInformation if location information will not fit into a single message) containing final location information according to the timeNB IE. A target shall omit sending a ProvideLocationInformation if the early location information is not available at the expiration of the time value in the responseTimeEarlyFixNB IE. A server should set the responseTimeEarlyFixNB IE to a value less than that for the timeNB IE. A target shall ignore the response TimeEarlyFixNB IE if its value is not less than that for the timeNB IE.

>>: unitNB indicates the unit of the timeNB and responseTimeEarlyFixNB fields. Enumerated value 'ten-second' corresponds to a resolution of 10 seconds. If this field is absent, the unit/resolution is 1 second.

>: horizontalAccuracyExt indicates the maximum horizontal error in the location estimate at an indicated confidence level. The 'accuracyExt' corresponds to the encoded high accuracy uncertainty as defined in TS 23.032 [15] and 'confidence' corresponds to confidence as defined in TS 23.032 [15]. This field should not be included by the location server and shall be ignored by the target device if the horizontalAccuracy field is included in QoS.

>: vertical AccuracyExt indicates the maximum vertical error in the location estimate at an indicated confidence level and is only applicable when a vertical coordinate is requested. The 'accuracyExt' corresponds to the encoded high accuracy uncertainty as defined in TS 23.032 [15] and 'confidence' corresponds to confidence as defined in TS 23.032 [15]. This field should not be included by the location server and shall be ignored by the target device if the verticalAccuracy field is included in QoS.

All QoS requirements shall be obtained by the target device to the degree possible but it is permitted to return a response that does not fulfill all QoS requirements if some were not attainable. The single exception is time and timeNB which shall always be fulfilled-even if that means not fulfilling other QoS requirements.

A target device supporting NB-IoT access shall support the responseTimeNB IE.

A target device supporting HA GNSS shall support the HorizontalAccuracyExt, VerticalAccuracyEx, and unit fields with enumerated value 'ten-seconds'.

A target device supporting NB-IoT access and HA GNSS shall support the unitNB

FIELD

Environment: This field provides the target device with information about expected multipath and non line of sight (NLOS) in the current area. The following values are defined:

>: badArea: possibly heavy multipath and NLOS conditions (e.g. bad urban or urban).

>: notBadArea: no or light multipath and usually LOS conditions (e.g. suburban or rural).

>: mixedArea: environment that is mixed or not defined.

If this field is absent, a default value of 'mixedArea' applies.

locationCoordinateTypes: This field provides a list of the types of location estimate that the target device may return when a location estimate is obtained by the target.

velocityTypes: This fields provides a list of the types of velocity estimate that the target device may return when a velocity estimate is obtained by the target.

messageSizeLimitNB: This field provides an octet limit on the amount of location information a target device can return.

>: measurementLimit indicates the maximum amount of location information the target device should return in response to the RequestLocationInformation message received from the location server.

The limit applies to the overall size of the LPP message at LPP level (LPP Provide Location Information), and is specified in steps of 100 octets. The message size limit is then given by the value provided in measurementLimit times 100 octets.

segmentationInfo: This field indicates whether this RequestLocationInformation message is one of many segments, as specified in clause 4.3.5 scheduledLocationTime: This field indicates that the target device is requested to obtain location measurements or location estimate valid at the scheduledLocationTime T and comprises the following subfields:

>: utcTime provides T in UTC in the form of YYMMDDhhmmssZ.

>: gnssTime provides T in GNSS system time of the GNSS indicated by gnss-TimeID.

>>: gnss-TOD-msec specifies the GNSS TOD in 1-millisecond resolution rounded down to the nearest millisecond unit.

>: networkTime provides T in E-UTRA or NR network time.

>>: lte-PhysCellId, lte-ArfcnEUTRA, lte-CellGlobalId identifies the reference cell (E-UTRA) that is used for the network time.

>>: lte-systemFrameNumber specifies the system frame number in E-UTRA.

>>: nr-PhysCellID, nr-ARFCN, nr-CellGlobalID identifies the reference cell (NR) that is used for the network time.

>>: nr-SFN specifies the system frame number in NR.

>>: nr-Slot specifies the slot number in NR for the indicated subcarrier spacing (SCS). The total NR network time is given by nr-SFN+nr-Slot.

>: relativeTime provides T in seconds from current time, where current time is defined as the time the CommonIEsRequestLocationInformation was received.

A location estimate returned to an LCS Client, AF or UE for a scheduled location time can be treated by the LCS Client, AF or UE as an estimate of the location of the UE at the scheduled location time. If this field is present, at least one of utcTime, gnssTime, networkTime, or relativeTime shall be present.

periodicalReportingExt: This field indicates that extended periodic reporting is requested and comprises the below subfields. If this field is present, the field periodicalReporting is absent. Measurement reports containing no measurements or no location estimate are required when a reportingIntervalMs expires before a target device is able to obtain new measurements or obtain a new location estimate.

>: reportingAmount indicates the number of periodic location information reports requested. Enumerated values correspond to 2, 4, 8, 16, 32, 64, or infinite/indefinite number of reports. If the reportingAmount is 'infinite/indefinite', the target device should continue periodic reporting until an LPP Abort message is received.

>: reportingIntervalMs indicates the interval between location information reports and the response time requirement for the first location information report in milliseconds.

NR-DL-TDOA-RequestLocationInformation

The IE NR-DL-TDOA-RequestLocationInformation is used by the location server to request NR DL-TDOA location measurements from a target device.

```
-- ASN1START
NR-DL-TDOA-RequestLocationInformation-r16 ::= SEQUENCE {
nr-DL-PRS-RstdMeasurementInfoRequest-r16  ENUMERATED { true }
        OPTIONAL, -- Need ON
nr-RequestedMeasurements-r16          BIT    STRING    {
prsrsrpReq (0),
    firstPathRsrpReq-r17 (1),
    dl-PRS-RSCPD-Request-r18 (2)
    } (SIZE(1..8)),
nr-AssistanceAvailability-r16          BOOLEAN,
nr-DL-TDOA-ReportConfig-r16                 NR-DL-TDOA-
ReportConfig-r16      OPTIONAL, -- Need ON
additionalPaths-r16
ENUMERATED { requested }       OPTIONAL, -- Need ON
...,
[[
nr-UE-RxTEG-Request-r17
ENUMERATED { requested }       OPTIONAL, -- Need ON
nr-los-nlos-IndicatorRequest-r17 SEQUENCE {
    type-r17                    LOS-NLOS-IndicatorType1-r17,
    granularity-r17   LOS-NLOS-IndicatorGranularity1-r17,
    ...
}   OPTIONAL, -- Need ON
additionalPathsExt-r17
ENUMERATED { requested }       OPTIONAL, -- Need ON
additionalPathsDL-PRS-RSRP-Request-r17       ENUMERATED   {
requested }      OPTIONAL, -- Need ON
multiMeasInSameReport-r17
ENUMERATED { requested }       OPTIONAL    -- Need ON
]],
[[
nr-DL-PRS-JointMeasurementRequest-r18       SEQUENCE {
    nr-DL-PRS-JointMeasurementRequestedPFL-List-r18
SEQUENCE (SIZE (2..3)) OF
    INTEGER (0..nrMaxFreqLayers-1-r16)   OPTIONAL    -- Need ON
}                                       OPTIONAL, -- Need ON
nr-DL-PRS-RxHoppingRequest-r18            SEQUENCE {
    nr-DL-PRS-RxHoppingTotalBandwidth-r18         CHOICE {
        fr1         ENUMERATED {mhz40, mhz50, mhz80,
mhz100},
        fr2         ENUMERATED {mhz100, mhz200, mhz400}
    }                                   OPTIONAL -- Need ON
}                                       OPTIONAL -- Need ON
]]
}
NR-DL-TDOA-ReportConfig-r16 ::= SEQUENCE {
maxDL-PRS-RSTD-MeasurementsPerTRP-Pair-r16   INTEGER   (1..4)
                    OPTIONAL, -- Need ON
timingReportingGranularityFactor-r16   INTEGER (0..5)
                    OPTIONAL, -- Need ON
...,
[[
measureSameDL-PRS-Resource WithDifferentRxTEGs-r17
                ENUMERATED { n0, n2, n3, n4, n6, n8, ... }
                                        OPTIONAL, -- Need ON
reducedDL-PRS-ProcessingSamples-r17             ENUMERATED    {
requested, ... }   OPTIONAL, -- Need ON
lowerRxBeamSweepingFactor-FR2-r17              ENUMERATED    {
requested }        OPTIONAL -- Need ON
]],
[[
```

-continued

```
  timingReportingGranularityFactorExt-r18          INTEGER    (-6..-1)
                    OPTIONAL,    -- Need ON
  nr-DL-PRS-MeasurementTimeWindowsConfig-r18
                                                NR-DL-PRS-
MeasurementTimeWindowsConfig-r18        OPTIONAL    -- Need ON
  ]]
  }
  -- ASN1STOP
```

nr-DL-PRS-RstdMeasurementInfoRequest: This field indicates whether the target device is requested to report DL-PRS Resource ID(s) or DL-PRS Resource Set ID(s) used for determining the timing of each TRP in RSTD measurements.

nr-RequestedMeasurements: This field specifies the NR DL-TDOA measurements requested. This is represented by a bit string, with a one value at the bit position means the particular measurement is requested; a zero value means not requested. The dl-PRS-RSCPD-Request means that the target device is requested to provide DL RSCPD measurement.

nr-AssistanceAvailability: This field indicates whether the target device may request additional DL-PRS assistance data from the server. TRUE means allowed and FALSE means not allowed.

additionalPaths: This field, if present, indicates that the target device is requested to provide the nr-AdditionalPathList in IE NR-DL-TDOA-SignalMeasurementInformation. If this field is present, the field additionalPathsExt shall be absent.

nr-UE-RxTEG-Request: This field, if present, indicates that the target device is requested to provide the nr-UE-RxTEG-ID in IE NR-DL-TDOA-SignalMeasurementInformation.

nr-los-nlos-IndicatorRequest: This field, if present, indicates that the target device is requested to provide the indicated type and granularity of the estimated LOS-NLOS-Indicator in the NR-DL-TDOA-SignalMeasurementInformation.

additionalPathsExt: This field, if present, indicates that the target device is requested to provide the nr-AdditionalPathListExt in IE NR-DL-TDOA-SignalMeasurementInformation. If this field is present, the field additionalPaths shall be absent.

additionalPathsDL-PRS-RSRP-Request: This field, if present, indicates that the target device is requested to provide the nr-DL-PRS-RSRPP for the additional paths in fields nr-AdditionalPathList or nr-AdditionalPathListExt.

multiMeasInSameReport: This field, if present, indicates that the target device is requested to provide multiple measurement instances in a single measurement report; i.e., include the nr-DL-TDOA-SignalMeasurementInstances (in the case of UE-assisted mode is requested) or nr-DL-TDOA-LocationInformationInstances (in the case of UE-based mode is requested) in IE NR-DL-TDOA-ProvideLocationInformation.

nr-DL-PRS-JointMeasurementRequest: This field, if present, indicates that the target device is requested to perform joint measurement across aggregated PFLs.

nr-DL-PRS-JointMeasurementRequestedPFL-List: This field, if present, indicates the target device is requested to perform joint measurements on the indicated two or three PFLs. Value 0 corresponds to the first frequency layer provided in nr-DL-PRS-AssistanceDataList, value 1 to the second frequency layer in nr-DL-PRS-AssistanceDataList, and so on.

nr-DL-PRS-RxHoppingRequest: This field, if present, indicates that the target device is requested to use DL-PRS Rx hopping for performing RSTD, RSRP (if requested in nr-RequestedMeasurements), or RSRPP measurements (if requested in nr-RequestedMeasurements) and report the hopping information used for performing the measurements. This field is not included when dl-PRS-RSCPD-Request or nr-DL-PRS-JointMeasurementRequest is included.

nr-DL-PRS-RxHoppingTotalBandwidth: This field, if present, indicates the total bandwidth in MHz across all hops for the DL-PRS measurement. If the configured value nr-DL-PRS-RxHoppingTotalBandwidth is larger than the configured DL-PRS bandwidth in the provided assistance data, the UE shall assume that the actual nr-DL-PRS-RxHopping-TotalBandwidth is equal to the width of the configured DL-PRS in the provided assistance data.

maxDL-PRS-RSTD-MeasurementsPerTRP-Pair: This field specifies the maximum number of DL-PRS RSTD measurements per pair of TRPs. The maximum number is defined across all Positioning Frequency Layers. When requested for aggregated measurements by the location server, this field specifies the maximum number of aggregated DL-PRS RSTD measurements per pair of TRPs. The maximum number is defined across all Positioning Frequency Layers.

timingReportingGranularityFactor, timingReporting-GranularityFactorExt: This field specifies the recommended reporting granularity for the DL RSTD measurements. Value (0 . . . 5) corresponds to (k0 . . . k5) and value (−6 . . . 1) corresponds to (kMinus6 . . . kMinus1) used for nr-RSTD and nr-RSTD-ResultDiff in NR-DL-TDOA-MeasElement. The UE may select a different granularity value for nr-RSTD and nr-RSTD-ResultDiff. The timingReportingGranularity-FactorExt should not be included by the location server and shall be ignored by the target device if timingReporting-GranularityFactor is included. The timingReportingGranularityFactor should not be included by the location server and shall be ignored by the target device if timingReportingGranularityFactorExt is included.

measureSameDL-PRS-ResourceWithDifferentRxTEGs: This field, if present, indicates that the target device is requested to measure the same DL-PRS Resource of a TRP with N different UE Rx TEGs. Enumerated value 'n0' indicates that the number N of different UE Rx TEGs to measure the same DL-PRS Resource can be determined by the target device, value 'n2' indicates that the target device is requested to measure the same DL-PRS Resource of a TRP with 2 different UE Rx TEGs, value 'n3' indicates that the target device is requested to measure the same DL-PRS Resource of a TRP with 3 different UE Rx TEGs, and so on. If this field is present, the field nr-UE-RxTEG-Request should also be present. When the location server requests aggregated measurements, the target device is requested to measure the same aggregated DL-PRS Resources of a TRP with N different UE Rx TEGs.

reducedDL-PRS-ProcessingSamples: This field, if present and set to 'requested', indicates that the target device is requested to perform the requested measurements with reduced number of samples (M=1 or M=2). When requested for aggregated measurements by the location server, this field indicates processing of reduced number of samples for the aggregated measurements.

lowerRxBeamSweepingFactor-FR2: This field, if present, indicates that the target device is requested to use a lower Rx beam sweeping factor than 8 for FR2 according to UE's capability. When requested for aggregated measurements by the location server, this field indicates that the target device is requested to use a lower Rx beam sweeping factor than 8 for FR2 according to UE's capability for the aggregated measurements.

nr-DL-PRS-MeasurementTimeWindowsConfig: This field indicates DL-PRS Resource Set(s) occurring within time window(s) for performing measurements where the time window is indicated by a start time, periodicity, offset and duration.

NR-AIML-RequestLocationInformation-

```
-- ASN1START
NR-AIML-RequestLocationInformation-r19 ::= SEQUENCE {
supportedAIMLModelList
SEQUENCE (SIZE (1..n)) OF        ModelInfo     OPTIONAL,
nr-Aiml-AssistanceAvailability-r16             BOOLEAN,
nr-AIML-ReportConfig-r19                             NR-AIML-
ReportConfig-r19        OPTIONAL, -- Need ON
}
NR-AIML-ReportConfig-r16 ::= SEQUENCE {
timingReportingGranularityFactor-r16       INTEGER (0..5)
                    OPTIONAL, -- Need ON
reducedDL-PRS-ProcessingSamples-r17       ENUMERATED  {
requested, ... }   OPTIONAL, -- Need ON
lowerRxBeamSweepingFactor-FR2-r17       ENUMERATED   {
requested }        OPTIONAL    -- Need ON
timingReportingGranularityFactorExt-r18   INTEGER    (-6..-1)
                 OPTIONAL, -- Need ON
nr-DL-PRS-MeasurementTimeWindowsConfig-r18
                                          NR-DL-PRS-
MeasurementTimeWindowsConfig-r18   OPTIONAL    -- Need ON
]]
}
-- ASN1STOP
```

supportedAIMLModelList: This field indicates list of association IDs and corresponding expected QoS level. Target device determines AIML model (associatedID) that are available in the target device and fulfils the expected QoS level.

nr-AssistanceAvailability: This field indicates whether the target device may request additional AIML assistance data from the server. TRUE means allowed and FALSE means not allowed.

NR-DL-PRS-MeasurementTimeWindowsConfig

The IE NR-DL-PRS-MeasurementTimeWindowsConfig provides a set of indicated time window(s) which is configured for the target device to perform measurements on indicated DL-PRS Resource Set(s) occurring within indicated time window(s).

```
-- ASN1START
NR-DL-PRS-MeasurementTimeWindowsConfig-r18 ::=
SEQUENCE (SIZE(1..2)) OF
NR-DL-PRS-MeasurementTimeWindowsConfigElement-r18
NR-DL-PRS-MeasurementTimeWindowsConfigElement-r18 ::=
SEQUENCE {
nr-StartSFN-TimeWindow-r18          INTEGER (0..1023),
nr-PeriodicOrOneShotTimeWindow-r18 CHOICE {
  nr-Periodicity AndSlotOffsetTimeWindow-r18
NR-DL-PRS-Periodicity-and-ResourceSetSlotOffset-r16,
  nr-OneShotSlotOffsetTimeWindow-r18 CHOICE {
             scs15-r18
INTEGER (0..10239),
             scs30-r18
INTEGER (0..20479),
             scs60-r18
INTEGER (0..40959),
             scs120-r18
INTEGER (0..81919)
  }
}                                        OPTIONAL, -- Need ON
nr-SymbolOffsetTimeWindow-r18       INTEGER (0..13)
```

-continued

```
                              OPTIONAL, -- Need ON
  nr-DurationTimeWindow-r18      ENUMERATED { n1, n2, n4, n6, n8,
n12, n16, ... },
  nr-SelectedDL-PRS-FrequencyLayerIndex-r18   INTEGER
(0..nrMaxFreqLayers-1-r16)
                                   OPTIONAL, -- Need ON
  nr-SelectedDL-PRS-IndexListPerFreq-r18
  SEQUENCE (SIZE (1..nrMaxTRPsPerFreq-r16)) OF
  NR-SelectedDL-PRS-IndexPerTRP-r18 OPTIONAL, -- Need OP
  nr-MeasurementsToPerformInTimeWindow-r18        BIT STRING {
rstd (0),
        ueRxTx (1),
        rsrp (2),
        rsrpp (3),
        rscp (4),
        rscpd (5)
     } (SIZE(1..16)) OPTIONAL, -- Need ON
  ...
  }
  NR-SelectedDL-PRS-IndexPerTRP-r18 ::= SEQUENCE {
  nr-SelectedTRP-Index-r18                        INTEGER
(0..nrMaxTRPsPerFreq-1-r16),
  dl-SelectedPRS-ResourceSetIndexList-r18     SEQUENCE     (SIZE
(1..nrMaxSetsPerTrpPerFreqLayer-r16)) OF
                                         INTEGER
(0..nrMaxSetsPerTrpPerFreqLayer-1-r16)       OPTIONAL, -- Need OP
  ...
  }
  -- ASN1STOP
```

nr-StartSFN-TimeWindow: This field specifies the start of the time window in system frame number.

nr-PeriodicOrOneShotTimeWindow: A one-shot field specifies the slot offset of the periodic or one-shot time window with respect to the SFN in IE nr-StartSFN-TimeWindow slot #0 for the TRP where the DL-PRS Resource Set is configured, and the periodicity of the periodic time window in slots configured per DL-PRS Resource Set.

nr-SymbolOffsetTimeWindow: This field specifies the symbol offset with respect to the slot offset in nr-PeriodicOrOneShotTimeWindow.

nr-DurationTimeWindow: This field specifies the desired duration of a time window for the indicated DL-PRS Resource Set in unit of slots. Enumerated value 'n1' corresponds to 1 slot, n2 to 2 slots, n4 to 4 slots and so on.

nr-SelectedDL-PRS-FrequencyLayerIndex: This field indicates the frequency layer provided in IE NR-DL-PRS-AssistanceData. Value 0 corresponds to the first frequency layer provided in nr-DL-PRS-AssistanceDataList in IE NR-DL-PRS-AssistanceData, value 1 to the second frequency layer in nr-DL-PRS-AssistanceDataList, and so on.

nr-SelectedDL-PRS-IndexListPerFreq: This field provides the list of addressed TRPs of the selected frequency layer. If this field is absent, all DL-PRS Resources of all TRPs of the indicated frequency layer are addressed. The number of the indicated DL-PRS Resource Set(s) for all the selected TRPs in this list is the same.

nr-SelectedTRP-Index: This field indicates the addressed TRP of the selected frequency layer. Value 0 corresponds to the first entry in nr-DL-PRS-AssistanceDataPerFreq provided in IE NR-DL-PRS-AssistanceData, value 1 corresponds to the second entry in nr-DL-PRS-AssistanceDataPerFreq, and so on.

dl-SelectedPRS-ResourceSetIndexList: This field provides the list of addressed DL-PRS Resource Sets of the selected TRPs of the selected frequency layer. If this field is absent, all DL-PRS Resource Sets and Resources of the indicated TRP are addressed.

nr-MeasurementsToPerformInTimeWindow: This field indicates the measurements that UE shall perform in the configured time window. If multiple bits are set to 1, then UE shall perform multiple measurements in the same time window.

ProvideLocationInformation

The ProvideLocationInformation message body in a LPP message is used by the target device to provide positioning measurements or position estimates to the location server.

```
-- ASN1START
ProvideLocationInformation ::= SEQUENCE {
criticalExtensions CHOICE {
  c1 CHOICE {
    provideLocationInformation-r9 ProvideLocationInformation-r9-IEs,
    spare3 NULL, spare2 NULL, spare1 NULL
  },
  criticalExtensionsFuture SEQUENCE { }
}
}
ProvideLocationInformation-r9-IEs ::= SEQUENCE {
commonIEsProvideLocationInformation
CommonIEsProvideLocationInformation OPTIONAL,
a-gnss-ProvideLocationInformation A-GNSS-ProvideLocationInformation
OPTIONAL,
otdoa-ProvideLocationInformation OTDOA-ProvideLocationInformation
OPTIONAL,
ecid-ProvideLocationInformation ECID-ProvideLocationInformation OPTIONAL,
epdu-ProvideLocationInformation EPDU-Sequence
OPTIONAL,
...,
[[
sensor-ProvideLocationInformation-r13
Sensor-ProvideLocationInformation-r13
OPTIONAL,
tbs-ProvideLocationInformation-r13 TBS-ProvideLocationInformation-r13
OPTIONAL,
wlan-ProvideLocationInformation-r13 WLAN-ProvideLocationInformation-r13
OPTIONAL,
bt-ProvideLocationInformation-r13 BT-ProvideLocationInformation-r13
OPTIONAL
]],
[[ nr-ECID-ProvideLocationInformation-r16
NR-ECID-ProvideLocationInformation-r16 OPTIONAL,
  nr-Multi-RTT-ProvideLocationInformation-r16
NR-Multi-RTT-ProvideLocationInformation-r16 OPTIONAL,
  nr-DL-AoD-ProvideLocationInformation-r16
NR-DL-AoD-ProvideLocationInformation-r16 OPTIONAL,
  nr-DL-TDOA-ProvideLocationInformation-r16
NR-DL-TDOA-ProvideLocationInformation-r16 OPTIONAL
  nr-AIML-ProvideLocationInformation-r19
NR-AIML-ProvideLocationInformation-r19 OPTIONAL
]]
}
-- ASN1STOP
```

CommonIEsProvideLocationInformation

The CommonIEsProvideLocationInformation carries common IEs for a Provide Location Information LPP message Type.

```
-- ANS1START
CommonIEsProvideLocation ::= SEQUENCE {
locationEstimate LocationCoordinates
OPTIONAL,
aiml-locationEstimate LocationCoordinates OPTIONAL,
velocityEstimate Velocity
OPTIONAL,
locationError LocationError
OPTIONAL,
...,
[[ earlyFixReport-12 EarlyFixReport-r12
```

-continued

```
OPTIONAL
]],
[[ locationSourcer13 LocationSource-r13
OPTIONAL,
  locationTimestamp-r13 UTCTime
OPTIONAL
]],
[[
  segmentationInfo-r14 SegmentationInfo-r14 OPTIONAL
-- Cond Segmentation
]],
[[
  integrityInfo-r17 IntegrityInfo-r17
OPTIONAL
]]
}
LocationCoordinates ::= CHOICE {
ellipsoidPoint
Ellipsoid-Point,
ellipsoidPointWithUncertaintyCircle Ellipsoid-PointWithUncertaintyCircle,
ellipsoidPointWithUncertaintyEllipse
EllipsoidPointWithUncertaintyEllipse,
polyPolygon,
ellipsoidPointWithAltitude
EllipsoidPointWithAltitude,
ellipsoidPointWithAltitudeAndUncertaintyEllipsoid
  EllipsoidPointWithAltitudeAndUncertaintyEllipsoid,
ellipsoidArc
EllipsoidArc,
...,
highAccuracyEllipsoidPointWithUncertaintyEllipse-v1510
HighAccuracyEllipsoidPointWithUncertaintyEllipse-r15,
highAccurayEllipsoidPointWithAltitudeAndUncertaintyEllipsoid-v1510
HighAccuracyEllipsoidPointWithAltitudeAndUncertaintyEllipsoid-r15,
ha-EllipsoidPointWithScalableUncertaintyEllipse-v1680
  HA-EllipsoidPointWithScalableUncertaintyEllipse-r16,
ha-EllipsoidPointWithAltitudeAndScalableUncertaintyEllipsoid-v1680
  HA-EllipsoidPointWithAltitudeAndScalableUncertaintyEllipsoid-r16,
local2dPointWithUncertaintyEllispe-v1800
local2dPointWithUncertaintyEllispe-r18,
local3dPointWithUncertaintyEllipsoid-v1800
local3dPointWithUncertaintyEllipsoid-r18
}
Velocity ::= CHOICE {
horizontalVelocity
HorizontalVelocity,
horizontalWithVerticalVelocity
HorizontalWithVerticalVelocity,
horizontalVelocityWithUncertainty
HorizontalVelocityWithUncertainty,
horizontalWithVerticalVelocityAndUncertainty
  HorizontalWithVerticalVelocityAndUncertainty,
...
}
LocationError ::= SEQUENCE {
locationfailurecause LocationFailureCause,
...
}
LocationFailureCause ::= ENUMERATED {
undefined,
requestedMethodNotSupported,
positionMethodFailure,
periodicLocationMeasurementsNotAvailable,
...
}
EarlyFixReport-r12 ::= ENUMERATED {
noMoreMessages,
moreMessagesOnTheWay
}
LocationSource-r13 ::= BIT STRING { a-gnss (0),
wlan (1)
bt (2),
tbs (3),
sensor (4),
ha-gnss-v1510 (5),
motion-sensor-v1550 (6),
dl-tdoa-r16 (7),
```

-continued

```
dl-aod-r16                    (8) } (SIZE(1..16))
IntegrityInfo-r17 ::= SEQUENCE {
horizontalProtectionLevel-r17       INTEGER (0..50000),
verticalProtectionLevel-r17          INTEGER (0..50000)
      OPTIONAL,
achievable TargetIntegrityRisk-r17 INTEGER (10..90)
   OPTIONAL,
...
}
-- ASN1STOP
```

locationEstimate: This field provides a location estimate using one of the geographic shapes The conditions for including this field are defined for the locationInformation Type field in a Request Location Information message. If the locationInformationType field in a Request Location Information message was set to 'locationEstimateAndMeasurementsRequired' and this field is absent, it means that the PRU location is not available.

aiml-locationEstimate: This field provides a location estimate using one of the geographic shapes. The conditions for including this field are defined for the locationInformation-Type field in a Request Location Information message. If the locationInformationType field in a Request Location Information message was set to aimlLocationEstimateRequired, UE includes this field. If the locationInformation Type field in a Request Location Information message was set to 'aimlLocationEstimateAndMeasurementsRequired' and this field is absent, it means that the location determined from AIML model is not available.

velocityEstimate: This field provides a velocity estimate using one of the velocity shapes defined in TS 23.032 [15]. Coding of the values of the various fields internal to each velocity shape follow the rules in TS 23.032 [15].

locationError: This field shall be included if and only if a location estimate and measurements are not included in the LPP PDU. The field includes information concerning the reason for the lack of location information. The Location-FailureCause 'periodicLocationMeasurementsNotAvailable' shall be used by the target device if periodic location reporting was requested, but no measurements or location estimate are available when the reportingInterval expired.

earlyFixReport: This field shall be included if and only if the ProvideLocationInformation message contains early location measurements or an early location estimate. The target device shall set the values of this field as follows:

>: noMoreMessages: This is the only or last ProvideLocationInformation message used to deliver the entire set of early location information.

>: moreMessagesOnTheWay: This is one of multiple ProvideLocationInformation messages used to deliver the entire set of early location information (if early location information will not fit into a single message).

If this field is included, the IE SegmentationInfo shall not be included.

locationSource: This field provides the source positioning technology for the location estimate.

location Timestamp: This field provides the UTC time when the location estimate is valid and should take the form of YYMMDDhhmmssZ.

segmentationInfo: This field indicates whether this ProvideLocationInformation message is one of many segments, as specified in clause 4.3.5 integrityInfo: This field provides the integrity result for the locationEstimate.

>: horizontalProtectionLevel provides the HPL for the locationEstimate along the semi-major axis of the error ellipse. Scale factor 0.01 metre; range 0-500 metres.

>: verticalProtectionLevel provides the VPL for the locationEstimate. Scale factor 0.01 metre; range 0-500 metres.

>: achievableTargetIntegrityRisk indicates the achievable TIR for which the HPL and VPL are provided. The achievable TIR is given by P=10-0.1n [hour-1] where n is the value of achievableTargetIntegrityRisk and the range is 10-1 to 10-9 per hour. If this field is absent, the achievable TIR is the same as the targetIntegrityRisk in CommonIEsRequestLocationInformation.

NR-DL-TDOA-ProvideLocationInformation

The IE NR-DL-TDOA-ProvideLocationInformation is used by the target device to provide NR DL-TDOA location measurements to the location server. It may also be used to provide NR DL-TDOA positioning specific error reason.

```
-- ASN1START
NR-DL-TDOA-ProvideLocationInformation-r16 ::= SEQUENCE {
nr-DL-TDOA-SignalMeasurementInformation-r16
   NR-DL-TDOA-SignalMeasurementInformation-r16
                              OPTIONAL,
nr-dl-tdoa-LocationInformation-r16          NR-DL-TDOA-
LocationInformation-r16
                              OPTIONAL,
nr-DL-TDOA-Error-r16                        NR-DL-TDOA-Error-
r16        OPTIONAL,
...,
[[
nr-DL-TDOA-SignalMeasurementInstances-r17
   SEQUENCE (SIZE (1..maxMeasInstances-r17)) OF
      NR-DL-TDOA-SignalMeasurementInformation-r16
         OPTIONAL,    -- Cond batchUEA
nr-DL-TDOA-LocationInformationInstances-r17
   SEQUENCE (SIZE (1..maxMeasInstances-r17)) OF
      NR-DL-TDOA-LocationInformation-r16
                        OPTIONAL   -- Cond batchUEB
]]
}
-- ASN1STOP
```

NR-DL-TDOA-SignalMeasurementInformation

The IE NR-DL-TDOA-SignalMeasurementInformation is used by the target device to provide NR DL-TDOA measurements to the location server.

The dl-PRS-ReferenceInfo defines the "RSTD reference" TRP. The nr-RSTD's and nr-RSTD-ResultDiff's in nr-DL-TDOA-MeasList are provided relative to the "RSTD reference" TRP.

The "RSTD reference" TRP may or may not be the same as the "assistance data reference" TRP provided by nr-DL-PRS-ReferenceInfo in IE NR-DL-PRS-Assistance Data.

The target device includes a value of zero for the nr-RSTD and nr-RSTD-ResultDiff of the "RSTD reference" TRP in nr-DL-TDOA-MeasList.

```
-- ASN1START
NR-DL-TDOA-SignalMeasurementInformation-r16 ::= SEQUENCE {
dl-PRS-ReferenceInfo-r16               DL-PRS-ID-Info-r16,
nr-DL-TDOA-MeasList-r16                      NR-DL-TDOA-MeasList-r16,
...,
```

-continued

```
[[
nr-UE-RxTEG-TimingErrorMargin-r17               TEG-TimingErrorMargin-r17
OPTIONAL       -- Cond UERxTEG
]]
}
NR-DL-TDOA-MeasList-r16 ::= SEQUENCE (SIZE(1..nrMaxTRPs-r16)) OF NR-
DL-TDOA-MeasElement-r16
NR-DL-TDOA-MeasElement-r16 ::= SEQUENCE {
dl-PRS-ID-r16                                   INTEGER (0..255),
nr-PhysCellID-r16                               NR-PhysCellID-r16
                                                OPTIONAL,
nr-CellGlobalID-r16                             NCGI-r15                OPTIONAL,
nr-ARFCN-r16                                    ARFCN-ValueNR-r15
                                                OPTIONAL,
nr-DL-PRS-ResourceID-r16                      NR-DL-PRS-ResourceID-r16
                                  OPTIONAL,
nr-DL-PRS-ResourceSetID-r16                   NR-DL-PRS-ResourceSetID-r16
                                  OPTIONAL,
nr-TimeStamp-r16                                    NR-TimeStamp-r16,
nr-RSTD-r16                                                 CHOICE {
                                              k0-r16                    INTEGER
(0..1970049),
                                              k1-r16                    INTEGER
(0..985025),
                                              k2-r16                    INTEGER
(0..492513),
                                              k3-r16                    INTEGER
(0..246257),
                                              k4-r16                    INTEGER
(0..123129),
                                              k5-r16                    INTEGER
(0..61565),
                                              ...,
                                              kMinus6-r18               INTEGER
(0..126083073),
                                              kMinus5-r18               INTEGER
(0..63041537),
                                              kMinus4-r18               INTEGER
(0..31520769),
                                              kMinus3-r18               INTEGER
(0.15760385),
                                              kMinus2-r18               INTEGER
(0..7880193),
                                              kMinus1-r18               INTEGER
(0..3940097)
},
nr-AdditionalPathList-r16                     NR-AdditionalPathList-r16
                                  OPTIONAL,
nr-TimingQuality-r16                          NR-TimingQuality-r16,
nr-DL-PRS-RSRP-Result-r16                     INTEGER (0..126)
                                              OPTIONAL,
nr-DL-TDOA-AdditionalMeasurements-r16
NR-DL-TDOA-AdditionalMeasurements-r16                                   OPTIONAL,
...,
[[
nr-UE-Rx-TEG-ID-r17                                 INTEGER
(0..maxNumOfRxTEGs-1-r17)                     OPTIONAL,
nr-DL-PRS-FirstPathRSRP-Result-r17            INTEGER (0..126)
                                  OPTIONAL,
nr-los-nlos-Indicator-r17                     CHOICE {
                              perTRP-r17                                LOS-
NLOS-Indicator-r17,
                              perResource-r17                           LOS-NLOS-
Indicator-r17
}                                                   OPTIONAL,
nr-AdditionalPathListExt-r17                  NR-AdditionalPathListExt-r17
                              OPTIONAL,
nr-DL-TDOA-AdditionalMeasurementsExt-r17
NR-DL-TDOA-AdditionalMeasurementsExt-r17 OPTIONAL
]],
[[
nr-MeasBasedOnAggregatedResources-r18           ENUMERATED {true}
                                  OPTIONAL,
nr-AggregatedDL-PRS-ResourceInfo-List-r18   SEQUENCE (SIZE (2..3)) OF
                                                NR-AggregatedDL-
PRS-ResourceInfo-Element-r18      OPTIONAL,
nr-RSCPD-r18
INTEGER (0..3599)                             OPTIONAL,
nr-PhaseQuality-r18                                                     NR-
```

```
PhaseQuality-r18                                   OPTIONAL,
   nr-RSCPD-AddMeasurementSamples-r18                SEQUENCE       (SIZE
(1..nrNumOfSamples-1-r18 )) OF
                                            NR-RSCPD-
AdditionalMeasurementSamplesElement-r18           OPTIONAL,
   nr-ReportDL-PRS-MeasBasedOnSingleOrMultiHopRx-r18
      ENUMERATED { singleHop, multipleHop }     OPTIONAL
   ]]
   }
   NR-DL-TDOA-AdditionalMeasurements-r16 ::= SEQUENCE (SIZE (1..3)) OF
   NR-DL-TDOA-AdditionalMeasurementElement-r16
   NR-DL-TDOA-AdditionalMeasurementsExt-r17    :=    SEQUENCE    (SIZE
(1..maxAddMeasTDOA-r17)) OF
   NR-DL-TDOA-AdditionalMeasurementElement-r16
   NR-DL-TDOA-AdditionalMeasurementElement-r16 ::= SEQUENCE {
   nr-DL-PRS-ResourceID-r16                        NR-DL-PRS-ResourceID-r16
                                            OPTIONAL,
   nr-DL-PRS-ResourceSetID-r16                     NR-DL-PRS-ResourceSetID-r16
                                            OPTIONAL,
   nr-TimeStamp-r16                                  NR-TimeStamp-r16,
   nr-RSTD-ResultDiff-r16                          CHOICE {
                                                   k0-r16                    INTEGER
(0..8191),
                                                   k1-r16                    INTEGER
(0..4095),
                                                   k2-r16                    INTEGER
(0..2047),
                                                   k3-r16                    INTEGER
(0..1023),
                                                   k4-r16                    INTEGER
(0..511),
                                                   k5-r16                    INTEGER
(0..255),
                                                   ...,
                                                   kMinus6-r18               INTEGER
(0..524224),
                                                   kMinus5-r18               INTEGER
(0..262112),
                                                   kMinus4-r18               INTEGER
(0..131056),
                                                   kMinus3-r18               INTEGER
(0..65528),
                                                   kMinus2-r18               INTEGER
(0..32764),
                                                   kMinus1-r18               INTEGER
(0..16382)
   },
   nr-TimingQuality-r16                            NR-TimingQuality-r16,
   nr-DL-PRS-RSRP-ResultDiff-r16                   INTEGER (0..61)OPTIONAL,
   nr-AdditionalPathList-r16                       NR-AdditionalPathList-r16
                                            OPTIONAL,
   ...,
   [[
   nr-UE-Rx-TEG-ID-r17                               INTEGER
(0..maxNumOfRxTEGs-1-r17)                            OPTIONAL,
   nr-DL-PRS-FirstPathRSRP-ResultDiff-r17
   INTEGER (0..61)OPTIONAL,
   nr-los-nlos-IndicatorPerResource-r17
   LOS-NLOS-Indicator-r17
   OPTIONAL,
   nr-AdditionalPathListExt-r17                    NR-AdditionalPathListExt-r17
                              OPTIONAL
   ]],
   [[
   nr-MeasBasedOnAggregatedResources-r18         ENUMERATED {true}
                                            OPTIONAL,
   nr-AggregatedDL-PRS-ResourceInfo-List-r18     SEQUENCE (SIZE (2..3)) OF
                                                     NR-AggregatedDL-
PRS-ResourceInfo-Element-r18        OPTIONAL,
   nr-RSCPD-r18
   INTEGER (0..3599)                                 OPTIONAL,
   nr-PhaseQuality-r18                                                       NR-
PhaseQuality-r18                                   OPTIONAL,
   nr-RSCPD-AdditionalMeasurementsAddSamples-r18
      SEQUENCE (SIZE (1..nrNumOfSamples-1-r18 )) OF
                                                     NR-RSCPD-
AdditionalMeasurementSamplesElement-r18          OPTIONAL,
   nr-ReportDL-PRS-MeasBasedOnSingleOrMultiHopRx-r18
                                                       ENUMERATED          {
```

-continued

```
singleHop, multipleHop }                    OPTIONAL
  ]]
  }
  NR-RSCPD-AdditionalMeasurementSamplesElement-r18 ::= SEQUENCE {
  nr-RSCPD-r18                                  INTEGER              (0..3599)
                                            OPTIONAL,
  nr-PhaseQuality-r18                           NR-PhaseQuality-r18
                                            OPTIONAL,
  nr-TimeStamp-r18                              NR-TimeStamp-r16
                                            OPTIONAL,
  ...
  }
  -- ASN1STOP
```

nr-UE-RxTEG-TimingErrorMargin: This field specifies the UE Rx TEG timing error margin value for all the UE Rx TEGs within one NR-DL-TDOA-SignalMeasurementInformation. If the nr-UE-Rx-TEG-ID is present and this field is absent, the receiver should consider the UE Rx TEG timing error margin value to be the maximum applicable value.

dl-PRS-ID: This field is used along with a DL-PRS Resource Set ID and a DL-PRS Resources ID to uniquely identify a DL-PRS Resource. This ID can be associated with multiple DL-PRS Resource Sets associated with a single TRP.

Each TRP should only be associated with one such ID.

nr-PhysCellID: This field specifies the physical cell identity of the associated TRP, as defined in TS 38.331 [35].

nr-CellGlobalID: This field specifies the NCGI, the globally unique identity of a cell in NR, of the associated TRP, as defined in TS 38.331 [35].

nr-ARFCN: This field specifies the NR-ARFCN of the TRP's CD-SSB (as defined in TS 38.300 [47]) corresponding to nr-PhysCellID.

nr-TimeStamp: This field specifies the time instance at which the TOA, RSCP (if included) and DL PRS-RSRP/RSRPP (if included) measurement is performed. The nr-SFN, nr-Slot and nr-Symbol (if included) in IE NR-TimeStamp correspond to the TRP provided in dl-PRS-ReferenceInfo as specified in TS 38.214 [45]. Note, the TOA measurement refers to the TOA of this neighbour TRP or the reference TRP, as applicable, used to determine the nr-RSTD or nr-RSTD-ResultDiff.

nr-RSTD: This field specifies the relative timing difference between this neighbour TRP and the DL-PRS reference TRP, as defined in TS 38.215 [36]. Mapping of the measured quantity is defined as in TS 38.133 [46].

nr-AdditionalPathList: This field specifies one or more additional detected path timing values for the TRP or resource, relative to the path timing used for determining the nr-RSTD value. If this field was requested but is not included, it means the UE did not detect any additional path timing values. If this field is present, the field nr-AdditionalPathListExt shall be absent.

nr-TimingQuality: This field specifies the target device's best estimate of the quality of the TOA measurement. Note, the TOA measurement refers to the TOA of this neighbour TRP or the reference TRP, as applicable, used to determine the nr-RSTD or nr-RSTD-ResultDiff.

nr-DL-PRS-RSRP-Result: This field specifies the NR DL-PRS reference signal received power (DL PRS-RSRP) measurement, as defined in TS 38.215 [36]. The mapping of the quantity is defined as in TS 38.133 [46].

nr-DL-TDOA-AdditionalMeasurements: This field provides up to 3 additional RSTD measurements per pair of TRPs, with each measurement between a different pair of DL-PRS Resources or DL-PRS Resource Sets of the DL-PRS for those TRPs [45]. If this field is present, the field nr-DL-TDOA-AdditionalMeasurementsExt shall be absent.

nr-UE-Rx-TEG-ID: This field provides the ID of the UE Rx TEG associated with the TOA measurement. Note, the TOA measurement refers to the TOA of this neighbour TRP or the reference TRP, as applicable, used to determine the nr-RSTD or nr-RSTD-ResultDiff. When different UE Rx TEGs for RSTD measurements are requested, the maximum number of reported RSTD measurements associated with different DL-PRS Resources per UE Rx TEG per target TRP is 4.

nr-DL-PRS-FirstPathRSRP-Result: This field specifies the NR DL-PRS reference signal received path power (DL PRS-RSRPP) of the first detected path in time, as defined in TS 38.215 [36]. The mapping of the measured quantity is defined as in TS 38.133 [46].

nr-los-nlos-Indicator: This field specifies the target device's best estimate of the LOS or NLOS of the TOA measurement for the TRP or resource. Note, the TOA measurement refers to the TOA of this neighbour TRP or the reference TRP, as applicable, used to determine the nr-RSTD or nr-RSTD-ResultDiff.

This field also applies to specify the target device's best estimate of the LOS or NLOS of the RSCP measurement for the TRP or resource. Note, the RSCP measurement refers to the RSCP of this neighbour TRP or the reference TRP, as applicable, used to determine the nr-RSCPD. If the requested type or granularity in nr-los-nlos-IndicatorRequest is not possible, the target device may provide a different type and granularity for the estimated LOS-NLOS-Indicator.

nr-AdditionalPathListExt: This field provides up to 8 additional detected path timing values for the TRP or resource, relative to the path timing used for determining the nr-RSTD value. If this field was requested but is not included, it means the UE did not detect any additional path timing values. If this field is present, the field nr-AdditionalPathList shall be absent.

nr-DL-TDOA-AdditionalMeasurementsExt: This field, in addition to the measurements provided in NR-DL-TDOA-MeasElement, provides TOA measurements of up to 4 DL-PRS Resources of a TRP with different UE Rx TEGs. For a certain DL-PRS Resource, there can be up to 8 TOA measurement results with respect to different Rx TEGs.

If this field is present, the field nr-DL-TDOA-AdditionalMeasurements shall be absent.

nr-MeasBasedOnAggregatedResources: This field indicates whether the RSTD measurement, RSRP measurement (if included), and RSRPP measurement (if included) is based on aggregated DL-PRS Resources.

nr-AggregatedDL-PRS-ResourceInfo-List: This field provides the DL-PRS Resource Set IDs which are used for the aggregated RSTD, RSRP, or RSRPP measurement results. This field is optionally present if the field nr-MeasBasedOnAggregatedResources is present; otherwise, it is not present. If the field is present, the field nr-DL-PRS-ResourceID and nr-DL-PRS-ResourceSetID should not be included, and the dl-PRS-ID in IE NR-DL-TDOA-MeasElement shall be ignored by a receiver. The aggregatedDL-PRS-ID in the nr-AggregatedDL-PRS-ResourceInfo-List is always provided for the first measurement when nr-AggregatedDL-PRS-ResourceInfo-List is included in NR-DL-TDOA-MeasElement. The aggregatedDL-PRS-ID is not present in the nr-AggregatedDL-PRS-ResourceInfo-List when nr-AggregatedDL-PRS-ResourceInfo-List is included in NR-DL-TDOA-AdditionalMeasurementElement.

nr-RSCPD: This field specifies the NR DL reference signal carrier phase difference measurement, as defined in TS 38.215 [36]. Mapping of the measured quantity is defined as in TS 38.133 [46]. This neighbour TRP measurement is made using DL-PRS Resources from the same PFL as the reference TRP measurement.

nr-PhaseQuality: This field specifies the target device's best estimate of the quality of the RSCPD measurement.

nr-RSCPD-AddMeasurementSamples: This field, in addition to the nr-RSCPD measurements provided in NR-DL-TDOA-MeasElement, provides up to 3 RSCPD measurements samples associated with the nr-RSTD in NR-DL-TDOA-MeasElement.

nr-ReportDL-PRS-MeasBasedOnSingleOrMultiHopRx: This field indicates that the reported measurement is based on DL-PRS receive hopping with either single hop or multiple hops.

nr-RSTD-ResultDiff: This field provides the additional DL RSTD measurement result relative to nr-RSTD. The RSTD value of this measurement is obtained by adding the value of this field to the value of the nr-RSTD field. The mapping of the field is defined in TS 38.133 [46].

nr-DL-PRS-RSRP-ResultDiff: This field provides the additional DL-PRS RSRP measurement result relative to nr-DL-PRS-RSRP-Result. The DL-PRS RSRP value of this measurement is obtained by adding the value of this field to the value of the nr-DL-PRS-RSRP-Result field. The mapping of the field is defined in TS 38.133 [46].

nr-DL-PRS-FirstPathRSRP-ResultDiff: This field specifies the additional NR DL-PRS reference signal received path power (DL PRS-RSRPP) of the first detected path in time relative to nr-DL-PRS-FirstPathRSRP-Result. The DL-PRS RSRPP of first path value of this measurement is obtained by adding the value of this field to the value of the nr-DL-PRS-FirstPathRSRP-Result field. The mapping of the field is defined in TS 38.133 [46].

nr-los-nlos-IndicatorPerResource: This field specifies the target device's best estimate of the LOS or NLOS of the TOA measurement for the resource. Note, the TOA measurement refers to the TOA of this neighbour TRP or the reference TRP, as applicable, used to determine the nr-RSTD or nr-RSTD-ResultDiff.

This field may only be present if the field nr-LOS-NLOS-Indicator choice indicates perResource.

nr-RSCPD-AdditionalMeasurementsAddSamples: This field, in addition to the nr-RSCPD measurement provided in NR-DL-TDOA-AdditionalMeasurementElement, provides up to 3 RSCPD measurement samples associated with the RSTD measurement in NR-DL-TDOA-AdditionalMeasurementElement.

NR-DL-TDOA-LocationInformation

The IE NR-DL-TDOA-LocationInformation is included by the target device when location information derived using NR DL-TDOA is provided to the location server.

```
-- ASN1START
NR-DL-TDOA-LocationInformation-r16 ::= SEQUENCE {
measurementReferenceTime-r16 CHOICE {
        systemFrameNumber-r16         NR-TimeStamp-r16,
        utc-time-r16                  UTCTime,
        ...
        }              OPTIONAL,
...,
[[
locationCoordinates-r17               LocationCoordinates
        OPTIONAL,  -- Cond batch1
locationSource-r17
LocationSource-r13              OPTIONAL   -- Cond batch2
]]
}
-- ASN1STOP
```

measurementReferenceTime: This field specifies the time for which the location estimate is valid.

locationCoordinates: This field provides a location estimate using one of the geographic shapes defined in TS 23.032 [15].

locationSource: This field provides the source positioning technology for the location estimate.

In the case of locationCoordinates for multiple NR positioning methods are provided, the locationCoordinates and locationSource shall be present in only one of NR-DL-TDOA-ProvideLocationInformation or NR-DL-AoD-ProvideLocationInformation.

NR-DL-TDOA-Error

The IE NR-DL-TDOA-Error is used by the location server or target device to provide NR DL-TDOA error reasons to the target device or location server, respectively.

```
-- ASN1START
NR-DL-TDOA-Error-r16 ::= CHOICE {
locationServerErrorCauses-r16          NR-DL-TDOA-LocationServerErrorCauses-r16,
targetDeviceErrorCauses-r16            NR-DL-TDOA-TargetDeviceErrorCauses-r16,
...
}
-- ASN1STOP
```

NR-DL-TDOA-LocationServerErrorCauses

The IE NR-DL-TDOA-LocationServerErrorCauses is used by the location server to provide NR DL-TDOA error reasons to the target device.

```
-- ASN1START
NR-DL-TDOA-LocationServerErrorCauses-r16 ::= SEQUENCE {
cause-r16          ENUMERATED          {          undefined,
assistanceDataNotSupportedByServer,
assistanceDataSupportedButCurrentlyNotAvailableByServer,
notProvidedAssistanceDataNotSupportedByServer,
...,
on-demand-dl-prs-NotSupportedByServer-v1700,
on-demand-dl-prs-SupportedButCurrentlyNotAvailableByServer-v1700
                                                  },
...
}
-- ASN1STOP
```

NR-DL-TDOA-TargetDeviceErrorCauses

The IE NR-DL-TDOA-TargetDeviceErrorCauses is used by the target device to provide NR DL-TDOA error reasons to the location server.

```
-- ASN1START
NR-DL-TDOA-TargetDeviceErrorCauses-r16 ::= SEQUENCE {
cause-r16            ENUMERATED {      undefined,
assistance-data-missing,
unableToMeasureAnyTRP,
attemptedButUnableToMeasureSomeNeighbourTRPs,
thereWereNotEnoughSignalsReceivedForUeBasedDL-TDOA,
locationCalculationAssistanceDataMissing,
...
                                        },
...,
[[
remoteUE-Indication-r18                     ENUMERATED {true}
OPTIONAL          -- Cond NR
]]
}
-- ASN1STOP
```

NR-AIML-ProvideLocationInformation

The IE NR-AIML-ProvideLocationInformation is used by the target device to provide AIML-based location estimate to the location server. It may also be used to provide AIML positioning specific error reason.

```
-- ASN1START
NR-AIML-ProvideLocationInformation-r19 ::= SEQUENCE {
aimlModelInfo                                   ModelInfo
nr-aiml-LocationInformation-r16          NR-AIML-LocationInformation-r16
OPTIONAL,
nr-AIML-Error-r19                               NR-AIML-Error-r19
          OPTIONAL,
nr-AIML-LocationInformationInstances-r17
     SEQUENCE (SIZE (1..n)) OF
          NR-AIML-LocationInformation-r16
...,
}
-- ASN1STOP
```

aimlModelINfo: This field provides information on AIML model that are used to derive location estimates.

NR-AIML-LocationInformation

The IE NR-AIML-LocationInformation is included by the target device when AIML-based location information is provided to the location server.

```
-- ASN1START
NR-AIML-LocationInformation-r19 ::= SEQUENCE {
measurementReferenceTime-r16 CHOICE {
     systemFrameNumber-r16         NR-
TimeStamp-r16,
     utc-time-r16                  UTCTime,
     ...
     }            OPTIONAL,
locationCoordinates-r17            LocationCoordinates
     OPTIONAL,   -- Cond batch1
}
-- ASN1STOP
```

measurementReferenceTime: This field specifies the time for which the location estimate is valid.

locationCoordinates: This field provides a location estimate using one of the geographic shapes. The field is mandatory present if the field nr-AIML-LocationInformationInstances is present in IE NR-AIML-ProvideLocationInformation; otherwise it is not present Alternatively, the following structure can be used.

```
-- ASN1START
NR-AIML-LocationInformation-r19 ::= SEQUENCE {
measurementReferenceTime-r16 CHOICE {
```

-continued

```
     systemFrameNumber-r16         NR-
TimeStamp-r16,
     utc-time-r16                  UTCTime,
     ...
     }            OPTIONAL,
...,
[[
locationCoordinates-r17            LocationCoordinates
     OPTIONAL,   -- Cond batch1
locationSource-r19
LocationSource-r19            OPTIONAL   -- Cond batch2
]]
}
-- ASN1STOP
```

locationSource: This field provides the source positioning technology for the location estimate. Alternatively, unlike other locationInformation such as NR-DL-TDOA-LocationInformation or NR-DL-AoD-ProvideLocationInformation, NR-AIML-ProvideLocationInformation does not include locationSource field. In this case, locationSource is always AIML positioning (e.g. aiml-inference).

In the case of locationCoordinates for multiple NR positioning methods are provided, the locationCoordinates and locationSource shall be present in only one of NR-DL-TDOA-ProvideLocationInformation or NR-DL-AoD-ProvideLocationInformation or NR-AIML-ProvideLocationInformation.

In case that locationCoordinates is provided in NR-DL-TDOA-ProvideLocationInformation or in NR-DL-AoD- ProvideLocationInformation, target device includes locationSource in the corresponding IE.

In case that locationCoordinates is provided in NR-AIML-ProvideLocationInformation, target device does not include locationSource in the corresponding IE.

```
LocationSource-r13 ::= BIT STRING {   a-gnss        (0),
wlan                          (1),
bt                                (2),
tbs                               (3),
sensor                        (4),
ha-gnss-v1510             (5),
motion-sensor-v1550 (6),
dl-tdoa-r16                 (7),
dl-aod-r16                  (8) } (SIZE(1..16))
```

```
LocationSource-r19 ::= BIT STRING {   a-gnss        (0),
wlan                          (1),
bt                                (2),
tbs                               (3),
sensor                        (4),
ha-gnss-v1510             (5),
motion-sensor-v1550 (6),
dl-tdoa-r16                 (7),
dl-aod-r16                  (8),
aiml-inference-r19         (9)} (SIZE(1..16))
```

The IE NR-AIML-Error is used by the location server or target device to provide NR AIML error reasons to the target device or location server, respectively.

```
-- ASN1START
NR-AIML-Error-r19 ::= SEQUENCE {
  targetDeviceErrorCauses-r19                    NR-DL-TDOA-
TargetDeviceErrorCauses-r19,
  ...
}
-- ASN1STOP
```

NR-AIML-TargetDeviceErrorCauses

The IE NR-DL-TDOA-TargetDeviceErrorCauses is used by the target device to provide NR DL-TDOA error reasons to the location server.

```
-- ASN1START
NR-DL-TDOA-TargetDeviceErrorCauses-r16 ::= SEQUENCE {
cause-r19                    ENUMERATED {              undefined,
aiml-assistance-data-missing,
unableToMeasureAnyTRP,
unableToPerformInference,
attemptedButUnableToMeasureSomeNeighbourTRPs,
thereWereNotEnoughSignalsReceivedForAIMLInference,
locationCalculationAssistanceDataMissing,
...
                                                                                  },
,
associationId_related_to_failed_inference                AssociationID
}
-- ASN1STOP
```

<AIML Inference>

When measurement results from DL-PRS resources (assocaitionID=x) are available, UE puts into AIML model (associationID=x) the measurement results, network conditions (associationID=x) and terminal conditions (associationID=x) 0300.

The AIML model generates LocationCoordinates as output. UE stores the generated LocationCoordinates together with reference time 0410, 0420 and 0430.

Later, UE includes stored LocationCoordinates and corresponding reference time in NR-AIML-ProvideLocationInformation.

Figure 4A:
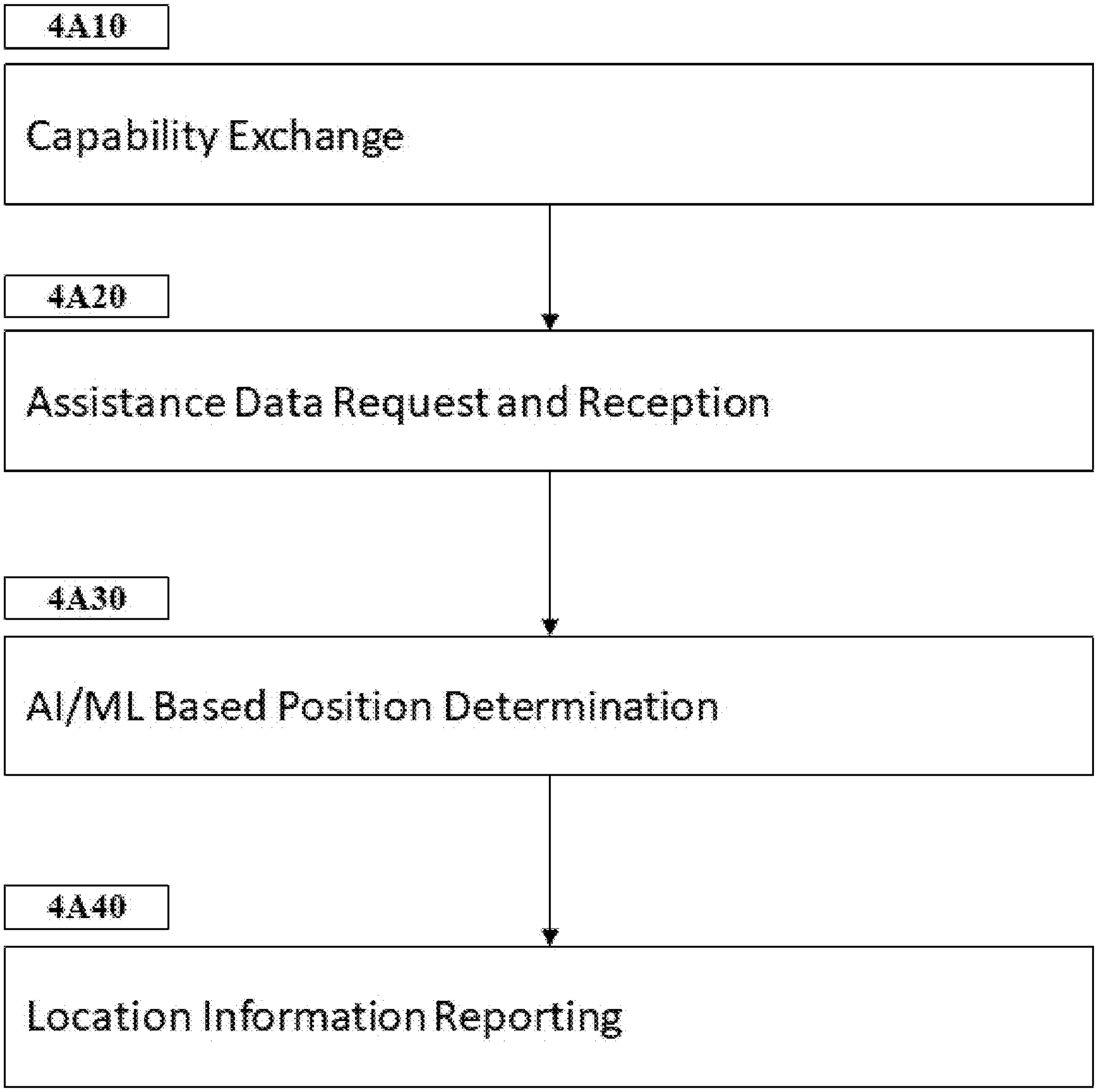
FIG. 4A is a flow diagram illustrating operations of a terminal.

FIG. 4A is a flow diagram illustrating an operation of a terminal.

At 4A10, the terminal receives from a base station a first downlink message, wherein the first downlink message comprises a set of parameters for measurement logging.

At 4A20, the terminal starts logging RSRPs of resources (beams) of a specific resource set at a regular time interval in case that a representative RSRP of a specific serving cell is above/below a first/second threshold during a specific time duration.

At 4A30, the terminal receives from the base station a second downlink message that comprises a parameter for logged measurement request.

At 4A40, the terminal transmits to the base station a first uplink message in response to the second downlink message, wherein the first uplink message comprises a set of logged measurement results and an indication on availability of logged data.

The set of parameters for measurement logging comprises:

>: a parameter for logging resource;

>: a parameter for logging periodicity;

>: a parameter for logging event;

>: a parameter for a first threshold;

>: a parameter for time to trigger.

The serving cell is determined based on a cell where the set of parameters for measurement logging is received.

The specific resource set is determined based on the parameter for logging resource.

The regular time interval is determined based on the parameter for logging periodicity.

The specific time duration is determined based on the parameter for time to trigger.

The representative RSRP of the serving cell is calculated based on weighted moving average of RSRPs of plurality of resources of the serving cell; and The weighted moving average of RSRP of each resource is calculated over two or more RSRPs of the resource measured at different time points.

A logged measurement result of the set of logged measurement results comprises a parameter indicative of time distance between current measurement and previous measurement.

The logged measurement result of the plurality of logged measurement results further comprises:

>: a plurality of f Layer 1-RSRPs; and

>: the plurality of Resource Identifiers.

The terminal stops logging of the RSRP of the resource in case that a radio link failure occurs in a specific cell.

The terminal stops logging of the RSRP of the resource in case that a bandwidth part switching occurs.

Terminal Operation for AI/ML Positioning is illustrated in FIG. 4A.

Step 1 (4A10): Capability Exchange

The terminal receives a RequestCapabilities message from the Location Management Function (LMF) requesting AI/ML positioning capabilities. In response, the terminal transmits a ProvideCapabilities message to the LMF indicating its AI/ML positioning capabilities. Optionally, before proceeding to request assistance data, the terminal may receive a RequestLocationInformation message from the LMF, which comprises a parameter indicating that AI/ML location information is requested and may further comprise a parameter indicating whether the terminal is allowed to request additional assistance data for AI/ML based positioning.

Step 2 (4A20): Assistance Data Request and Reception

The terminal transmits a RequestAssistanceData message to the LMF, wherein the RequestAssistanceData message comprises a parameter indicating that AI/ML assistance data is requested. Subsequently, the terminal receives a ProvideAssistanceData message from the LMF. The ProvideAssistanceData message comprises AI/ML assistance data including position calculation assistance data, which comprises an associated ID associated with coordinates of at least one Transmission Reception Point (TRP). The ProvideAssistanceData message may further comprise downlink Positioning Reference Signal (PRS) assistance data for AI/ML based positioning and one or more associated IDs, wherein each of the one or more associated IDs is associated with one or more TRPs.

Step 3 (4A30): AI/ML Based Position Determination

The terminal performs AI/ML positioning to determine the location of the terminal. The AI/ML based positioning is performed based on downlink PRS received from multiple transmission points (TPs). The terminal performs inference using an AI/ML model with the AI/ML assistance data received from the LMF to determine the location of the terminal. The AI/ML model processes the received PRS signals in conjunction with the assistance data, including the TRP coordinate information and associated IDs, to calculate the terminal's position coordinates.

Step 4 (4A40): Location Information Reporting

The terminal transmits a ProvideLocationInformation message to the LMF. The ProvideLocationInformation message comprises a parameter for location source, wherein the parameter for location source is a bit string in which a specific bit corresponds to AI/ML, thereby indicating that the location was determined using AI/ML based positioning. The ProvideLocationInformation message may further comprise a location coordinate field that contains location coordinates of the terminal that are inferred from the AI/ML model, and a field specifying a time for which the location of the terminal is valid.

Figure 4B:
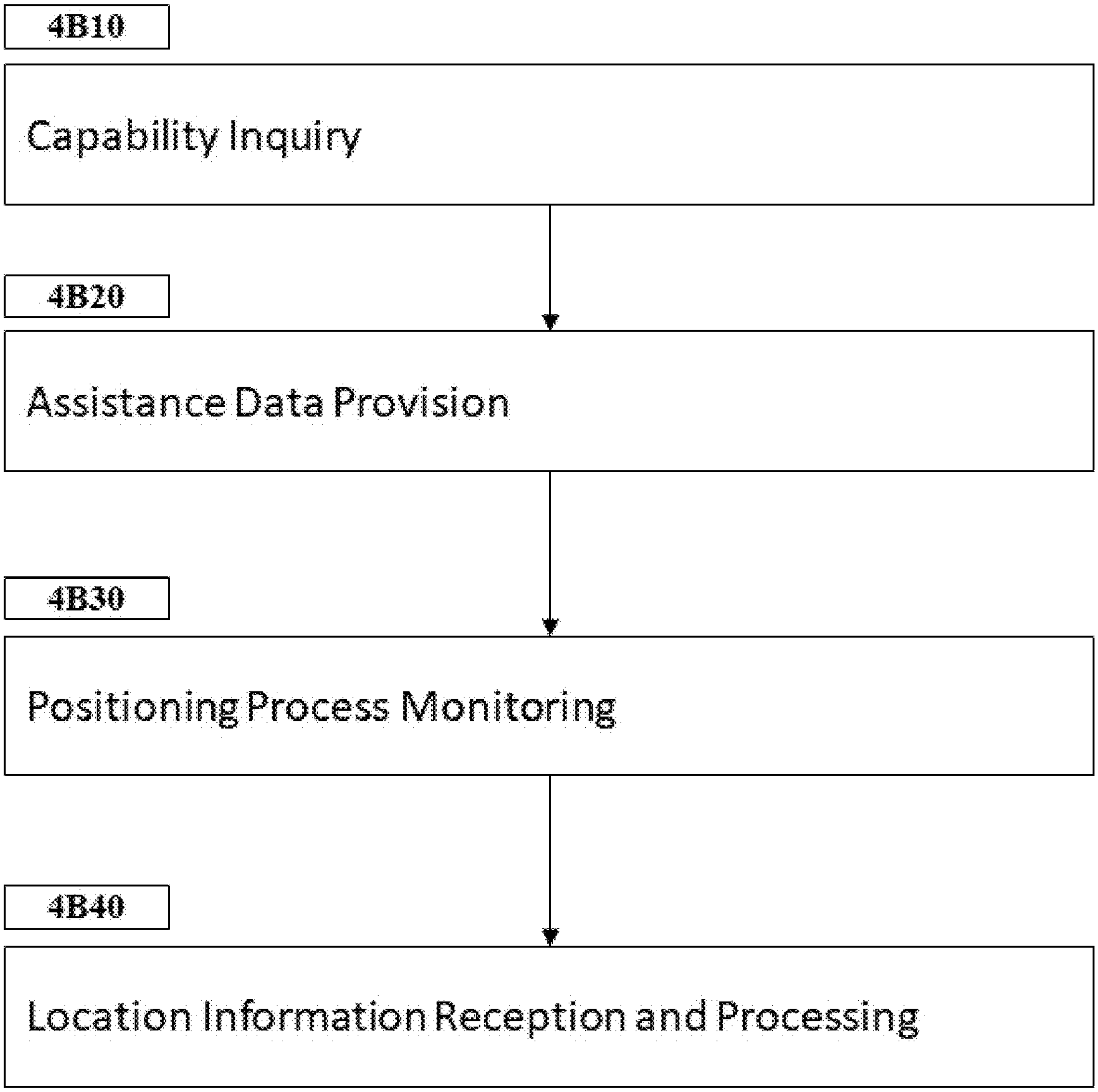
FIG. 4B is a flow diagram illustrating operations of a LMF.

LMF Operation for AI/ML Positioning is illustrated in FIG. 4B.

Step 1 (4B10): Capability Inquiry

The LMF transmits a RequestCapabilities message to the terminal requesting AI/ML positioning capabilities. The LMF then receives a ProvideCapabilities message from the terminal indicating the terminal's AI/ML positioning capabilities. Based on the received capability information, the LMF determines whether the terminal supports AI/ML based positioning and identifies the specific AI/ML positioning features available at the terminal. Optionally, the LMF may transmit a RequestLocationInformation message to the terminal, wherein the RequestLocationInformation message comprises a parameter indicating that AI/ML location information is requested and may further comprise a parameter indicating whether the terminal is allowed to request additional assistance data for AI/ML based positioning.

Step 2 (4B20): Assistance Data Provision

The LMF receives a RequestAssistanceData message from the terminal, wherein the RequestAssistanceData message comprises a parameter indicating that AI/ML assistance data is requested. In response, the LMF prepares and transmits a ProvideAssistanceData message to the terminal. The ProvideAssistanceData message comprises AI/ML assistance data including position calculation assistance data, which comprises an associated ID associated with coordinates of at least one Transmission Reception Point (TRP). The ProvideAssistanceData message may further comprise downlink Positioning Reference Signal (PRS) assistance data for AI/ML based positioning, including configuration information for PRS resources transmitted from multiple transmission points. The LMF may provide one or more associated IDs, wherein each of the one or more associated IDs is associated with one or more TRPs, enabling the terminal to properly identify and utilize the positioning reference signals from the corresponding TRPs.

Step 3 (4B30): Positioning Process Monitoring

The LMF monitors the AI/ML based positioning process being performed by the terminal. During this phase, the terminal receives downlink PRS from multiple transmission points and performs inference using an AI/ML model with the AI/ML assistance data provided by the LMF to determine the location of the terminal. The LMF may coordinate with the network infrastructure to ensure that the appropriate PRS signals are transmitted from the configured transmission points according to the assistance data provided to the terminal.

Step 4 (4B40): Location Information Reception and Processing

The LMF receives a ProvideLocationInformation message from the terminal. The ProvideLocationInformation message comprises a parameter for location source, wherein the parameter for location source is a bit string in which a specific bit corresponds to AI/ML, thereby enabling the LMF to identify that the location was determined using AI/ML based positioning. The ProvideLocationInformation message may further comprise a location coordinate field that contains location coordinates of the terminal that are inferred from the AI/ML model, and a field specifying a time for which the location of the terminal is valid. The LMF processes the received location information and may utilize it for location-based services, network optimization, or other positioning-related applications. The LMF may also verify the validity of the reported location based on the time validity field and determine whether updated location information is required.

Figure 5:
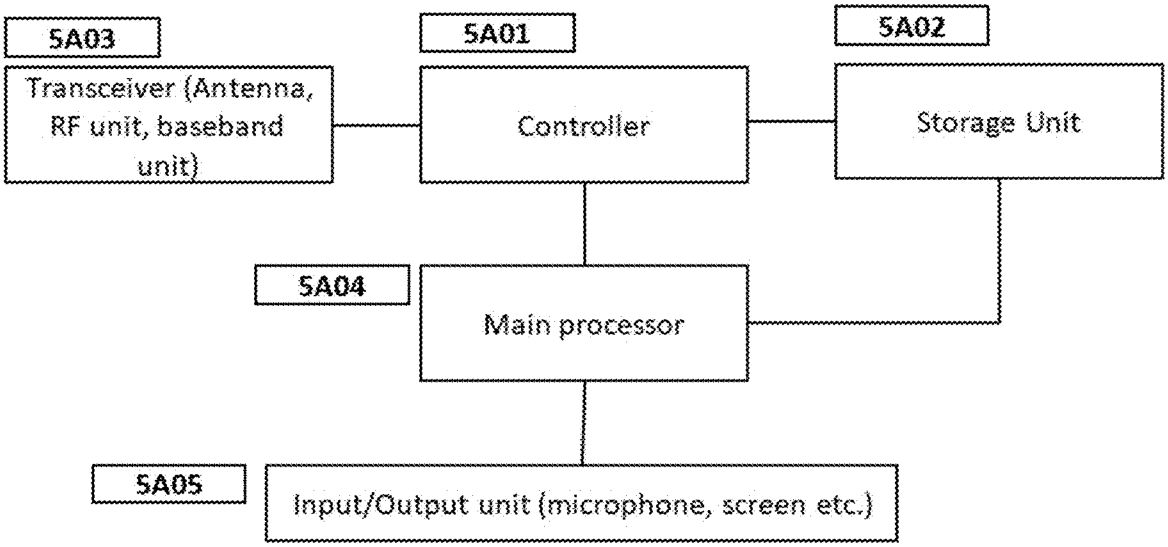
FIG. 5 is a block diagram illustrating a UE.

FIG. 5 is a block diagram illustrating the internal structure of a UE to which the disclosure is applied.

Referring to the diagram, the UE includes a controller 5A01, a storage unit 5A02, a transceiver 5A03, a main processor 5A04 and I/O unit 5A05.

The controller 5A01 controls the overall operations of the UE in terms of mobile communication. For example, the controller 5A01 receives/transmits signals through the transceiver 5A03. In addition, the controller 5A01 records and reads data in the storage unit 5A02. To this end, the controller 5A01 includes at least one processor. For example, the controller 5A01 may include a communication processor (CP) that performs control for communication and an application processor (AP) that controls the upper layer, such as an application program. The controller controls storage unit and transceiver such that UE operations in the present disclosure are performed.

The storage unit 5A02 stores data for operation of the UE, such as a basic program, an application program, and configuration information. The storage unit 5A02 provides stored data at a request of the controller 5A01.

The transceiver 5A03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 5A04 controls the overall operations other than mobile operation. The main processor 5A04 process user input received from I/O unit 5A05, stores data in the storage unit 5A02, controls the controller 5A01 for required mobile communication operations and forward user data to I/O unit 5A05.

I/O unit 5A05 consists of equipment for inputting user data and for outputting user data such as a microphone and a screen. I/O unit 5A05 performs inputting and outputting user data based on the main processor's instruction.

What is claimed is:

1. A method performed by a terminal in a wireless communication system for AI/ML-based positioning, the method comprising:

receiving, from a Location Management Function (LMF), a RequestCapabilities message requesting AI/ML positioning capabilities;

transmitting, to the LMF, a ProvideCapabilities message indicating AI/ML positioning capabilities;

transmitting, to the LMF, a RequestAssistanceData message, wherein the RequestAssistanceData message comprises a parameter indicating that AI/ML assistance data is requested;

receiving, from the LMF, a ProvideAssistanceData message, wherein the ProvideAssistanceData message comprises AI/ML assistance data, wherein the AI/ML assistance data comprises position calculation assistance data, and wherein the position calculation assistance data comprises an identifier (ID) associated with coordinates of at least one transmission reception point (TRP);

performing AI/ML-based positioning to determine a location of the terminal; and transmitting, to the LMF, a ProvideLocationInformation message, wherein the ProvideLocationInformation message comprises a parameter for a location source, and wherein the parameter for the location source is a bit string in which a specific bit corresponds to AI/ML.

2. The method of claim 1, further comprising:

before transmission of the RequestAssistanceData message, receiving, from the LMF, a RequestLocationInformation message, wherein the RequestLocationInformation message comprises a parameter indicating that AI/ML location information is requested.

3. The method of claim 2, wherein the RequestLocationInformation message further comprises a parameter indicating whether the terminal is allowed to request additional assistance data for AI/ML-based positioning.

4. The method of claim 1, wherein the ProvideAssistanceData message further comprises downlink Positioning Reference Signal (PRS) assistance data for AI/ML-based positioning.

5. The method of claim 1, wherein the ProvideAssistanceData message further comprises one or more IDs, wherein each of the one or more IDs is associated with one or more TRPs.

6. The method of claim 1, wherein AI/ML-based positioning is further performed based on downlink PRSs received from multiple TRPs, and wherein the terminal performs inference using an AI/ML model with the AI/ML assistance data received from the LMF to determine the location of the terminal.

7. The method of claim 1, wherein the ProvideLocationInformation message further comprises a field specifying a time for which the location of the terminal is valid.

8. The method of claim 7, wherein the ProvideLocationInformation message further comprises a location coordinate field that contains location coordinates of the terminal that are inferred by an AI/ML model.

9. A terminal in a wireless communication system, the terminal comprising:

a transceiver configured to transmit and receive signals, and a controller configured to control the transceiver to:

receive, from a Location Management Function (LMF), a RequestCapabilities message requesting AI/ML positioning capabilities, transmit, to the LMF, a ProvideCapabilities message indicating AI/ML positioning capabilities, transmit, to the LMF, a RequestAssistanceData message, wherein the RequestAssistanceData message comprises a parameter indicating that AI/ML assistance data is requested, receive, from the LMF, a ProvideAssistanceData message, wherein the ProvideAssistanceData message comprises AI/ML assistance data, wherein the AI/ML assistance data comprises position calculation assistance data, and wherein the position calculation assistance data comprises an associated identifier (ID) associated with coordinates of at least one transmission reception point (TRP), perform AI/ML-based positioning to determine a location of the terminal, and transmit, to the LMF, a ProvideLocationInformation message, wherein the ProvideLocationInformation message comprises a parameter for a location source, and wherein the parameter for the location source is a bit string in which a specific bit corresponds to AI/ML.

* * * * *